(12) United States Patent
Metz et al.

(10) Patent No.: US 10,380,227 B2
(45) Date of Patent: Aug. 13, 2019

(54) GENERATING LAYOUT FOR CONTENT PRESENTATION STRUCTURES

(71) Applicant: Apple Inc., Cupertino, CA (US)

(72) Inventors: Jean S. Metz, Santa Clara, CA (US); Pepijn T. Zoon, San Francisco, CA (US); Robin Pieter van Dijke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/870,791

(22) Filed: Sep. 30, 2015

(65) Prior Publication Data

US 2016/0357717 A1 Dec. 8, 2016

Related U.S. Application Data

(60) Provisional application No. 62/172,154, filed on Jun. 7, 2015.

(51) Int. Cl.
| | |
|---|---|
| *G06F 17/00* | (2019.01) |
| *G06F 17/21* | (2006.01) |
| *G09G 5/00* | (2006.01) |
| *G06F 17/24* | (2006.01) |
| *G06T 3/40* | (2006.01) |

(Continued)

(52) U.S. Cl.
CPC ............ *G06F 17/212* (2013.01); *G06F 3/017* (2013.01); *G06F 7/08* (2013.01); *G06F 16/9577* (2019.01); *G06F 17/2247* (2013.01); *G06F 17/2288* (2013.01); *G06F 17/241* (2013.01); *G06F 17/248* (2013.01); *G06T 3/40* (2013.01);

(Continued)

(58) Field of Classification Search
CPC .......... G06F 17/21; G06F 17/22; G06F 17/24; G06F 17/212; G06F 17/241; G06F 17/248
See application file for complete search history.

(56) References Cited

U.S. PATENT DOCUMENTS 6,023,714 A * 2/2000 Hill ...................... G06F 17/211
715/235
7,076,728 B2 7/2006 Davis et al.
(Continued)

FOREIGN PATENT DOCUMENTS

WO PCT/US2016/019944 2/2016
WO 2016200448 12/2016

OTHER PUBLICATIONS

International Search Report and Written Opinion of PCT/US2016/019944, dated Jun. 24, 2016, Apple Inc.

(Continued)

*Primary Examiner* — Stephen S Hong
*Assistant Examiner* — Marshon L Robinson
(74) *Attorney, Agent, or Firm* — Fletcher Yoder PC

(57) ABSTRACT

A novel method of facilitating the authoring of content and the delivery of the authored content to different types of device is provided. The method supports the design of unique and aesthetically pleasing content while minimizes the amount of effort required from authors and/or publishers. The method does so by creating one single content presentation structure (CPS) for the authored content that is adaptable to different devices and different orientations. Such a universally adaptable content presentation structure is based on a standardized grid system that the publishers can easily become familiar with to author their content.

20 Claims, 35 Drawing Sheets

(51) Int. Cl.
*G06F 17/22* (2006.01)
*G06F 7/08* (2006.01)
*G06F 3/01* (2006.01)
*G06T 13/80* (2011.01)
*G06F 16/957* (2019.01)

(52) U.S. Cl.
CPC ............. *G06T 13/80* (2013.01); *G09G 5/005* (2013.01); *G06T 2210/22* (2013.01)

(56) References Cited

U.S. PATENT DOCUMENTS

| | | | |
|---|---|---|---|
| 7,117,437 B2 | 10/2006 | Chen et al. | |
| 7,788,579 B2 | 8/2010 | Berkner et al. | |
| 8,327,262 B2 | 12/2012 | Tarumi | |
| 8,665,294 B2 | 3/2014 | Hirooka | |
| 9,152,292 B2 | 10/2015 | Xiao et al. | |
| 9,396,167 B2 | 7/2016 | Doll et al. | |
| 2005/0055635 A1* | 3/2005 | Bargeron | G06F 17/248 715/251 |
| 2005/0210399 A1* | 9/2005 | Filner | G06F 17/30905 715/767 |
| 2006/0200759 A1 | 9/2006 | Agrawala et al. | |
| 2009/0106226 A1* | 4/2009 | Ojakaar | G06F 17/30864 |
| 2009/0327301 A1* | 12/2009 | Lees | G06F 17/30011 |
| 2010/0325166 A1* | 12/2010 | Rubin | G06Q 10/04 707/802 |
| 2010/0325564 A1* | 12/2010 | Mital | G06F 3/04815 715/757 |
| 2010/0325578 A1* | 12/2010 | Mital | G06F 3/04815 715/805 |
| 2011/0087959 A1 | 4/2011 | Qiu et al. | |
| 2013/0141456 A1 | 6/2013 | Sokolov et al. | |
| 2013/0198661 A1* | 8/2013 | Matas | G06F 3/048 715/762 |
| 2013/0305145 A1* | 11/2013 | Jackson | G06F 17/211 715/246 |
| 2014/0059424 A1* | 2/2014 | Kim | G06F 17/212 715/235 |
| 2014/0229818 A1* | 8/2014 | Goswami | G06F 17/2247 715/234 |
| 2014/0258849 A1 | 9/2014 | Chung et al. | |
| 2015/0074518 A1* | 3/2015 | Rumsey | G06F 17/248 715/235 |
| 2015/0095767 A1* | 4/2015 | Ebner | G06F 17/30905 715/238 |
| 2015/0193424 A1* | 7/2015 | Lee | G06F 9/44 715/763 |
| 2015/0370445 A1* | 12/2015 | Wang | G06F 17/30896 715/765 |
| 2015/0370538 A1* | 12/2015 | Wang | G06F 8/34 717/105 |
| 2015/0370763 A1* | 12/2015 | Wang | G06F 17/212 715/235 |
| 2016/0179349 A1* | 6/2016 | Ishikawa | G06F 17/3028 715/202 |

OTHER PUBLICATIONS

Jacobs, Charles, et al., "Adaptive Grid-Based Document Layout," ACM Transactions on Graphics (TOG), vol. 22, No. 3, Jul. 1, 2003, pp. 838-847, ACM, US.

\* cited by examiner

```
{
  "version": "0.10",
  "identifier": "SampleArticle",
  "language": "en",
  "title": "Sample Article",
  "subtitle": "A Very Basic Article",
  "layout": {
    "columns": 7,
    "width": 1024,
    "margin": 75,
    "gutter": 20
  },
  "components": [
    {
      "role": "title",
      "text": "A Very Basic Article",
      "textStyle": "title"
    },
    {
      "role": "body",
      "text": "It was a dark and stormy night. Suddenly, a shot rang out!"
    },
    {
      "role": "photo",
      "URL": "bundle://image.jpg"
    }
  ],
  "documentStyle": {
    "backgroundColor": "F7F7F7"
  },
  "componentTextStyles": {
    "default": {
      "fontName": "Helvetica",
      "fontSize": 13,
      "linkStyle": {
        "textColor": "428bca"
      }
    },
    "title": {
      "fontName": "Helvetica-Bold",
      "fontSize": 30,
      "hyphenation": false
    },
    "default-body": {
      "fontName": "Helvetica",
      "fontSize": 13
    }
  }
}
```

*Figure 3*

GENERATING LAYOUT FOR CONTENT PRESENTATION STRUCTURES

CLAIM OF BENEFIT TO PRIOR APPLICATIONS

The present application claims the benefit of U.S. Provisional Patent Application 62/172,154, filed Jun. 7, 2015. U.S. Provisional Patent Applications 62/172,154 is incorporated herein by reference.

BACKGROUND

Markup languages have been used by content providers to structure and presenting content for the World Wide Web. Some of these languages (such as HTML5) aim to improve the language with support for the latest multimedia while keeping the language easily readable by humans and consistently understood by computers and devices. Some of the other languages (such as CSS) aim to create visually engaging webpages and user interfaces while separating the document content from the document presentation. However, these markup languages are not immune from device and OS fragmentation, i.e., a content presentation written in these languages are not consistently understood by different computers and devices. In order to create an engaging webpage, its author must have sufficient knowledge of his target device and carefully craft the presentation based on the peculiar capabilities of his target device.

SUMMARY

Some embodiments of the invention provide a novel method of facilitating the authoring of content and the delivery of the authored content to different types of device. The method supports the design of unique and aesthetically pleasing content while minimizes the amount of effort required from authors and/or publishers. In some embodiment, the method does so by creating one single content presentation structure (CPS) for the authored content that is adaptable to different devices and different orientations. In some embodiments, such a universally adaptable content presentation structure is based on a standardized grid system that the publishers can easily become familiar with to author their content.

A content presentation structure (CPS) facilitates content presentation by placing authored contents in structures that can be manipulated and styled for subsequent presentation. For example, in some embodiments, the content is that of a news article, whose text and images are authored or furnished by the publisher. Those authored text and images are placed in component structures of a CPS, upon which additional formatting and styling information can be flexibly applied or specified. In some embodiments, these additional formatting and styling information are added into the CPS structure and can be subsequently modified or further enhanced.

A single CPS can be used by multiple different types of devices and multiple different orientations to present the same authored content. These different types devices may include tablet computers (such as iPad™) and smart phones (such as iPhone™). These different types of devices can have different display sizes and resolutions. A client device may further provide different display sizes at different orientations, such as a wider, shorter horizontal orientation, and a narrower, taller, vertical orientation.

To ensure that the authored content will be presented in a visually pleasing professional manner, regardless of the client device's display size, resolution, and orientation, a client device in some embodiments enforces its own set of design rules. In some embodiments, such rules are enforced when the client device is creating a layout of the presentation according to the internal CPS. In some embodiments, the client device would modify the layout of the presentation according to its design rules.

In some embodiments, a content presentation structure includes different components. Each component has a role in the presentation of the authored content. In some embodiments, each component specifies its own role, and the semantic value or meaning of the specified role is used to determine the eventual presentation of the component. For an authored content delivery system, the semantic value of the role of the component is used by various stages of the system to determine the component's various properties, such as width, height, position, fonts, cropping, color, animation, etc. In some embodiments, components with different roles exhibit different behaviors, while in some embodiments, the same component exhibit different behavior in different devices. Such behaviors differences may include different animation, or behaviors based on different sensors (as different devices may be equipped with different sensors).

In some embodiments, a publisher generates an authored content within an authored CPS and sends the authored CPS to a distribution system. The distribution system performs various processes on the authored CPS to prepare the authored content for presentation at the client devices. Some of these processes use templates to enrich the authored CPS with additional styling/formatting/layout specifications. Some of these processes elaborate various objects in the public CPS and optimizes the result as internal CPS for client devices.

In some embodiments, the publisher or author only needs to specify the authored content as a few components and their corresponding roles. In some embodiments, the distribution system supplies styling and formatting information for those components, specifically based on their roles. In some embodiments, this is accomplished using template CPSs, which supply layout and styling information for components based on their roles.

In some embodiments, a CPS becomes a template CPS when at least some of its properties are "exposed" to be modified (like arguments of a function or procedure call). In some embodiments, these exposed properties can each be given an argument identifier so they can accept new values as arguments or input parameters. A component in an authored CPS can then use these argument identifiers to modify the underlying corresponding set of properties in the template CPS.

In some embodiments, the system stores many template CPSs. For each incoming authored CPS, it is up to the system to identify a suitable template CPS as template. Specifically, a template CPS is a suitable template for a component in an authored CPS only if (i) the role of the template is the same as that of the component in the authored CPS and (ii) the list of arguments (i.e., the argument identifiers of the exposed properties) of the template can be found in the target component.

In some embodiments, a template CPS's role and its set of arguments are jointly referred to as the signature of the template. An authored CPS having the same role and the same property identifiers as the template's set of arguments is a match for the template and vice versa. In some embodiments, the converter in the distribution system encountering an authored CPS would search through its template database for templates with signatures matching that of the authored CPS and apply it to create a richer CPS.

To make a public CPS ready for delivery and presentation, some embodiments perform several more optimization and elaboration operations to create an internal CPS. In some embodiments, these operations introduce additional constructs and syntax that are optimized for machine consumption. In some embodiments, these operations manipulate the structure of CPS in order to make its size smaller. In some embodiments, a client device running a reader application would make requests for internal CPSs based on the article that it is presenting. Once the request is made for an internal CPS, a distribution server delivers the requested internal CPSs to the requesting client device.

Upon receiving an internal CPS, the client device (i.e., its reader application) performs layout operations to determine the area and the position of the various components. For each component, the internal CPS specifies its role, its association, its width, and its horizontal position. These specifications of the components are initial layout specifications for indicating the publisher/author's intent. In some embodiments, these initial layout specifications are specified coarsely by referring to columns. Based on these initial layout specifications, the process determines the actual layout of each component (i.e., its actual shape, size, and position) using a set of device-specific design rules as well as the layouts of other components in the article. The finalized/actual layouts of the components are specified in terms of display points or pixels in some embodiments.

In some embodiments, the layout of the CPS components for a client device is constrained by the design rules of that client device. In some embodiments, the design rule of a client device is specified in accordance with the display dimensions and capabilities of the device. These design rules are enforced to ensure that the resulting blueprint would result in good looking presentations for the specific display dimensions of the client device. These rules are also dependent on the roles of the component.

In some embodiments, the layout of components occurs in an order that is sorted according to the dependencies between the components. To determine such a sorted order, some embodiments create a dependency graph and use the dependency graph to solve for the order by which the layout of components is to follow. In some embodiments, the dependency graph is a list of items, where each item corresponds to either to the size of a component or the position of a component. In some embodiments, the items of the dependency graph are solved by using a stack. The items of the dependency graph are placed in an original, unsorted list. The items in the unsorted list would enter the stack in order. Each item at top of the stack would move on to the sorted/solved list if it has no dependency or if all of its dependencies are already in the sorted/solved list. Conversely, an item having dependencies to items in the unsorted original list would stay in the stack (and have other items pushed on top of it) until all of its dependencies have moved onto the sorted/solved list and it is on top of the stack.

Some embodiments perform clipping to remove parts of the image so the remainder will fit the layout of the component while showing what is relevant to the subject matter as intended by the author. Some embodiments perform image clipping so the resulting image will comply with the image component's size and shape as specified in the blueprint (i.e., as determined by the layout generator based on the device-specific design rules). Furthermore, some embodiments determines the region of the image to crop by identifying a region of interest in the image data based on the role of the component as specified by the CPS.

In some embodiments, a publisher/author can specify that the authored content be presented by using animation. In some embodiment, a public CPS can specify that the presentation of a component is animated, or that the behavior of a component in the presentation of the authored content involves animation. In some embodiments, the public CPS can specify an animated scene involving several components. In some embodiments, a CPS may specify many different types of animation, including parallax effects, animation that highlights user interaction with the article, animation in response to motions sensed by the client device, and other types of animations.

In some embodiments, the specification for an animation in the public CPS is elaborated into resources needed to show the animation. In some embodiments, the elaboration is performed by the elaboration stage of the distribution sub-system and the elaborated animation resources are included in the internal CPS. Once a client device receives the internal CPS, it translates the elaborated animation resources in the internal CPS into device-specific animation scripts that in turn enable the client device to display the animation when presenting the article/authored content.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

BRIEF DESCRIPTION OF THE DRAWINGS

The novel features of the invention are set forth in the appended claims. However, for purpose of explanation, several embodiments of the invention are set forth in the following figures.

FIG. 3 illustrates an example CPS written in JSON.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a novel method of facilitating the authoring of content (or document) and the delivery of the authored content to different types of device. The method supports the design of unique and aesthetically pleasing content while minimizes the amount of effort required from authors and/or publishers. In some embodiment, the method does so by creating one single content presentation structure (CPS) for the authored content that is adaptable to different devices and different orientations. In some embodiments, such a universally adaptable content presentation structure is based on a standardized grid system that the publishers can easily become familiar with to author their content.

Figure 1:
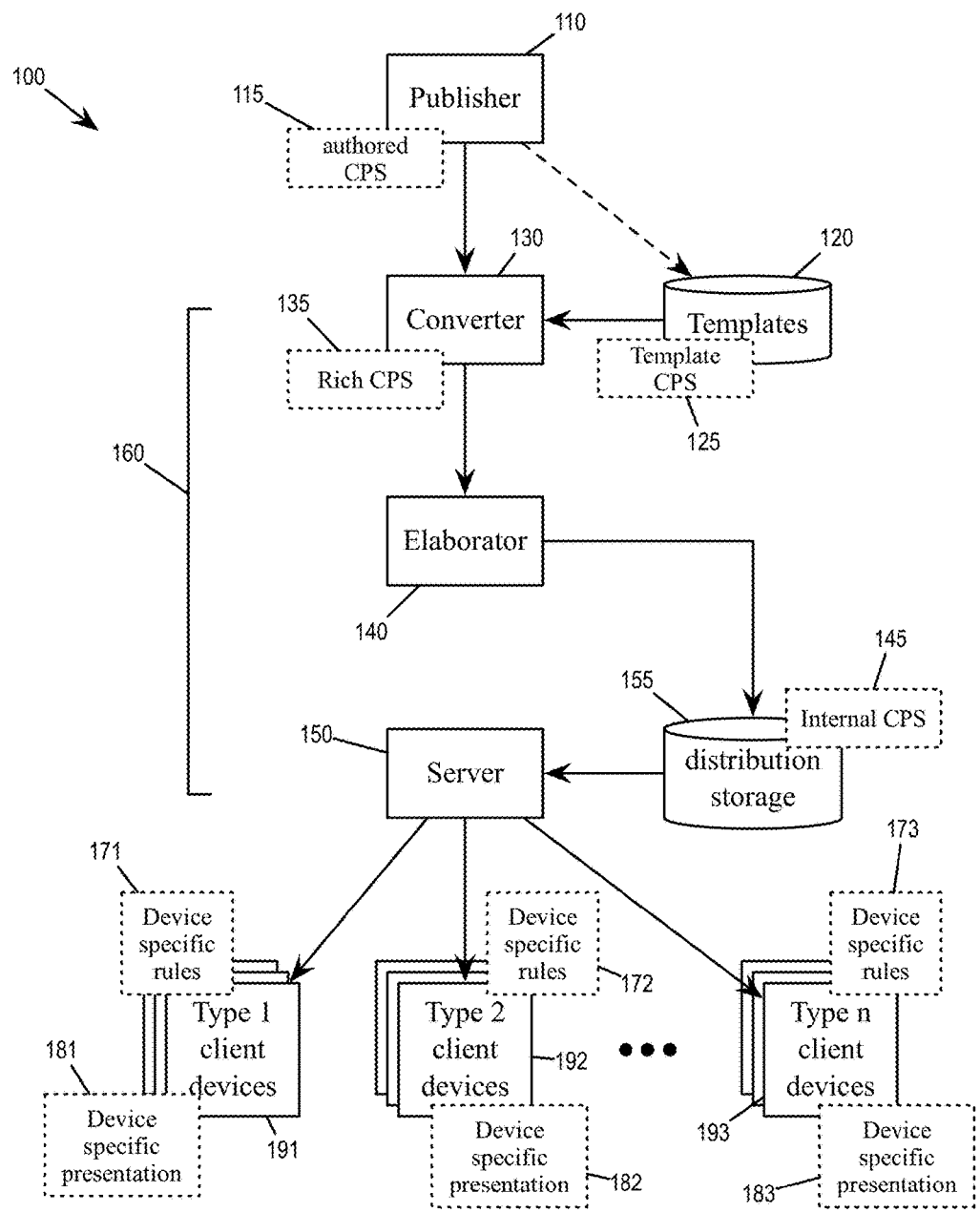
FIG. 1 illustrates an authored content delivery system that generates one single content presentation structure for presenting a piece of authored content at multiple devices and or multiple orientations.

FIG. 1 illustrates an authored content delivery system 100 that generates one single content presentation structure for presenting a piece of authored content at multiple devices and or multiple orientations. The system 100 receives the piece of authored content in a content presentation structure from a publisher 110 and processes it in preparation for distribution. The processed content presentation structure is distributed to client devices 191-193 of different types. Different types of devices have different capabilities (e.g., display resolutions, user input interfaces, available sensors) and will present the content differently based on its own design rules.

As illustrated, the authored content delivery system 100 includes several participants. Those include a publisher 110, a template storage 120, a converter 130, a distribution storage 155, a distribution server 150, and the client devices 191-193.

The publisher 110 authors its content in an authored CPS 115 and provides it to the converter 130. The converter 130 combines the authored CPS 115 with a matching template CPS 125 provided by the template storage 120 to produce an enriched CPS 135. An elaborator 140 elaborates and optimizes the enriched CPS 135 into an internal CPS 145, which is stored at the distribution storage 155 for subsequent distribution. The server 150 retrieves the internal CPS 145 and delivers it to the client devices 191-193. Each of the client devices 191-193 creates its own device-specific presentation (e.g., 181 of the client device 191) from the delivered internal CPS 145 based on its own device-specific design rules (e.g., 171 of the client device 191).

In some embodiments, each of these system participants is implemented by one or more computing devices. These computing devices perform the data generation and data processing operations of the authored content delivery system 100, starting from the creation of the authored CPS 115 by the publisher 110 to the device-specific presentations 181-183 at the devices 191-193. In some embodiments, each client device is running a reader application for processing the received internal CPS and for making the presentation of the authored document.

The publisher 110 is the originator or the author of the content that is to be ultimately presented at the various devices 191-193. A publisher is an entity that engages in the production and dissemination of content such as music, movie, literature, books, magazine, news, or other types of information to the public. Such an entity can be a corporation, a group of artists, an individual author, etc. that have the capabilities to create (author) and disseminate the content through the authored content delivery system 100. In some embodiments, the publisher possesses the necessary computing and communications means (e.g., a computing device having access to Internet) to place the content that it produces in a form of a content presentation structure (i.e., the authored CPS 115) and delivers that content to the authored content delivery system 100.

A content presentation structure (CPS) facilitates content presentation by placing authored contents in structures that can be manipulated and styled for subsequent presentation. For example, in some embodiments, the content is that of a news article, whose text and images are authored or furnished by the publisher. Those authored text and images are placed in component structures of a CPS, upon which additional formatting and styling information can be flexibly applied or specified. In some embodiments, these additional formatting and styling information are added into the CPS structure and can be subsequently modified or further enhanced. The presentation of the content can include text, images, animation, audio, video, multimedia, braille, or other types of visual, auditory, or other sensory experiences that can be made by a computing device. The presentation of the content also includes behaviors exhibited by various components as specified by the CPS.

The authored CPS 115 is the CPS that is produced by the publisher 110 as the input to the authored content delivery system 100. In some embodiments, the publisher or author places its/his/her created content in the authored CPS 115 while specifying very little formatting and styling information (or none at all). In some embodiments, the authored CPS 115 does not specify any information that is specific to any presentation devices (191-193). This is because one of the goals of the invention is for the publishers/authors to only focus on the actual content, without spending much time or energy on styling, formatting, or the peculiarities of the individual presentation devices. However, in some embodiments, the publisher 110 is free to generate authored CPSs that have very rich styling and layout information.

The template storage 120 stores various template CPSs. Unlike a typical authored CPS, a typical template CPS have rich styling and formatting information for a specific appearance that can be repeatedly applied to different content. In some embodiments, the publisher 110 or a third party vendor creates various templates for various desired presentation formats and upload them to be stored at the template storage 120 (through a portal webpage on the Internet, for example). A template CPS can be applied to an authored CPS to create an enriched CPS that has the content of the authored CPS and the styling/formatting of the template CPS. As illustrated, the converter 130 converts the authored CPS 110 into the rich CPS 135 by applying the template CPS 125. The use of templates to enrich the formatting and styling of an authored content will further described in Section II.a below.

The elaborator 140 is for preparing the content for distribution. For a piece of content (e.g., a magazine or news article), the elaborator 140 prepares it for distribution by the server 150 by converting the enriched CPS 135 into the internal CPS 145. In some embodiments, the internal CPS is an elaborated version of the enriched CPS (or authored CPS) that is optimized for delivery to the client devices. The generation of internal CPS will be further described in Section II.b below. Once an internal CPS is created, it is stored in the distribution storage 155. The server 150 in turn retrieves the internal CPSs stored in the distribution storage 155 for distribution to the client devices 191-193.

In some embodiments, the converter 130 and the elaborator 140 are performed by one conversion process that receives the authored CPS 115, applies the template CPS 125 from the template storage 120 to create the rich CPS 135, and then elaborates/optimizes the rich CPS 135 into the internal CPS 145. In some embodiments, this conversion process converts the authored CPS directly into its corresponding internal CPS without enriching it by applying a template CPS.

In some embodiments, the template storage 120, the converter 130, the elaborator 140, the distribution storage 155, and the server 150 are parts of a distribution sub-system 160. In some embodiments, the various parts of the distribution sub-system 160 are located at one location. In some embodiments, they are different components of a single computing device, and/or different processes performed by a same computing device. In some embodiments, the template storage 120 and the distribution storages are cloud storages, while the converter 130, the elaborator 140, and the server 150 are computing resources distributed across different physical locations as part of the cloud.

Each of the client devices 191-193 receives the internal CPSs distributed by the server 150. In some embodiments, a client device requests specific internal CPSs based on the application that it is running. For example, in some embodiments, the client device is running a reader application that is presenting news or magazine articles. The reader application causes the client device to request the corresponding internal CPSs from the server 150. The client device then uses the requested internal CPSs to form the presentation of the article. In some embodiments, the client device creates a layout of the presentation according to the internal CPS and then renders the layout (called a blueprint in some embodiments) for display by the reader application.

As mentioned, a single CPS can be used by multiple different types of devices and multiple different orientations to present the same authored content. These different types devices may include tablet computers (such as iPad™), smart phones (such as iPhone™), laptop computers, or desktop computers. These different types of devices can have different display sizes and resolutions. A client device may further provide different display sizes at different orientations, such as a wider, shorter horizontal orientation, and a narrower, taller, vertical orientation.

To ensure that the authored content will be presented in a visually pleasing professional manner, regardless of the client device's display size, resolution, and orientation, a client device in some embodiments enforces its own set of design rules (e.g., device specific rule 171 for the client device 191). In some embodiments, such rules are enforced when the client device is creating a layout of the presentation according to the internal CPS. The operations of a client device will be further described in Section III and Section IV below.

Several more detailed embodiments of the invention are described below. Section I describes using content presentation structures to specify the presentation of an authored document. Section II describes preparing a content presentation for distribution by server. Section III describes layout generation from content presentation structure. Section IV describes different types of behavior in a presentation of the authored document that are specified by CPS. Section V describes an electronic system with which some embodiments of the invention are implemented. Section VI is a detailed description of a JSON-based CPSL.

I. Content Presentation Structure

As mentioned, to facilitate the presentation of an authored content across different platforms in different devices, some embodiments store the authored content in content presentation structures (CPSs). In order to present the authored content in a professionally looking manner of a newspaper or magazine article, a CPS may also specify how the authored document should be presented by including formatting and styling information.

In some embodiments, a content presentation structure includes different components. Each component has a role in the presentation of the authored content. For example, one text component of the CPS may correspond to the title of the authored content, while another text component may correspond to bodytext of the authored content. One image may correspond to the portrait of the author, while another image may correspond to a logo of a company, so on and so forth. In some embodiments, each component specifies its own role, and the semantic value or meaning of the specified role is used to determine the eventual presentation of the component. For the authored content delivery system 100, the semantic value of a component's role is used by various stages of the system to determine the component's various properties, such as width, height, position, fonts, cropping, color, animation, etc.

Figure 2:
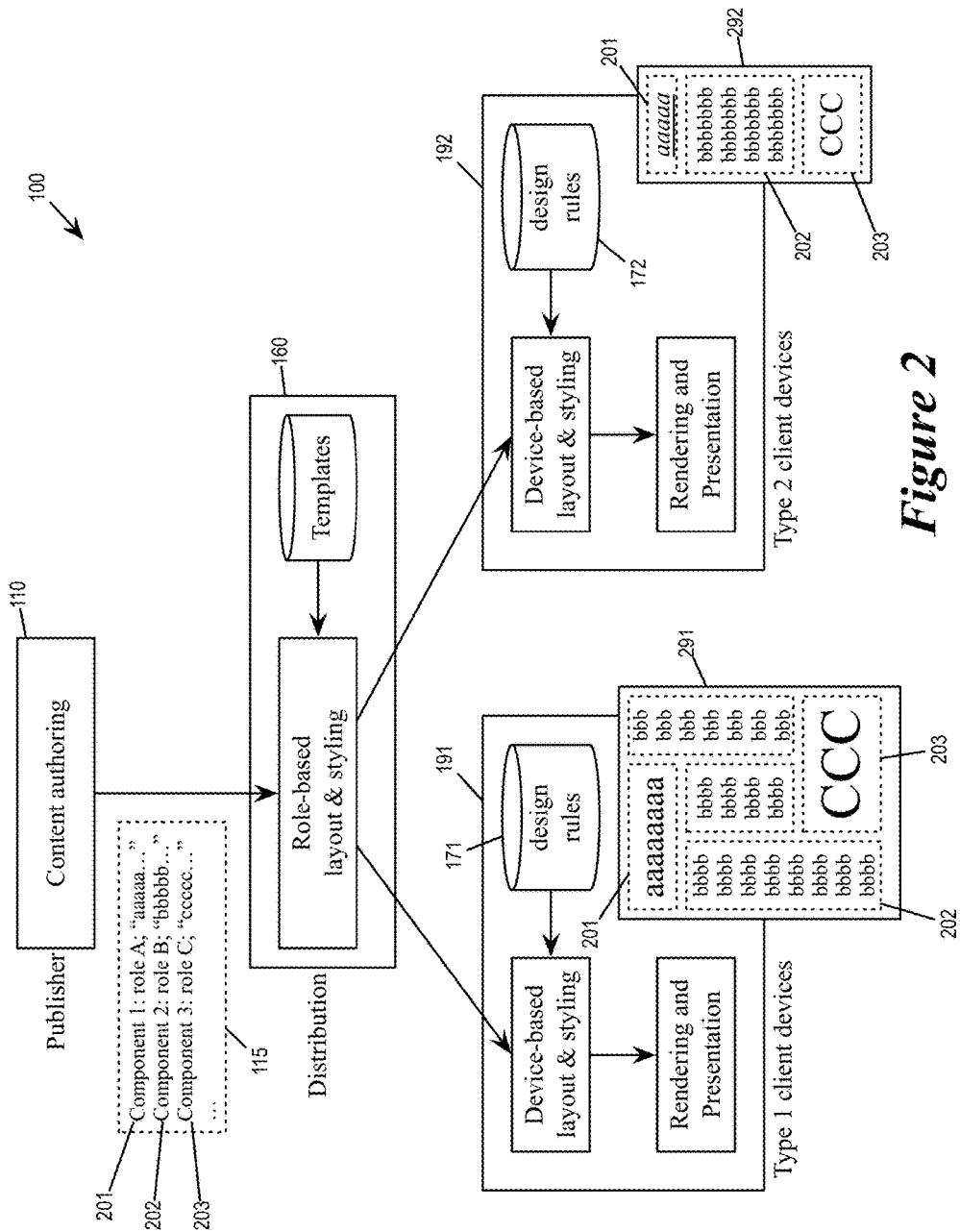
FIG. 2 conceptually illustrates the presentation of authored content based on CPS.

FIG. 2 conceptually illustrates the presentation of authored content based on CPS. Specifically, the figure shows how roles of components determine the presentation of the authored content at the different client devices. The figure shows various blocks that performs various operations in the authoring, distribution, and presentation of authored content in some embodiments of the invention. These blocks represents operations performed by the various participants of the authored content delivery system 100.

As illustrated, the publisher 110 performs content authoring operation to create an authored CPS 115. The authored CPS 115 includes various components, including 201-203 ("component 1", "component 2", and "component 3"). Each of these components has a role. The role of the component 201 is "role A". The role of the component 202 is "role B". The role of the component 203 is "role C", etc. The content of the component 201 is the text "aaaaa" The content of the component 202 is the text "bbbbb . . . ". The content of the component 203 is the text "ccccc . . . ".

The authored CPS 115 is passed to the distribution sub-system 160, which performs layout, formatting, and styling to the various components in the CPS. In some embodiments, performing layout, formatting, and styling to a component entails identifying suitable templates based on component's role. For example, for a component having the role of "header", the distribution system 160 would identify or select a template that is made for components having the role of "header".

The role-based layout and styling operations are part of the operations that the distribution system 160 performs when preparing the authored content for distribution (i.e., to produce the internal CPS 145). The results of these role-based operations are distributed to client devices 191 and 192. Each of the client devices in turn use its own set of design rules to perform device-based layout and styling, then rendering and actual presentation. Some of these device-based layout and styling are also role-based, i.e., the client device applies different device design rules to components with different roles.

FIG. 2 illustrates a presentation 291 by the client device 191 and an example presentation 292 by the client device 192. Both of these presentations are derived from the same authored CPS 115, but are ultimately fashioned by different design rules tailored for different devices. As illustrated, the presentation 291 is for a larger display (such as a tablet device), while the presentation 292 is for a smaller display (such as a smart phone). Both presentations show components 201-203, with their corresponding contents "aaaa . . . ", "bbbbb . . . ", and "ccccc . . . ". With each presentation, components with different roles have different the appearance (e.g., layout, fonts). Furthermore, the device 191 may present a same component differently than the device 192. As illustrated, the presentation 291 uses a different font for component 201 than the presentation 292 for the component 201. The presentation 291 presents the text of the component 202 in three columns, while the presentation 292 presents the same in just one column. The presentation 291 has a larger layout for the component 203 that spans three columns, while the presentation 292 has a smaller layout of the component 203 that spans just one column.

Though not illustrated, in some embodiments, components with different roles exhibit different behaviors, while in some embodiments, the same component exhibit different behavior in different devices. Such behavior differences may include different animation, different user interaction, different user inputs, or different sensor inputs.

In some embodiments, a content presentation structure is written in a content presentation structure language (CPSL). In some embodiments, the CPSL leverages the constructs and syntax of JavaScript Open Notation (JSON) language. In some embodiments, a CPS written in such a CPSL is considered a "native document" to the authored content delivery system 100 as the syntax of the CPSL is optimized to utilize the inherent capabilities of the system. Section VI below provides a detailed description of the JSON based CPSL.

FIG. 3 illustrates an example CPS 300 written in JSON. The CPS is that of an authored document that includes a title, a body text, and a photo of an article. As illustrated, the JSON CPS at its top level includes a set of identifying information 310. It also includes several styling and formatting instructions for the top level, including a set of layout instructions 321 and a set of font definitions 322. The CPS 300 is structured into several components 301-303. The component 301 has the role "title" and is for presenting the title of the article. The component 302 has the role "body" and is for presenting the body text of the article. The component 303 has the role "photo" and is for presenting a photo for the article.

A component of a CPS may have a set of properties in addition to the component's role. Each property has a property identifier and is assigned a value. For example, the component 301 has a set of properties 311-312. The identifier of the property 311 is "text", and its value is "A Very Basic Article". The identifier of the property 312 is "textStyle", and its value is "title". Likewise, the top level component of the CPS 300 has even more properties, properties with identifiers such as "layout", "documentStyle", and "componentTextStyles", each of which has its own set of values or nested properties. In some embodiments, components can be nested under other components. In the example of FIG. 3, the components 301-303 are components nested under the top level components. Though not illustrated, each of those components can have its own nested components underneath.

As mentioned above by reference to FIG. 2, a role of a component determines how the component is presented. It can also be said that the role determines the behavior of the component in the presentation. In some embodiments, the behavior of a component is how it visually appears in the presentation, such as its layout, the font it uses, its position, its animation, etc. In some embodiments, the role of a component as specified by the CPS has semantic value that can be used for other purposes, such as for keyword for search engines.

Figure 4:
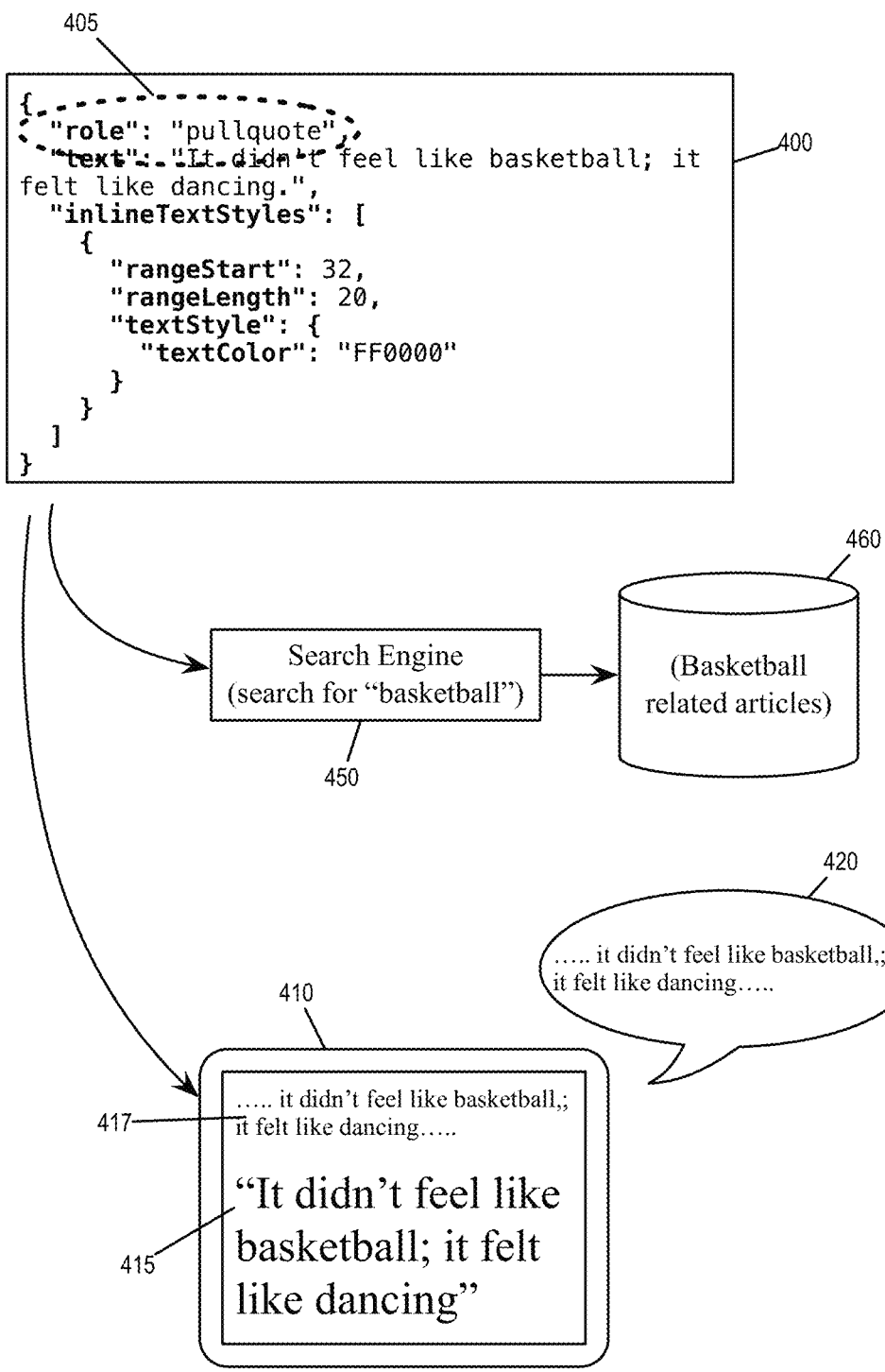
FIG. 4 illustrates several example behaviors of a component that are determined by the component's role.

For some embodiments, FIG. 4 illustrates several example behaviors of a component that are determined by the component's role. The figure illustrates an article 400 having a component 405 in its CPS whose role is "pullquote". A pullquote is a key phrase, quotation or excerpt that has been "pulled" from an article and used as a graphic element, serving to entice readers into the article or to highlight a key topic. It is typically placed in a larger or distinctive typeface and on the same page. Generally speaking, its content is a repeat of what is already present in the body of the article.

FIG. 4 illustrates several different example behaviors of the component 405 that are due to the role specification "pullquote". As illustrated, the component 405 is visually displayed on a device 410 as pullquote 415, i.e., as an emphasized excerpt or repeat of some text 417 in the body of the article 400. However, when the article 400 is audibly presented in an audio presentation 420, the pullquote component 405 will be omitted from the audio presentation, since it is mere repeat of what has already been read so can be bothersome to the reader.

Since pullquote often reveals the emphasis of the article, a CPS component having the role "pullquote" is used by some embodiments to identify keywords related to the article. In this example, the content of the pullquote component 405 is "it didn't feel like basketball; it felt like dancing". Consequently, a search engine 450 would identify the article 400 as being an article relevant to the search term "basketball" in search result 460.

The CPS language in some embodiments defines many different roles having semantic values that can be used to determine the behaviors of components when the CPS is presented. Some of these roles are for image components (e.g., "photo", "logo", "figure", portrait"), some for text components (e.g., "body", "caption", "pullquote", "header", "title", "heading"), some for advertisement (e.g., "banner_advertisement", "medium_rectangle_advertisement"), still others such as "audio", "instagram", "tweet", "video", "music", "mosaic", so on and so forth. Section VI below provides a listing and a description of various different roles that are available in JSON-based CPSL.

II. Pre-Processing for Distribution

As mentioned above by reference to FIG. 1, a publisher generates an authored content within an authored CPS and sends the authored CPS to a distribution system. The distribution system performs various processes on the authored CPS to prepare the authored content for presentation at the client devices. Some of these processes use templates to enrich the authored CPS with additional styling/formatting/layout specifications. Some of these processes elaborate various objects in the public CPS and optimizes the result as internal CPS for client devices.

a. Templating

In some embodiments, an authored CPS has very few required elements. To create a professional looking article through the authored content delivery system, the publisher or the author need only to specify the authored content as a few components and their corresponding roles. In some embodiments, the distribution system supplies styling and formatting information for those components, specifically based on their roles. In some embodiments, this is accomplished using template CPSs, which supply layout and styling information for components based on their roles.

Figure 5:
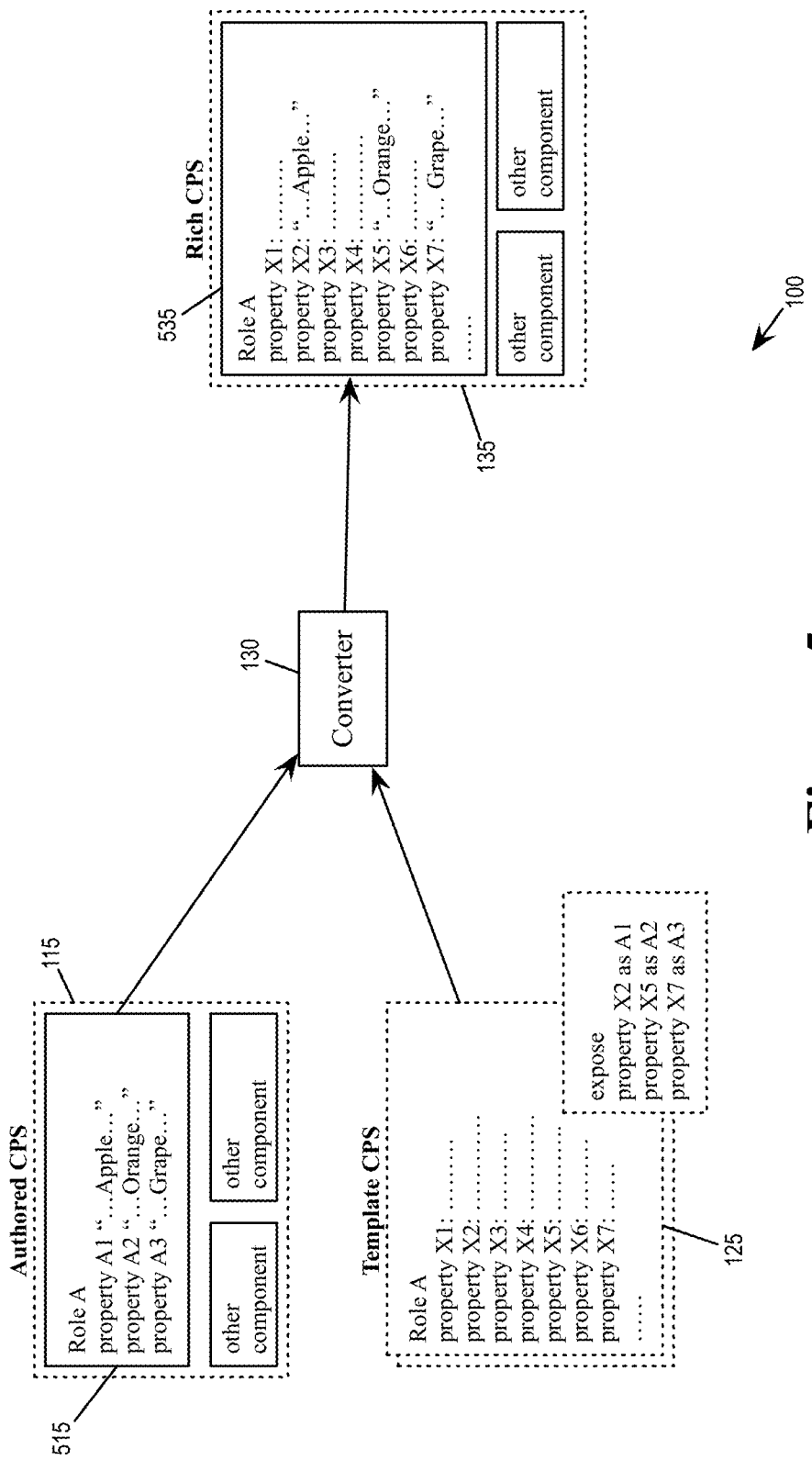
FIG. 5 illustrates using templates to supply layout and styling information to components of authored CPSs.

FIG. 5 illustrates using templates to supply layout and styling information to components of authored CPSs. Specifically, the figure illustrates the converter 130 enriching the authored CPS 115 with formatting and styling information of the template CPS 125 to create the rich CPS 135.

The template CPS 125 has the role "Role A". It is however far richer in information. As illustrated, the template CPS 125 has properties with identifiers X1 through X7. Among these, the properties X2, X5, and X7 are "exposed" as A1, A2, and A3, respectively. This means that when the template 125 is applied to a component with properties (whose identifiers are) A1, A2, and A3, the value of the property A1 will be assigned to be the value of the property X2 in the template, the value of the property A2 will be assigned to be the value of the property X5 in the template, and the value of the property A3 will be assigned to be the value of the property X7 in the template.

The authored CPS 115 includes several components, one of which, the component 515, has the role "Role A". It also has properties with identifiers A1, A2, A3, whose values are "Apple", "Orange", and "Grape", respectively. The converter 130 applies the template 125 to the component 515, thereby creating an enriched component 535 in the rich CPS 135. As illustrated, the enriched component 535, like the template CPS 125, also has properties X1 through X7. However, the values of the properties X2, X5, and X7 has been set to be the values of the properties A1, A2, and A3 in the component 515. Specifically, the value of the property X2 is now "Apple", the value of the property X5 is now "Orange", and the value of the property X7 is not "Grape".

In some embodiments, a template CPS is really a CPS of an authored document that is verified to provide professional looking outcome. The publisher can collect such rich CPSs and provide them as template CPSs. In some embodiments, a CPS becomes a template CPS when at least some of its properties are "exposed" to be modified (like arguments of a function or procedure call). In some embodiments, these exposed properties can each be given an argument identifier so they can accept new values as arguments or input parameters, such as when the properties X2, X5, and X7 being exposed as arguments A1, A2, and A3. A component in an authored CPS can then use these argument identifiers to modify the values of the underlying corresponding set of properties in the template CPS.

Figure 6:
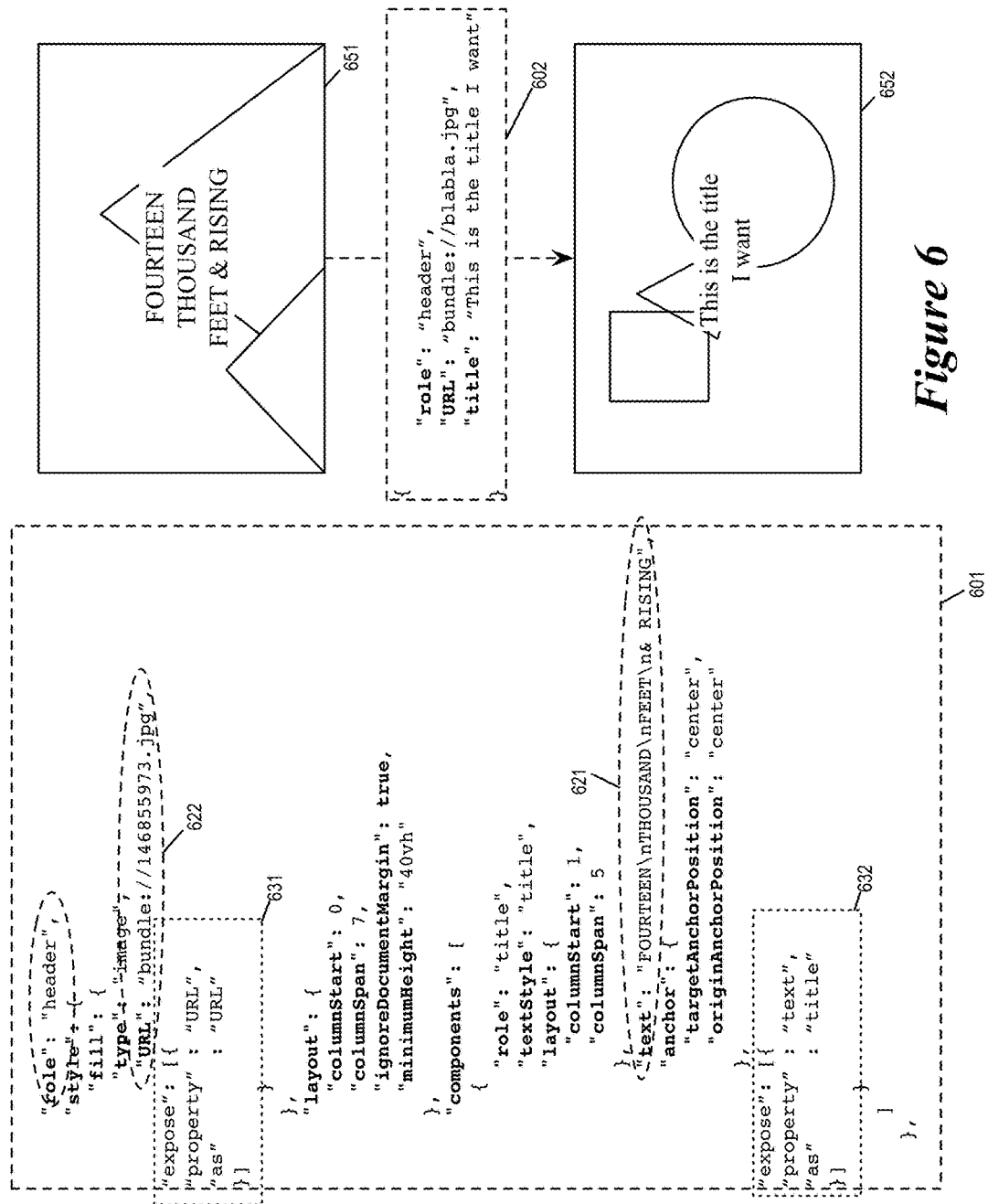
FIG. 6 illustrates a JSON based example of using a rich CPS as template by exposing some of its properties as arguments so it can be reused by another authored content.

FIG. 6 illustrates a JSON based example of using a rich CPS as template by exposing some of its properties as arguments so it can be reused by another authored content. The figure illustrates two JSON CPSs 601 and 602. The JSON CPS 601 is rich in layout and styling information. The figure illustrates a corresponding presentation 651 for the JSON CPS 601 when it is not being used as a template. The appearances of objects (fonts, text position, size of text box, background image, etc.) are exactly as specified by the JSON CPS 601. It displays a text in center that says "FOURTEEN THOUSAND FEET & RISING", which is specified by a property "text" (621). It also displays a background image from the URL "bundle://146855973.jpg" that is specified by a property "URL" (622). The property "URL" is exposed as argument "URL" (at 631) (the argument identifier can be the same as the underlying property) and the property "text" is exposed as argument "title" (at 632).

The JSON 602 is a barebones authored CPS and contains virtually no information other than the authored content itself. In these cases, the JSON 602 includes just a component with a role definition ("header"), a reference to an image, and a title. The reference to the image is specified by a property "URL" whose value is "bundle://blabla.jpg". The title is specified by a property "title", whose value is "This is the title I want".

When the converter applies the JSON 601 as template to the JSON 602, the value of the property "URL" and the value of the property "title" in the JSON 602 are passed into the JSON 601, modifying the values of their corresponding exposed properties ("URL" and "title"). Specifically, the value "bundle://blabla.jpg" passes through the argument "URL" to become the value of the property "URL" in JSON 601, and the value "This is the title I want" passes through the argument "title" to become the value of the property "text" in JSON 601. The rich CPS thus created results in a corresponding presentation 652. The background image and the text in the center of the presentation 652 are as specified by the barebones JSON 602, but the other characteristics of the presentation (e.g., the fonts, the layout, the position, the color, etc.) are all specified by the rich template JSON 601.

In some embodiments, the system stores many template CPSs. For each incoming authored CPS and the components therein, it is up to the system to identify a suitable template CPS as the template. Specifically, a template CPS is a suitable template for a component in an authored CPS only if (i) the role of the template is the same as that of the component in the authored CPS and (ii) the list of arguments (i.e., the argument identifiers of the exposed properties) of the template can be found in the target component. In the example of FIG. 6, the JSON 601 is a suitable template for the component in the JSON 602 because the arguments from exposed properties of JSON 601 ("URL" and "title") matches the properties of the JSON 602, and the role of the template JSON 601 ("header") also matches that of JSON 602.

In some embodiments, a template CPS's role and its set of arguments are jointly referred to as the signature of the template. An authored CPS (or a component therein) having the same role and the same property identifiers as the template's set of arguments is a match for the template and vice versa. In some embodiments, the converter in the distribution system encountering an authored CPS would search through its template database (e.g., the template storage 120) for templates with signatures matching that of the authored CPS and apply it to create a richer CPS.

Figure 7:
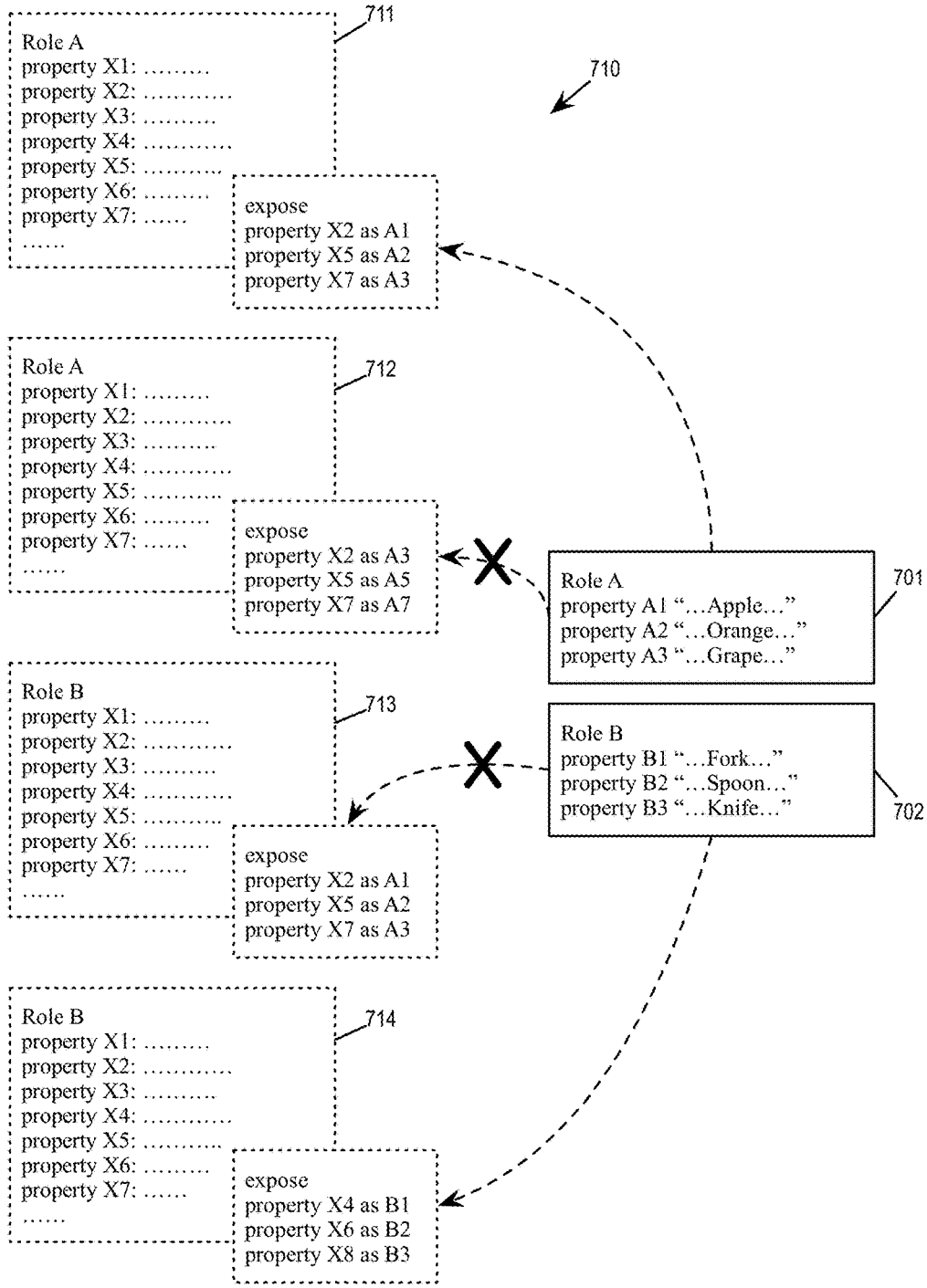
FIG. 7 illustrates two example template signature matching operations for two example authored CPSs.

FIG. 7 illustrates two example template signature matching operations for two example authored CPSs 701 and 702. The CPS 701 has the role "role A" with properties A1, A2, and A3, while the CPS 702 has the role "role B" with properties B1, B2, and B3. The figure also shows a template database 710 with at least four different templates 711-714. The template 711 has the role "role A" and exposes properties X2, X5, and X7 as arguments A1, A2, and A3. The template 712 also has the role "role A" and exposes properties X2, X5, and X7 as arguments A3, A5, and A7. The template 713 has the role "role B" and exposes properties X2, X5, and X7 as arguments A1, A2, and A3. The template 714 has the role "role B" and exposes properties X4, X6, and X8 as arguments B1, B2, and B3.

For the CPS 701, only the template 711 is identified as a matching template for having the matching signature. Other templates either have the wrong role (e.g., templates 713 and 714 have "role B" instead of "role A") or the wrong list of arguments (e.g., templates 712 and 714). Likewise, for the CPS 702, only the template 714 is identified as a matching template for the CPS 702 for having the same role and the same list of arguments.

In some embodiments, it is possible to have multiple matching templates for a component of an authored content. In such instances, some embodiments randomly select and apply one of the matching templates, or rotate the matching templates to provide a variety of appearances or behaviors.

Figure 8:
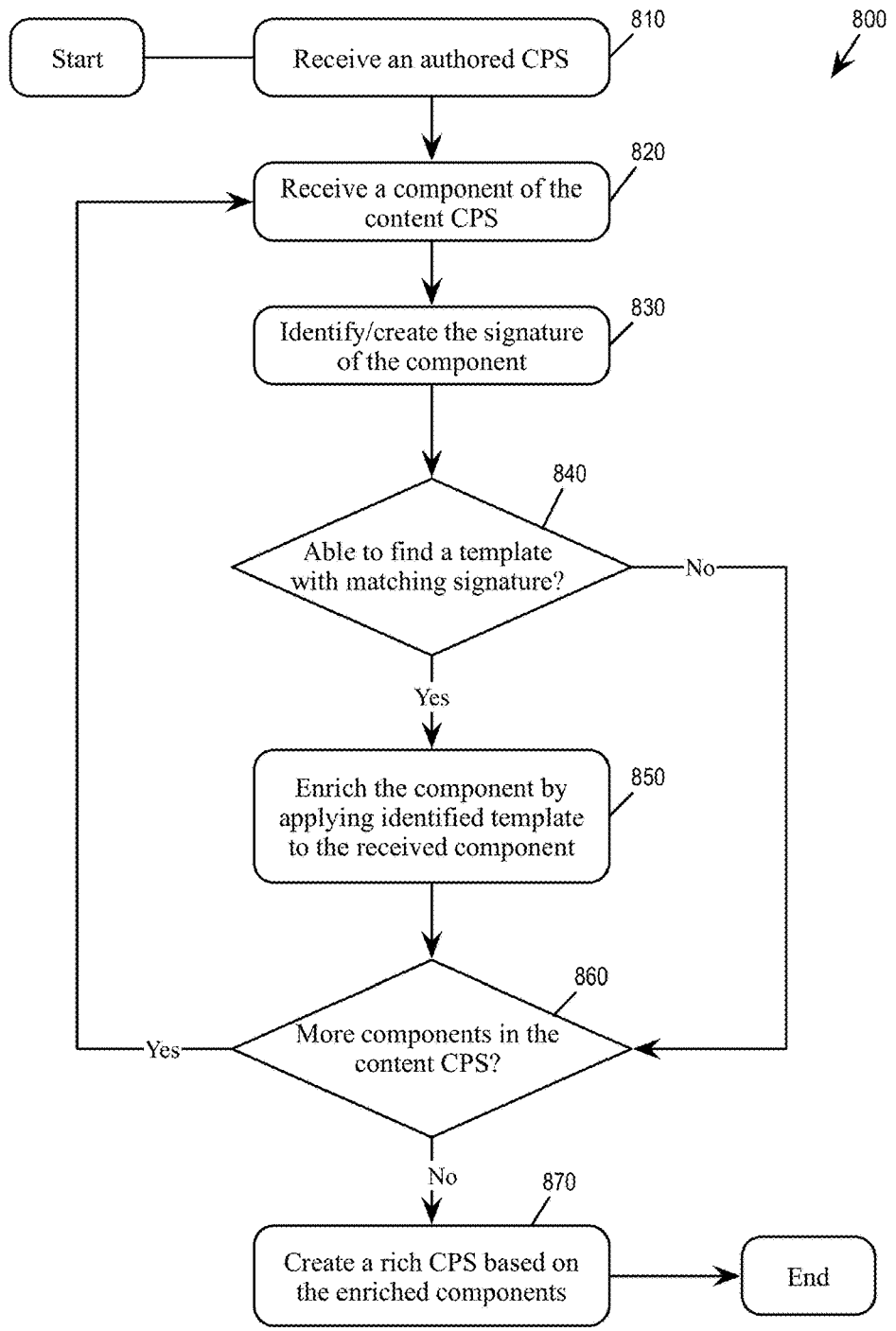
FIG. 8 conceptually illustrates a process for identifying and using templates to create a rich CPS for an authored content presentation.

For some embodiments, FIG. 8 conceptually illustrates a process 800 for identifying and using templates to create a rich CPS for an authored content presentation. In some embodiments, the process is performed by a converter (e.g., the converter 130) in the distribution sub-system 160. The process starts when it receives (at 810) an authored CPS with authored content, which can have very little or no formatting and styling information. The authored CPS has a set of properties that can be used to create a signature for identifying a matching template CPS.

The process then receives (at 820) a component in the authored CPS. In some embodiments, the process applies templates to an authored CPS on a component by component basis, i.e., the process would identify a template for each of the components in the authored CPS. The process then identifies (at 830) a signature for the component for the purpose of identifying a template. In some embodiments, the signature is based on the role of the component and the properties defined for the component.

Next, the process determines (at 840) whether it is able to find a matching template (i.e., a template with the matching signature) for the component. If so, the process proceeds to 850. If not, the process proceeds to 860. Signature matching is described by reference to FIG. 7 above.

At 850, the process enriches the component by applying the identified template to the component. In some embodiments, the process does so by passing the values of properties in the component to the corresponding exposed properties of the template, i.e., to modify the values of the exposed properties with the values from the component of the authored CPS. This operation is described by reference to FIGS. 5 and 6 above.

At 860, the process determines whether there are more components in the authored CPS that has yet to go through template matching. If so, the process returns to 820 to identify a next component in the authored CPS. If not, the process proceeds to 870 to create a rich CPS by combining the authored CPS with its identified matching template CPS. The process 800 then ends.

b. Generating Internal CPS

In some embodiments, the authored CPS 115, the template CPS 125, and the enriched CPS 135 are considered "public" because they are "open" to the users to be modified, stored, and reused. They are written in syntax elements that are documented for human comprehension and manipulation. In some embodiment, they do not refer to low level parameters or constructs for specific device types and are not optimized for delivery to the client devices. To make the public CPS ready for delivery and presentation, some embodiments perform several more optimization and elaboration operations. In some embodiments, these operations introduce additional constructs and syntax that are optimized for machine consumption. In some embodiments, these operations manipulate the structure of CPS in order to make its size smaller. The results of these operations are often not intended for human comprehension or manipulation. The resulting CPS is therefore referred to as "internal" CPS, as it is a CPS that is not open to the public.

Though different types of client devices have their own set of design rules and ultimately require processing that are device-type specific, many of the processing needed for making a CPS ready for presentation are common to all possible client devices. In some embodiments, many or all of these common operations are performed by the distribution sub-system (i.e., 160) during the generation of the internal CPS and before distribution to the client devices themselves. In some embodiments, the creation of the internal CPS also entails performing some operations intended for specific types of devices, because it is more efficient that those operations be performed once at the distribution system rather than being performed on every device of the type.

Figure 9:
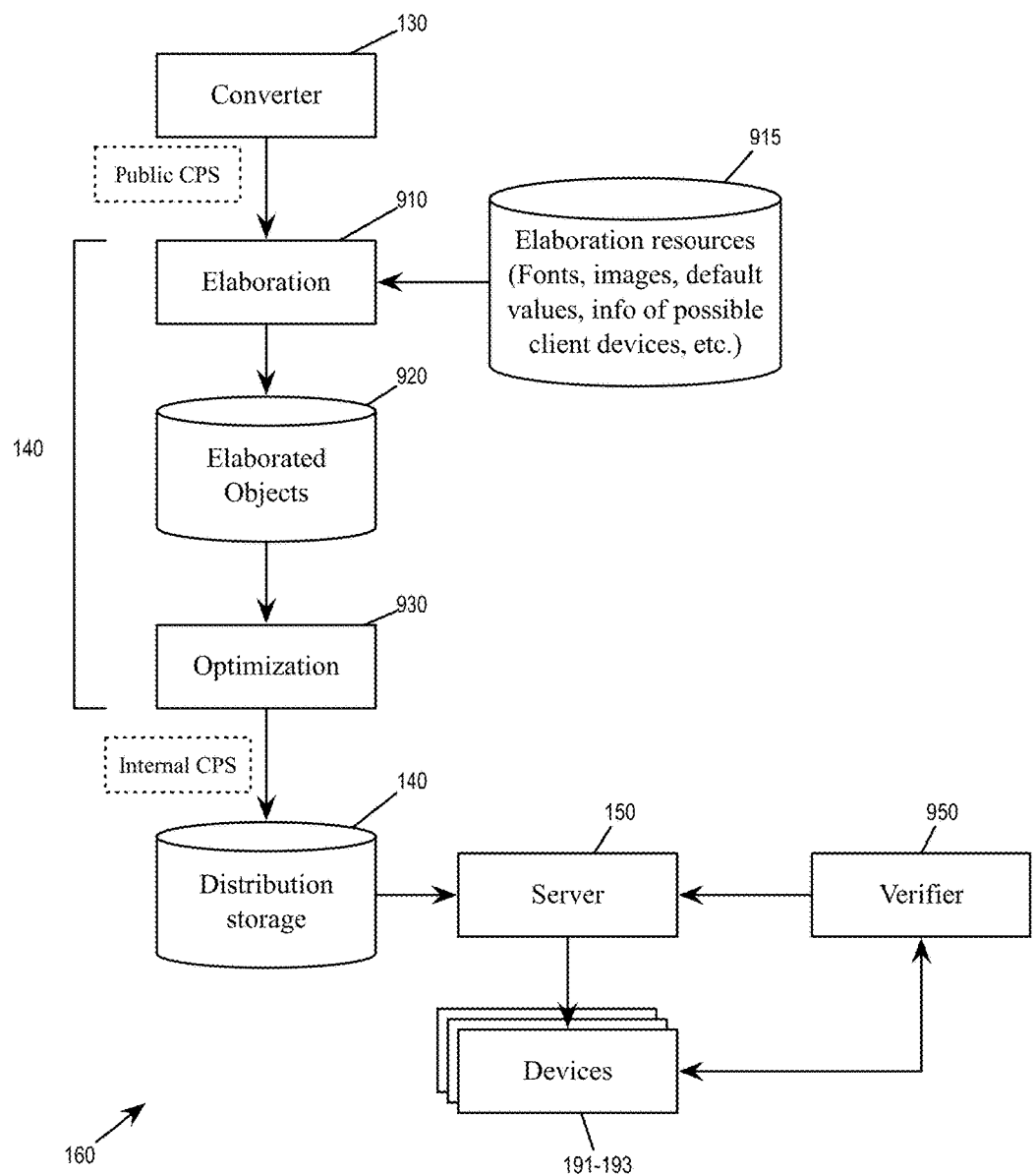
FIG. 9 illustrates the operations that some embodiments perform to convert a public CPS into an internal CPS.

FIG. 9 illustrates the operations that some embodiments perform to convert a public CPS into an internal CPS. The figure illustrates the operational blocks of the distribution sub-system 160 between the creation of the rich CPS by templating and the distribution of the internal CPS to the client devices.

As illustrated, the distribution sub-system 160 includes the converter 130, an elaboration stage 910, an elaborated objects storage 920, an optimization stage 930, the distribution storage 155, and the server 150. The converter 130 is for converting the authored CPS into the rich CPS as described above in Section II.a.

The elaboration stage 910 (part of the elaborator 140) receives public CPS (either a rich CPS from the converter 130 or an authored CPS directly from the publisher 110) and elaborates the objects specified by the public CPS. In some embodiments, each statement in the CPS defining a property or a component (or a property of a component) is regarded as an object by the elaboration stage. In some embodiments, elaborating an object includes filling in default values for properties that are required for presentation but not specified by the public CPS, following references to gather the necessary resources for presentation (fonts, images, media clip, animation image sequences, etc.), and information about different possible types of client devices. The figure conceptually illustrates a storage 915 (elaboration resources) for providing the data needed for the elaboration. The storage 915 can be a storage device in one location, or a collection of storage device distributed across multiple devices in multiple locations that are accessible through a network or Internet (e.g., cloud storage). The elaboration stage 910 also applies at least some of the required processing (image filtering, parental control, etc.) on the gathered resources.

The output of the elaboration stage is stored into an elaborated object storage 920. This storage holds the elaborated version of each object and the resources that are gathered by the elaboration stage. These data in some embodiments can include the default values that are identified, fonts that will be used at client devices, and images resized to different resolutions and sizes based on different client device types, etc.

The optimization stage 930 reads the elaborated objects, optimizes the data structure and writes the optimized result to the distribution storage 155. In some embodiments, the optimizer identifies redundancies and reduces the size of the data structure by e.g., utilizing references, performing compression, etc. In some embodiments, the optimizer restructures the public CPS into structures and syntax that are more readily understood by the client devices. The optimizer then outputs the result as internal CPS to be stored in the distribution storage 155.

The distribution storage 155 stores various internal CPSs for various authored content such as news or magazine articles. When the server receives a request for a particular pace of authored content, it retrieves the corresponding internal CPS from the distribution storage 155 and delivers it to the requesting client device (191-193). In some embodiments, the server 150 would deliver content (internal CPS) only if a verifier 950 in the distribution sub-system 160 has determined that the requesting client device has met the qualifications for the content delivery. In some embodiments, the verifier 950 is an Internet vending mechanism, which verifies whether the authored content is paid for and authenticates whether the proposed receiving client device is indeed the intended recipient of the internal CPS.

Figure 10:
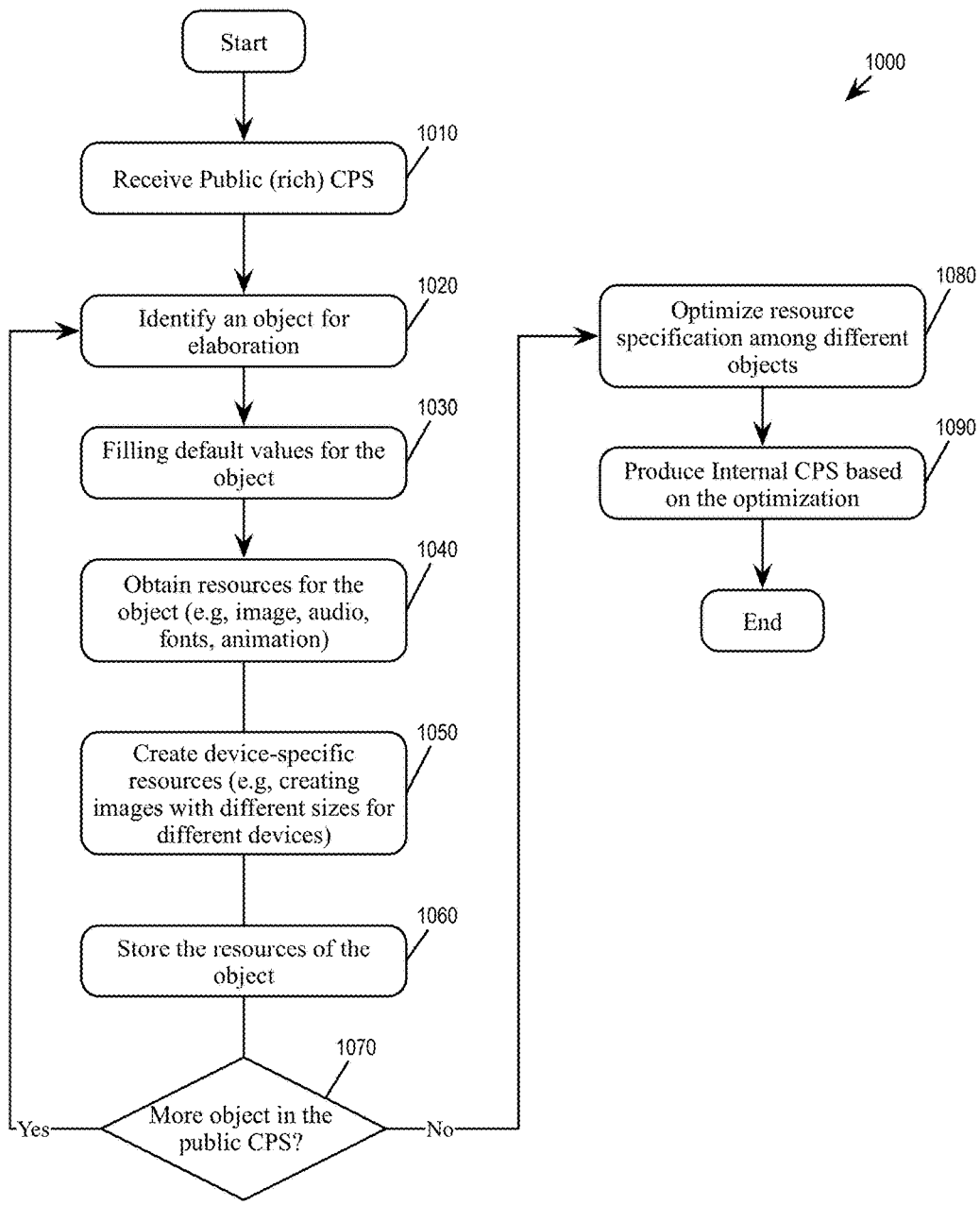
FIG. 10 conceptually illustrates a process for converting a public CPS into an internal CPS.

For some embodiments, FIG. 10 conceptually illustrates a process 1000 for converting a public CPS into an internal CPS. The process is performed by one or more devices participating in the distribution system 160 in some embodiments.

The process starts when it receives (at 1010) a public CPS, which can be a rich CPS from templating or an authored CPS directly from a publisher. The process then identifies (1020) an object in the public CPS for elaboration. Such an object can be a component or a property of the CPS. The process then fills (1030) default values for where such values need to be defined for the identified object in the presentation yet not specified by the public CPS.

Next, the process gathers (at 1040) the resources needed for presenting the identified object, resources such as images, media clips, fonts, etc. The process then creates (1050) device-specific resources for the identified object based on information on the possible types of client devices. In some embodiments, this includes creating multiple versions of an image at different sizes or at different resolutions based on possible display sizes of the client devices. The process then stores (1060) the gathered resources and the created resources of the object into a storage (i.e., the elaboration storage 920).

The process then determines (at 1070) whether there are more objects to be elaborated in the public CPS. If so, the process returns to 1020 to elaborate the next object. Otherwise, the process proceeds to 1080.

At 1080, the process optimizes the elaborated resources stored in the elaboration storage by e.g., identifying redundancies, utilizing references and perform compression. For some embodiments, this operation reduces the size of the resulting internal CPS by eliminating duplicate resources. The process then produces (at 1090) an internal CPS based on the optimized result of the elaboration. In some embodiments, the produced internal CPS is stored in a distribution storage (e.g., 155) for subsequent distribution. The process 1000 then ends.

An internal CPS, once generated, is stored in a distribution storage. A client device running a reader application would make requests for internal CPSs based on the article that it is presenting. Once the request is made for an internal CPS (e.g., of an article), the distribution server (150) delivers the requested internal CPSs to the requesting client device. Upon receiving an internal CPS, the client device performs layout operations to determine the size, shape, and position of the various components.

III. Layout Generation

As mentioned, an internal CPS is an elaborated CPS that is optimized to facilitate delivery to client devices. Each of the client devices is in turn running a reader application for creating a presentation based on the internal CPS, i.e., using the internal CPS as the document definition to the reader application. To keep the size of the internal CPSs small for delivery, some embodiments specify in internal CPSs only information that the client devices cannot decide for themselves, such as the author's intent. To that end, the internal CPS describes components in general terms applicable to all client devices rather than specific terms applicable to only a subset of devices. Consequently, components in an internal CPS of some embodiments specify their layout in coarse terms (e.g., columns instead of display pixels or points), and only in terms of relative position and width but not height. It is up to the client device to determine the actual size, shape, and position of the components in a layout operation based on its own device-specific design rules.

Figure 11:
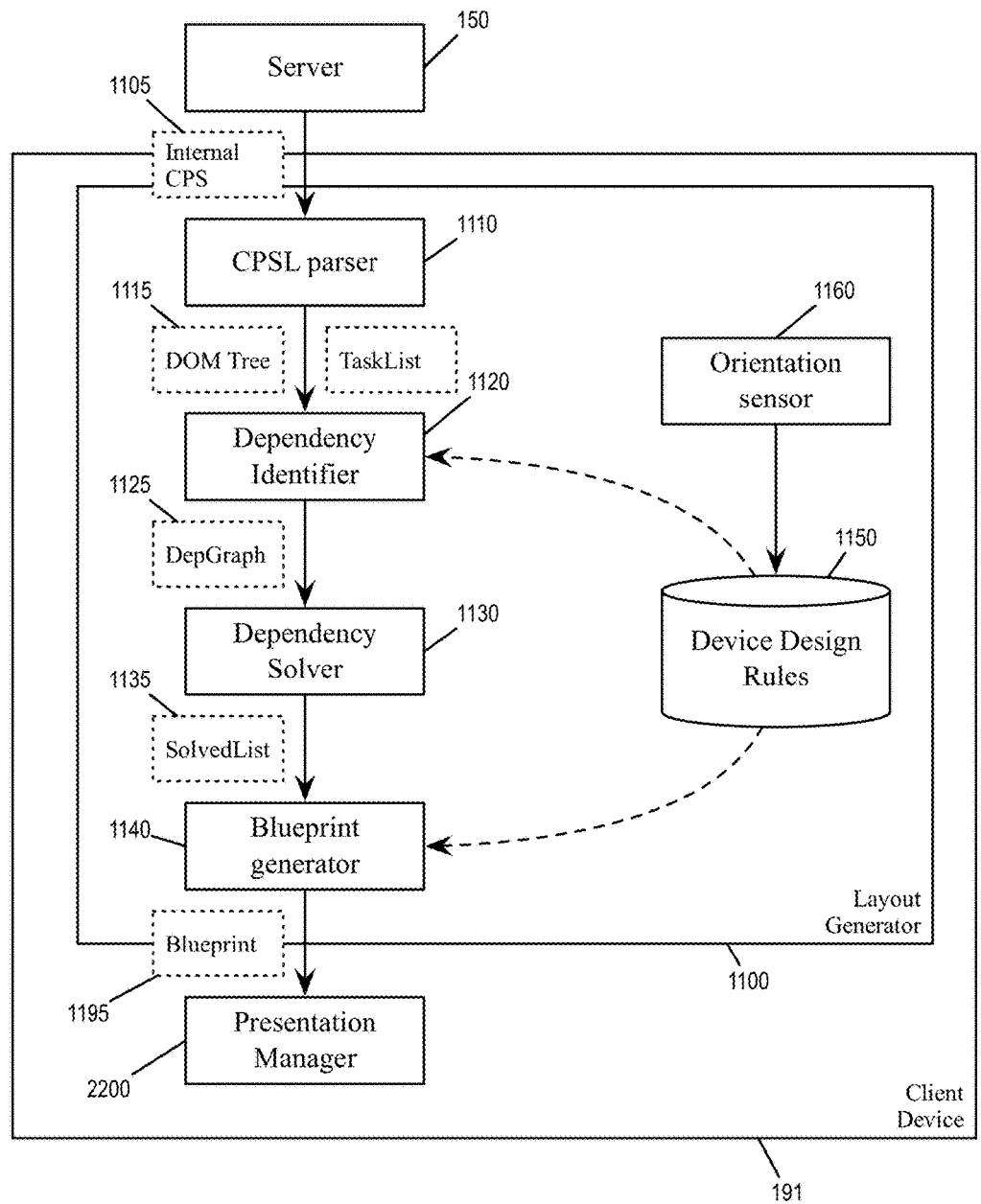
FIG. 11 illustrates the operations performed by a layout generator when laying out a blueprint of the presentation based on a received internal CPS.

In some embodiments, the client device includes a layout generator and a presentation manager. (In some embodiments, the layout generator and the presentation manager are different operations performed by the same reader application running on the client device.) The layout generator determines the shape, size, and position of each component based on information in the internal CPS and finalizes the layout of the component in a blueprint. Each component has a corresponding layout slot in the blueprint that is determined by the layout generator. The presentation manager then renders each component (at the component's layout slot) for presentation according to its finalized layout specified in blueprint. FIG. 11 illustrates the operations performed by a layout generator 1100 when laying out a blueprint of the presentation based on a received internal CPS. The layout generator 1100 is part of the client device 191, which also includes a presentation manager 2200.

The figure illustrates the operational blocks of the layout generator 1100 from the reception of an internal CPS 1105 to the outputting of a blueprint 1195. As illustrated, the layout generator 1100 includes a CPSL parser 1110, a dependency identifier 1120, a dependency solver 1130, and a blueprint generator 1140. The CPSL parser 1110 receives the internal CPS 1105 from the distribution server 150 and the blueprint generator 1140 produces the blueprint 1195 for the presentation manager 2200. In some embodiments, these operational blocks are separate modules of a computing device. In some embodiments, these operational blocks are different operations of a same software program.

The CPSL parser 1100 parses the internal CPS 1105 according to the syntax rules of CPSL and produces an initial DOM (Document Object Model) tree describing the CPS. The DOM tree organizes various objects of the CPS (such as components, layouts, and styles) into interrelated nodes. The dependency identifier 1120 then traverses the DOM tree 1115 to identify the dependencies between the components in the CPS to produce a dependency graph 1125. The dependency solver 1130 then solves the dependency graph 1125 into a solved list 1135 for identifying an order according to which the blueprint generator 1140 should follow when laying out each component (i.e., to determine their finalized/actual shape, size, and position). The blueprint generator 1140 then outputs a blueprint of the CPS that specifies the exact shape, size, and position of each component.

As mentioned, in some embodiments, the layout of the CPS components at a client device is constrained by the design rules of that client device. In some embodiments, the design rule of a client device is specified in accordance with the display dimensions and capabilities of the device. As illustrated, the client device 191 maintains a set of design rules 1150 that are applied during the layout process. Specifically, the design rules 1150 are applied when identifying dependencies of components (at the dependency identifier 1120) and when laying out each component (at the blueprint generator 1140). Some devices have different display dimensions when placed at different orientations (e.g., when being held length-wise horizontally or when being held length-wise vertically). In some embodiments, the device design rules that are being applied is determined by the orientation of the device, for example, based on the output of the client device's orientation sensor 1160.

Figure 12:
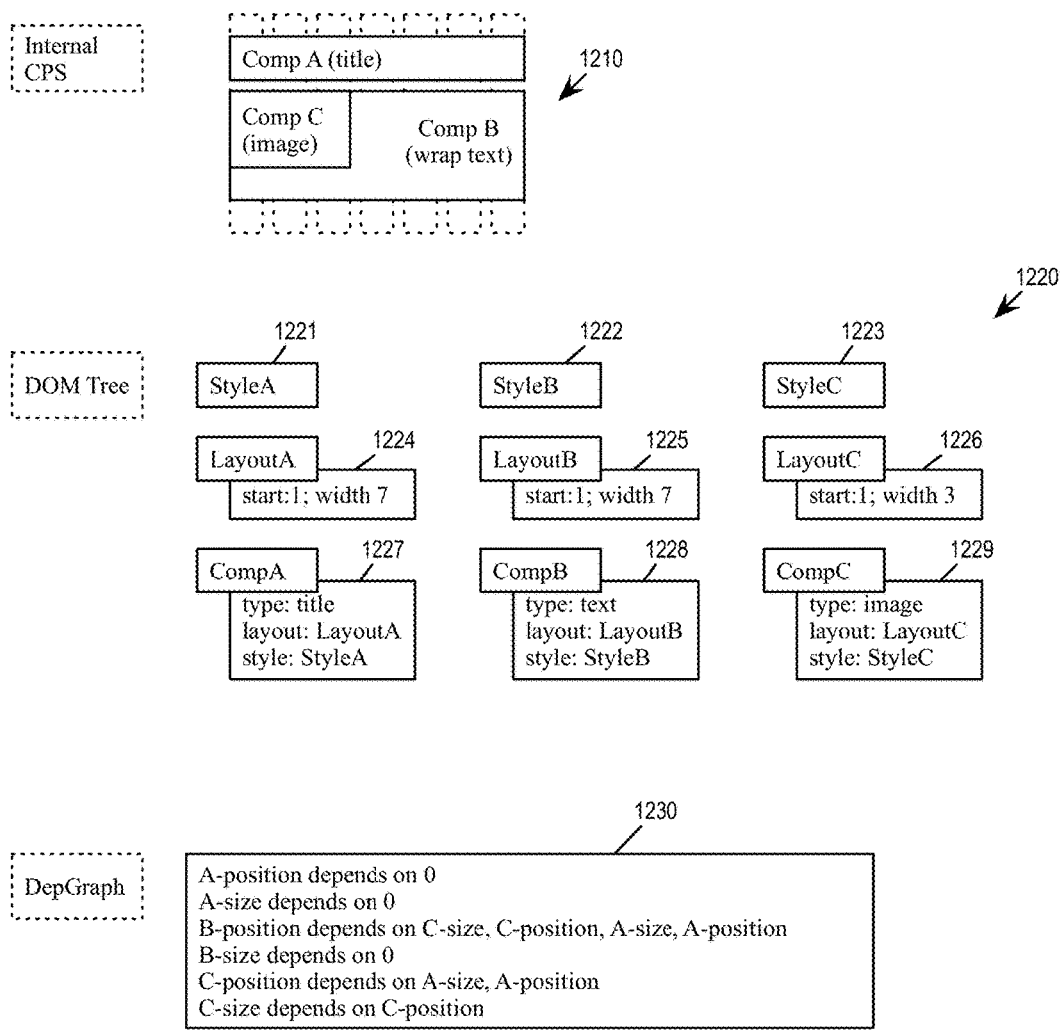
FIG. 12 illustrates an example internal CPS, and its corresponding DOM tree and dependency graph.

FIG. 12 illustrates an example internal CPS 1210, and its corresponding DOM tree 1220 and dependency graph 1230. The internal CPS 1210 specifies three components A, B, and C. The DOM tree 1220 is generated based on the example internal CPS 1210, and the dependency graph 1230 is derived based on the DOM tree 1220.

For each component, the internal CPS 1210 specifies its role, its association, its width, and its horizontal position. The specification of the width and the horizontal position of the component are initial specifications for indicating the publisher/author's intent. In some embodiments, these initial widths and the positions are specified coarsely by referring to columns. The subsequent stages of the layout generation would change the specification of these widths and positions into ones specified by display points or pixels. In some embodiments, those subsequent stages of layout generation can also change the widths and the positions of the components based on the design rules of the device.

In some embodiments, the CPS initially specifies the layout of the presentation in terms of number of columns (or vertical layout sections). For instance, a common design layout uses 7 columns. Each content component or block is assigned to a particular integer number of columns in the layout. For example, an image might span numerous columns (as would its caption text), and body text will often span all of the sections of the layout. In some embodiments, a text block that spans several columns will have each of its lines of text spanning all of the columns (unless the text is flowing around another content component), rather than the text filling up a first column and then continuing at the top of the next column.

In some embodiments, the width of columns is kept nearly constant across different devices, and different devices in different orientations may use different numbers of columns to present the same authored content. For example, a tablet in landscape orientation will have more columns than the same tablet in portrait orientation. A smart phone in either orientation will have fewer columns than a tablet, while a laptop or a desktop monitor will have more columns than a tablet.

As illustrated, component A is specified to occupy the full width of the screen, which is 7 columns. Component B is also specified occupy the full width of the screen, but as wrap around text of Component C. Component C is specified to occupy 3 columns, starting at the first column. None of the component has a specification for height, as those will be determined in later stages of the layout generation process according to ordering established by dependency.

As mentioned, components in an internal CPS specify their roles. In this case, component A is the title of the article, component B is the body text of the article, while component C is an image of the article. In some embodiments, the roles of component will be used to determine the dependencies of the components. For example, being the title of the article, component A will be placed above components B and C. This means that the height of component A will decide the placement of components B and C. The position of components B and C will therefore depend on the position and the size of component A, and the positions of components B and C cannot be determined until the position and the size of component A is determined. Likewise, since component B is text that wraps around the image component C, the position of B cannot be determined until the position and the size of C is determined, i.e., the position of B depends on component C's position and size. The size of component C is dependent on the position of component C, because component C is an image that can be placed either close to the edge of display (constrained to a smaller size) or far from the edge of the display (allowed to be larger). These dependencies are captured by the dependency graph 1230.

In order to facilitate the identification of dependencies, some embodiments process the internal CPS 1210 and generate the DOM tree 1220. The DOM tree decomposes the internal CPS 1210 into objects. As illustrated, the DOM tree 1220 includes objects 1221-1229, where objects 1221-1223 are style specifications, objects 1224-1226 are different sets of initial layout specifications (in terms of columns), and objects 1227-1229 are components of the internal CPS 1210. The objects of the DOM tree refer to each other, specifically, component objects 1227-1229 refers to the layout objects 1224-1226 and the styles objects 1221-1223. By decomposing the internal CPS 1210 into the DOM tree 1220, the dependencies between the sizes and positions of the components can be more readily identified.

In some embodiments, the layout dependencies of components are also determined by their associations, or anchoring. In some embodiments, when a first component is associated with or anchored to a second component, the layout generator would align the first component with the second component. This type of alignment necessarily means that the position of the first component depends on the position of the second component. In some embodiments, a component can be explicitly anchored to another component in the CPS by explicit statements in CPSL (such as by a property definition in a component). In some embodiments, such association or anchoring is inferred from initial position specification provided by the internal CPS.

Figure 13A:
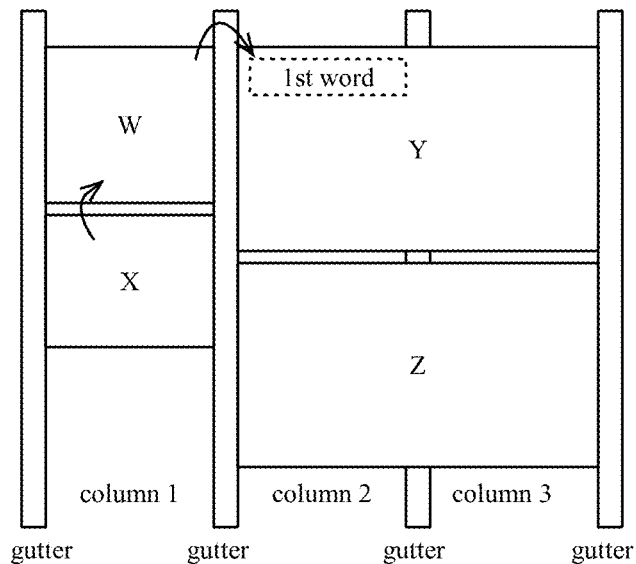
FIG. 13a illustrates an example dependency identification based on associations inferred from initial placements in the internal CPS.

FIG. 13*a* illustrates an example dependency identification based on associations inferred from initial placements in the internal CPS. An internal CPS provides initial specification position and size for 4 components: W, X, Y, and Z. The component W is placed in column 1 and nearly aligned with component Y in columns 2 and 3. The component X is placed right below component W. The layout generation process therefore associates component W with component Y and associates component X with component Y. This means the position of component X is dependent on the position and size of component W, and the position of component W is dependent on the position of component Y.

Figure 13B:
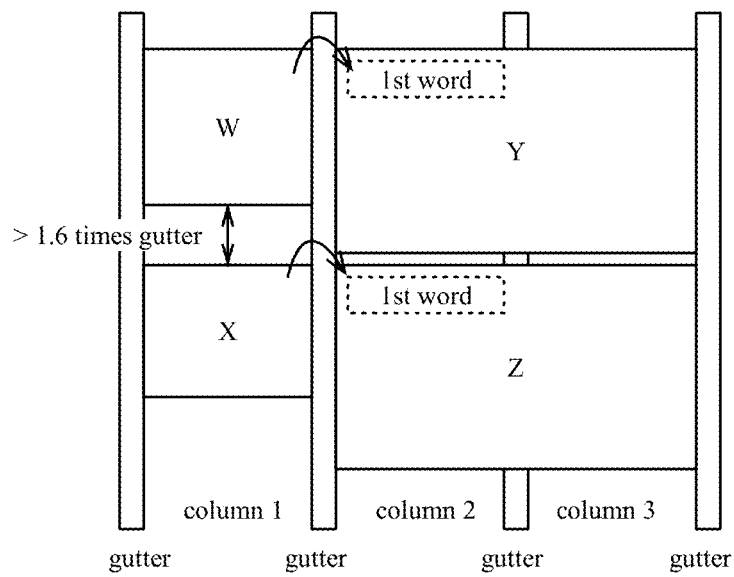
FIG. 13b illustrates another example of dependency identification based on inferred associations.

FIG. 13*b* illustrates another example of dependency identification based on inferred associations. Like FIG. 13*a*, an internal CPS provides initial specification for components W, X, Y, and Z, and W is placed nearly in alignment with Y. Component X is placed beneath component W, but at a separation that is greater than a certain threshold. In some embodiments, this threshold is defined in terms of gutter width (1.6 times in this example; in some embodiments, columns are separated by gutters as illustrated.) In this example, since component X is placed too far below component W (separation greater than the threshold), it is no longer associated with component W. It is instead associated with component Z, with which it is nearly aligned. Since component Z is placed beneath component Y, the layout generator would identify the position of X as dependent on position of Z, while the position of Z is dependent on the position and the size of Y.

Figure 14A:
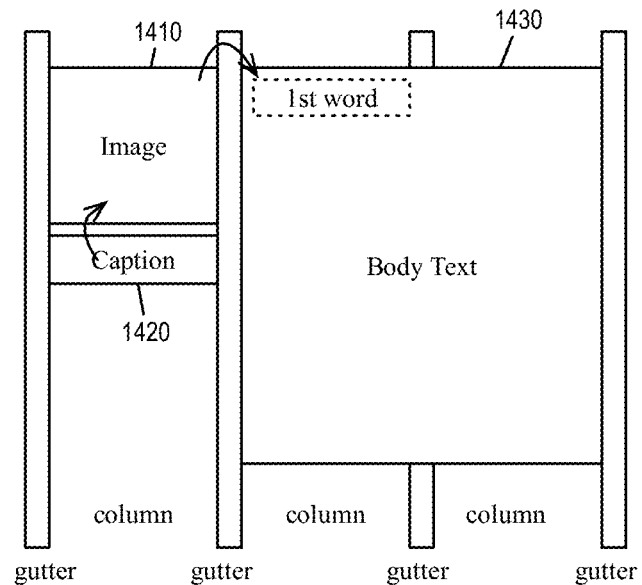
FIG. 14a illustrates an example dependency identification based association inferred from roles.

In addition to inferring association and dependencies based on initial placement, some embodiments infer association based on component's roles. FIG. 14*a* illustrates an example dependency identification based association inferred from roles. In this example, the internal CPS specifies an image component 1410, a caption component 1420, and a body text component 1430. The internal CPS initially specifies the image 1410 to be aligned with the body text 1430, and the caption is placed beneath the image. The layout generator in some embodiments therefore associates the caption 1420 with the image 1410 and the image 1410 with the start of the body text 1430. In this instance, the caption's association with the image is established by their roles. Consequently, the position of the caption 1420 is dependent upon the position and the size of the image 1410, while the position of the image 1410 is dependent upon the position of the body text 1430.

Figure 14B:
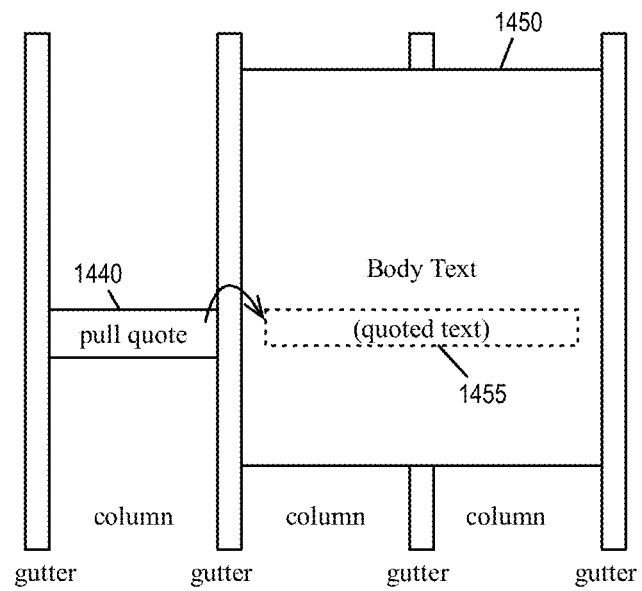
FIG. 14b illustrates another example dependency identification based on association inferred from roles.

FIG. 14*b* illustrates another example dependency identification based on association inferred from roles. In this example, the internal CPS specifies a pullquote component 1440 and a body text component 1450. As mentioned, a pullquote is a repeat of text in the body text for emphasis. Some embodiments therefore would align the pull-quote 1440 with it source quoted text 1455 within the body 1450. The position of the quoted text within the body 1450 is proportional to the overall size of the body 1450 (which is determined by the font and the length of text in the body), consequently, the position of the pull-quote 1440 is dependent upon the position and size of the body text 1450.

As mentioned, the client device in some embodiments applies device-specific design rules during the layout generation process. These design rules are enforced to ensure that the resulting blueprint would result in a good looking presentation for the specific display dimensions of the client device. For example, design rules for smaller devices would apply its design rules to ensure that the presentation would fit in its smaller display screen while maintain a beautiful professional appearance. These rules are also dependent on the roles of the component. For example, in some embodiments, texts are resized according to different resizing functions based on roles (e.g., header vs. bodytext). Some rules require that components with certain roles must be certain minimum width, while components with a different role may have a different minimum width.

Figure 15:
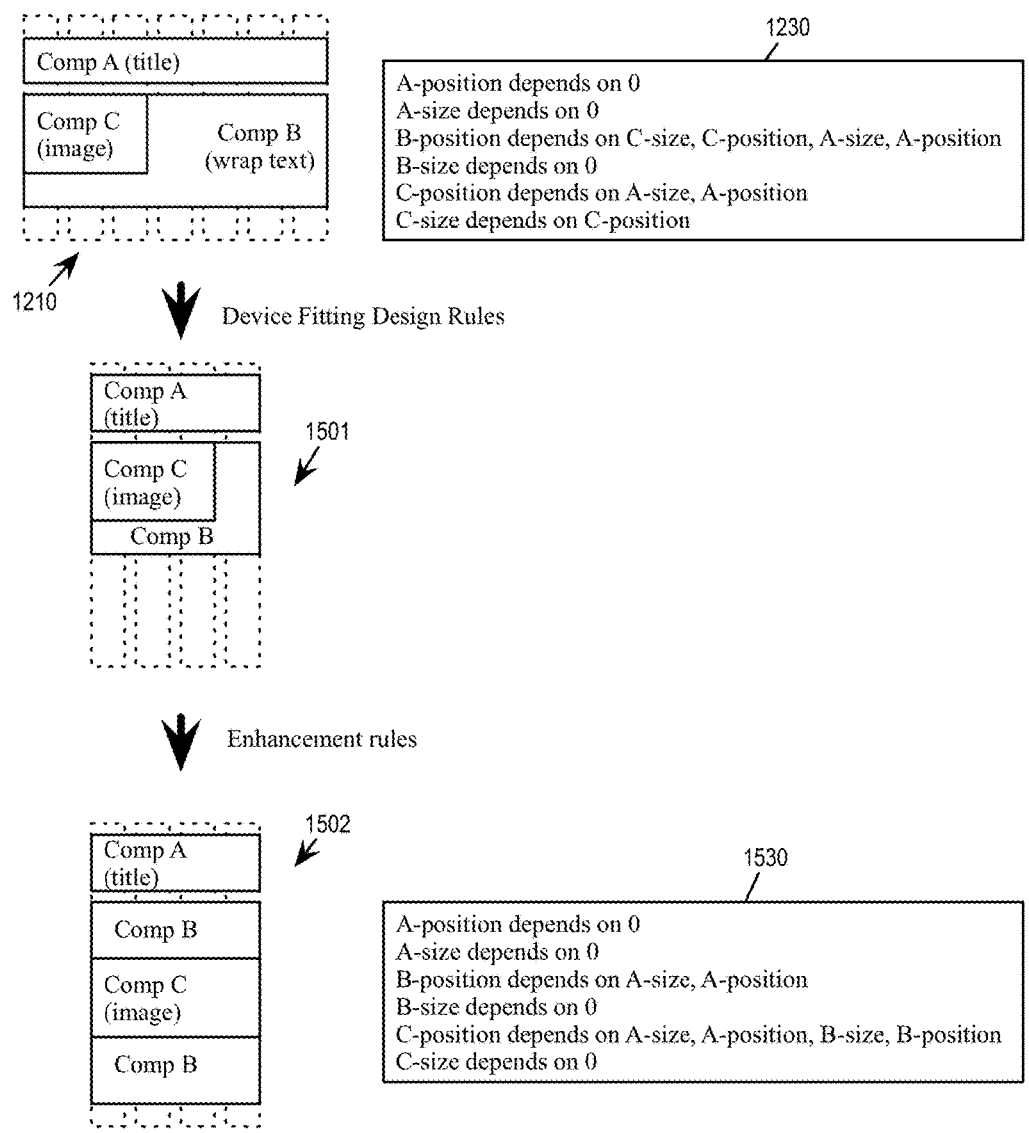
FIG. 15 illustrates how constraints of device design rules affect layout, and hence dependencies of components of an internal CPS.

In some embodiments, the application of such rules changes the positions of some components as well as the alignment between components. In some embodiments, such rules change the dependency between the positions and the sizes of the different components. FIG. 15 illustrates how constraints of device design rules affect layout, and hence dependencies of components of an internal CPS. The example is based on the initial layout specified by the internal CPS 1210 of FIG. 12.

As illustrated, the internal CPS 1210 specifies the initial sizes and positions of components A (title), B (body text), and C (image) based on a 7 column display. However, the internal CPS is received by a smaller client device having only four columns across (e.g., a smart phone in horizontal orientation). The dependencies between the sizes and positions of the components are shown in the dependency graph 1230.

The figure shows two altered layouts 1501 and 1502 due to the application of the design rules. The first altered layout 1501 shows the application of a first set of design rules that constrict the components to a 4-column wide layout of the client device. In this instance, both component A and component B are narrowed to fit the display.

The second altered layout 1502 shows the application of design rules that are specified to ensure that the presentation would look visually pleasing in the 4-column wide display of the client device. The first altered layout 1501, though would fit successfully into the client's 4-column wide display, is not considered professional looking according to a second set of design rules of the client device. Specifically, there is a design rule that require certain minimum font size for (the component with the role) bodytext and forbid the body text of an article to start with just one column in order to avoid rows with only one word. Consequently, the layout generator applies a second set of design rules that lets both component B (bodytext) and component C (image) span across the screen, while placing the component C image in the middle of the component B bodytext. This allows the presentation to use sufficiently large font size for body text while avoiding single word rows.

The application of the design rules as illustrated in FIG. 15 alters the dependency between the positions and sizes of the components as shown in an altered dependency graph 1530. For example, component B's position no longer depend on component C's size and position, but component C's position now depends on component B's size.

Figure 16:
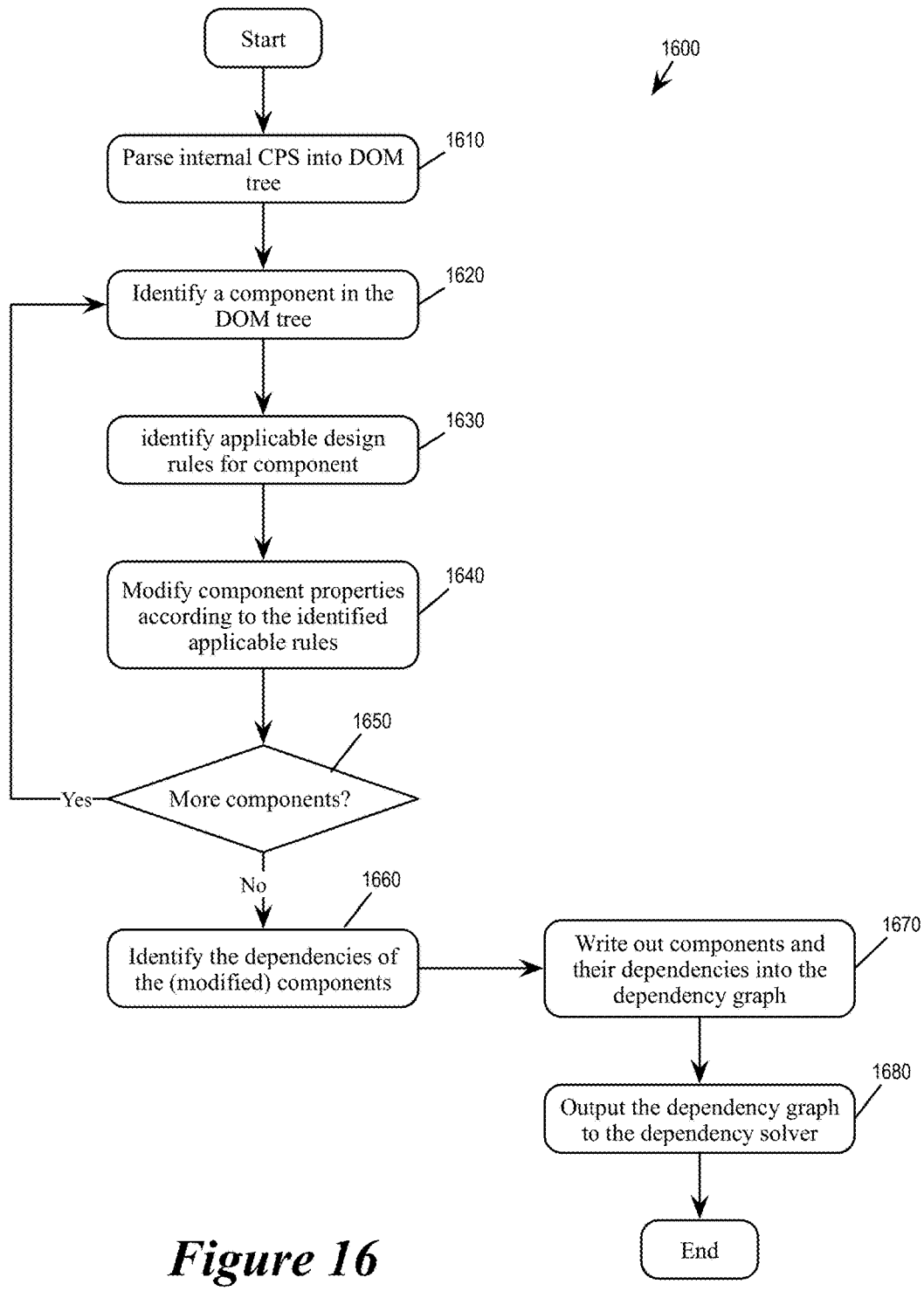
FIG. 16 conceptually illustrates a process for identifying dependencies between the sizes and the positions of the components from an internal CPS.

For some embodiments, FIG. 16 conceptually illustrates a process 1600 for identifying dependencies between the sizes and the positions of the components from an internal CPS. In some embodiments, this process is performed by the layout generator 1100, which is part of the reader application running on the client device.

The process starts when it receives an internal CPS. The process then parses (at 1610) the received internal CPS into a DOM tree by converting objects in the internal CPS into nodes of the DOM tree. In some embodiments, this operation is performed by the CPSL parser operational block 1110 of the layout generator 1100.

The process then identifies (at 1620) a component in the DOM tree and identifies (at 1630) the applicable device-specific design rules for the component. Such identification of rules in some embodiments is based on the role or the type of the component. The process then modifies (at 1640) the component's property based on the identified applicable rule. Such modification can include alterations to font, font size, width, position, color, or other properties/attributes of the component. The process then determines (at 1650) if there are more components in the DOM tree yet to be examined against design rule. If so, the process returns to 1620 to examine another component against the design rules. Otherwise the process proceeds to 1660.

At 1660, the process identifies the dependencies of the components in the DOM tree based on the modifications made due to application of the design rules. The process then writes (1670) out the identified dependencies of the positions and sizes of the components in a dependency graph (such as 1230 and 1530) and outputs (at 1680) the dependency graph for the dependency solver. The process 1600 then ends. In some embodiments, the operations 1620 through 1680 are performed by the dependency identifier 1120 of the layout generator 1100.

As mentioned, the size and the position of components as specified by the internal CPS are only preliminary. It is coarsely specified in terms of columns rather actual display points or pixels, and it does not specify the height of the components. The layout generator therefore has to determine the true position, width/height/shape of the component in terms of display points or pixels. However, since the size and position of a component often depend on the size and/or position of other components, the laying out of a component (i.e., the determination of true position/width/height/shape of the component) cannot take place until the sizes and/or positions of those components that it depend on have been determined. In other words, the layout of components needs to occur in an order that is sorted according to the dependencies between the components. To determine such a sorted order, some embodiments create a dependency graph and use the dependency graph to solve for the order by which the layout of components is to follow.

In some embodiments, the dependency graph is a list of items, where each item corresponds to either to the size of a component or the position of a component. (In other words, each component has two corresponding members in the list: its size and its position). Some embodiments sort the items of the dependency graph into a solved list, which is in an order that when followed, allows that the layout of components to be a linear (i.e., non-iterative) process. Specifically, the determination of the position of a component does not take place until all of its dependencies have been determined, and likewise for the determination of the size of a component.

In some embodiments, the items of the dependency graph are solved by using a stack. The items of the dependency graph are placed in an original, unsorted list. The items in the unsorted list would enter the stack in order. Each item at top of the stack would move on to the sorted/solved list if it has no dependency or if all of its dependencies are already in the sorted/solved list. Conversely, an item having dependencies to items in the unsorted original list would stay in the stack (and have other items pushed on top of it) until all of its dependencies have moved onto the sorted/solved list and is on top of the stack (so can be popped out of the stack).

Figure 17A:
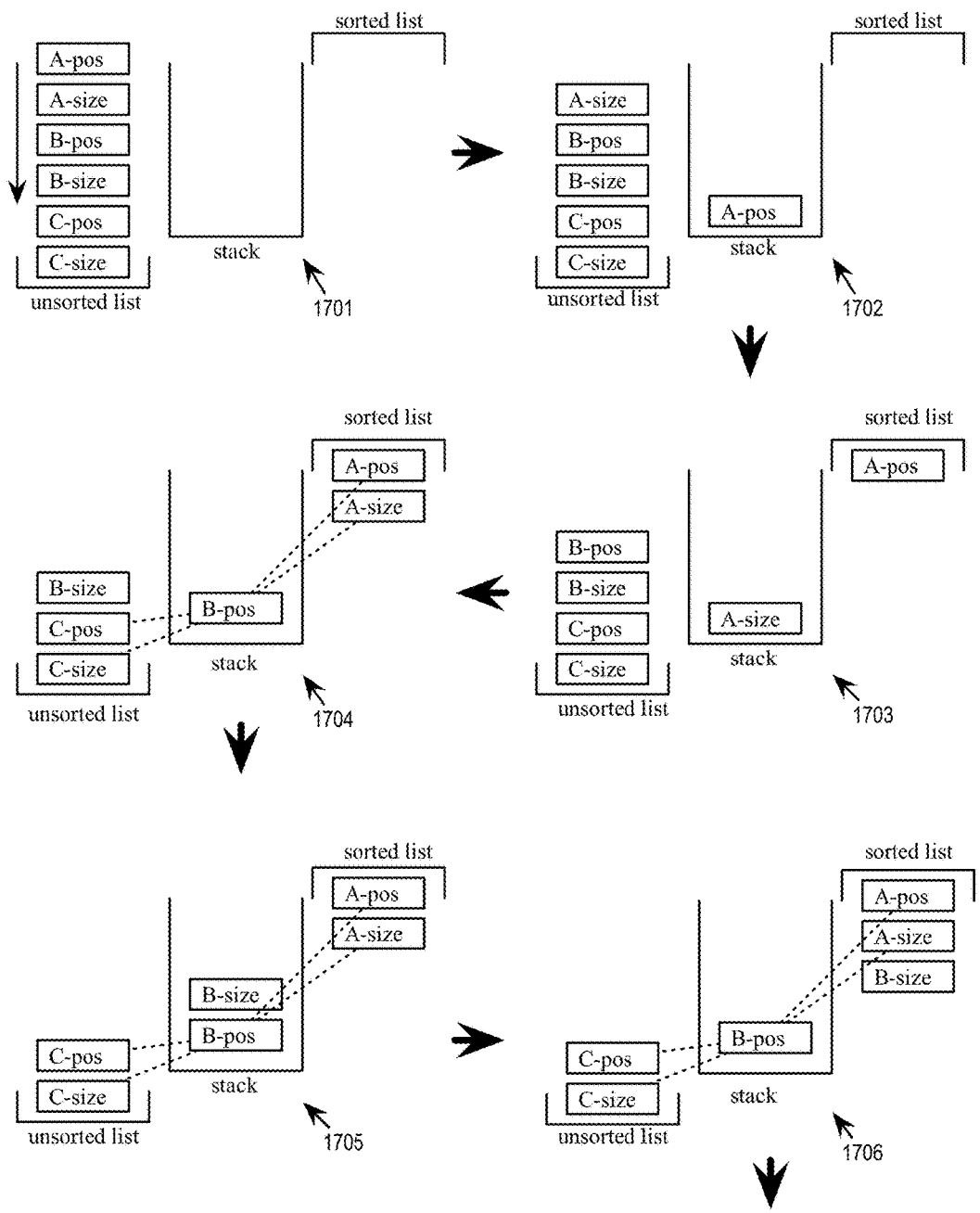
FIGS. 17a-b illustrate using a stack to establish a sorted list according to dependencies between sizes and positions of the components in an internal CPS.
Figure 17B:
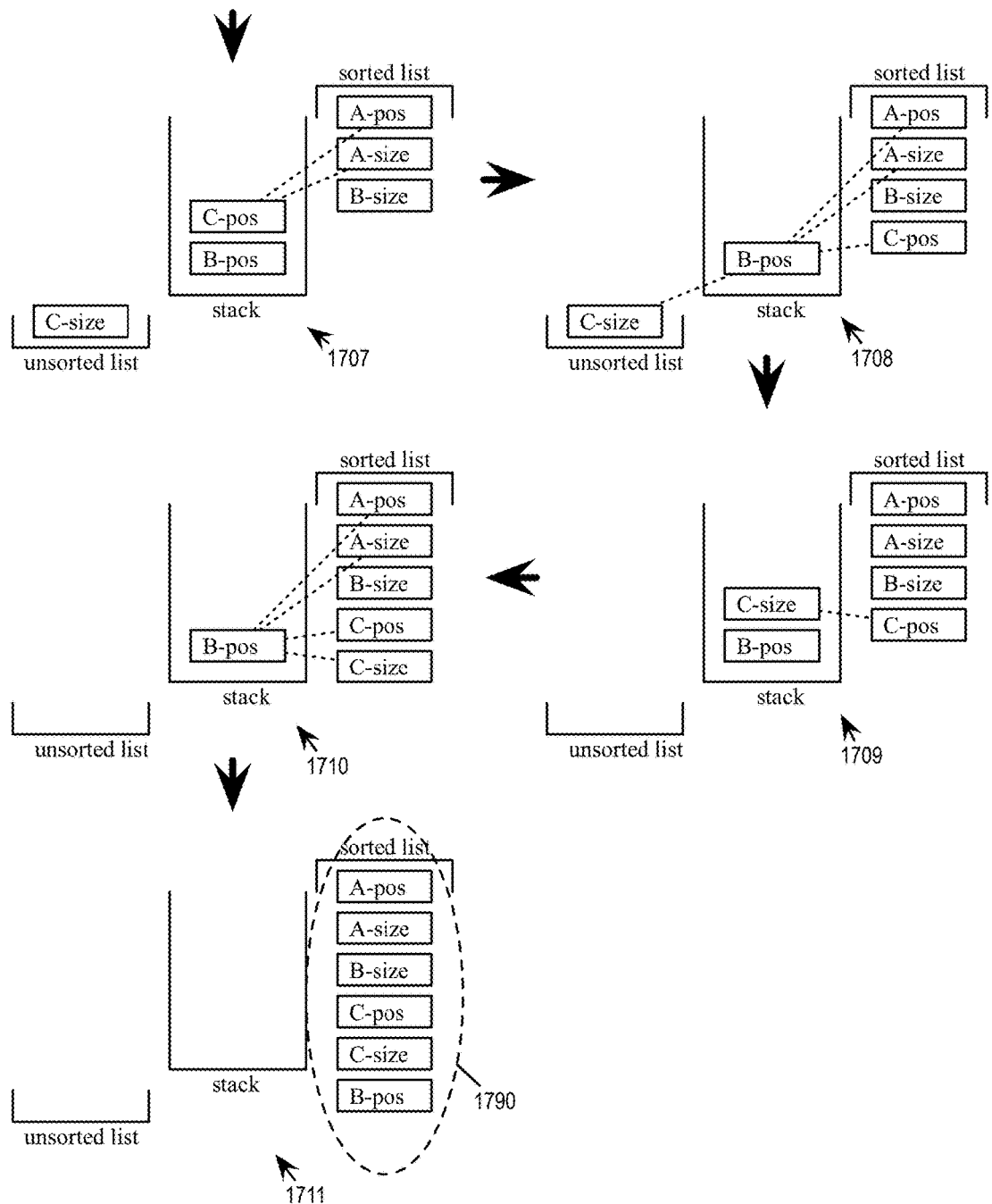

FIGS. 17a-b illustrate using a stack to establish a sorted list according to dependencies between sizes and positions of the components in an internal CPS. The Figure illustrates an example based on the dependency graph 1230 of FIG. 12. In other words, this is based on a dependency graph having six items that corresponds to the positions and sizes of components A, B, and C of FIG. 12. The sorting operation is illustrated in eleven stages 1701-1711.

At the first stage 1701, all of the six items (A-position, A-size, B-position, B-size, C-position, C-size) of the dependency graph 1230 are in an unsorted list. In some embodiments, this ordering merely reflect the ordering established by the CPSL parser when generating the DOM tree 1220 and have no particular significance. The stack and the sorted list are both empty.

At the second stage 1702, the A-position item is pushed into the stack. However, since A-position has to dependency, it is popped out and placed into the sorted list immediately. At the third stage 1703, A-position has joined the sorted list while A-size is pushed into the stack. Again, since A-size has no dependency, it is also popped out and placed into the sorted list immediately.

At the fourth stage 1704, A-size has joined the sorted list beneath A-position. B-position has been pushed into the stack. B-position has dependencies to A-position, A-size, C-position and C-size. Since C-position and C-size are still in the unsorted list, B-position must remain in the stack until C-position and C-size have moved onto the solved list.

At the fifth stage 1705, B-size has been pushed into the stack, since B-size has no dependency, it is popped out immediately. At the sixth stage 1706, B-size has joined the sorted list following A-size. B-position is once again at top of stack following the pop of B-size. However, since B-position still has dependencies in the unsorted list (i.e., C-position and C-size), it must remain in the stack.

At the seventh stage 1707, C-position has been pushed into the stack. C-position depends on A-position and A-size. Since A-position and A-size are already in the sorted list, C-position is free to be popped out of stack. At the eighth stage 1708, C-position has joined the sorted list below B-size, and B-position is once again at top of stack following the pop of C-position. However, since B-position still has dependencies in the unsorted list (i.e., C-size), it must remain in the stack.

At the ninth stage 1709, C-size has been pushed into the stack. C-size depends only on C-position, and C-position is already in the sorted list. Consequently, C-size is immediately popped off the stack. At the tenth stage 1710, C-size has joined the sorted list under C-position. B-position is once again at the top of the stack. At this stage, all of B-position's dependencies have joined the sorted list (i.e., A-position, A-size, C-position, and C-size). It is therefore finally free to join the sorted list.

At the eleventh and final stage 1711, all of the items in the original unsorted list have joined the sorted/solved list in an order that is established according to the identified dependencies. The sorted list is then outputted as an ordered list 1790 for the layout generator. The layout generator in turn uses the ordering to determine the actual position, size, and shape of each component.

Figures 18, 19:
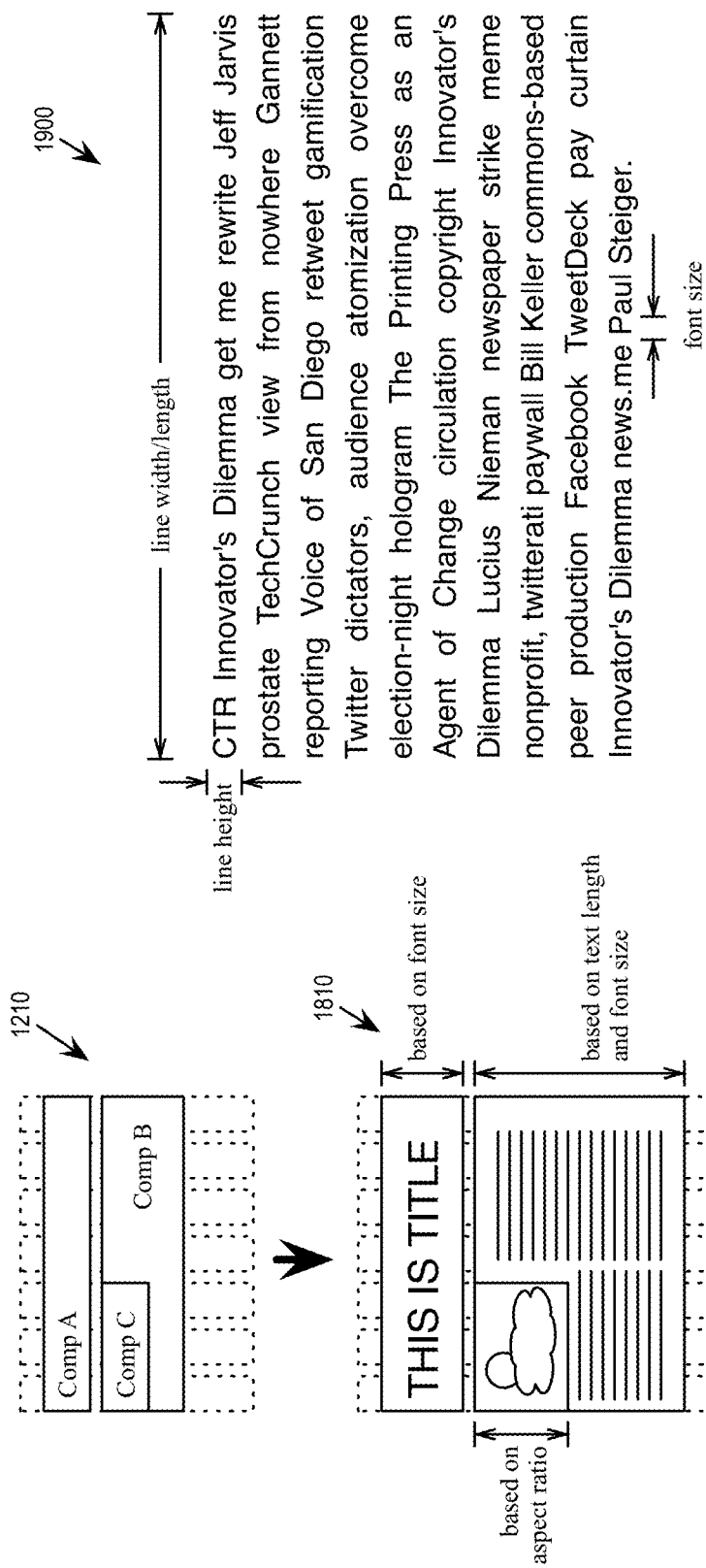
FIG. 18 illustrates the generation of blueprint by finalizing the lay out of the components of the CPS.
FIG. 19 illustrates the determination of the size of an example component.

FIG. 18 illustrates the generation of blueprint by finalizing the lay out of the components of the CPS. The figure illustrates the layout of the components of the internal CPS 1210 (title components A, image component B, and bodytext component C) into a blueprint 1810. In some embodiments, finalizing the layout of a component determines its actual position, shape, and size in terms of display points or pixels.

Determining the finalized layout of the components follows an order established by the order list 1290, which is sorted from the dependency graph 1230. According to this ordering, the layout generator determines the finalized position and size of each component. In other words, the determination of layout will be done in the order of: (from first to last) component A's position, component A's size, component B's size, component C's position, component C's size, and component B's position.

Component A's position is determined based on the specification of the internal CPS (or the DOM tree).

Component A's size is determined based on the font size and its text length (longer text length and larger font size would result in larger size for component A).

Component B's size is determined based on its font size and text length.

Component C's position is determined based on A's position and A's size, as component C is an image that is below the title component A. Since A's position and A's sizes are now known, C's position can also be determined.

Component C's size is determined based on its own width and aspect ratio. The size is also limited by the component's position.

Component B's position is determined based on the image component C's position and size, as the component B is bodytext that wraps around the image. Component B's position is also dependent on A's position and size, as B is bodytext that is placed beneath the title component A. Once the position and the size (and shape) of each component has been determined, the layout generator produces a blueprint that describes the finalized position and the dimensions of each component in terms of display pixels or points.

FIG. 19 illustrates the determination of the size of an example component 1900. The component 1900 is a text component (e.g., bodytext). The size of the component is based on its line width, its line height, and its font size. As mentioned, the internal CPS only provides an initial specification of the width in terms of columns. Its ultimate height and shape is determined when other parameters such as line height and font size become known, as larger font size and taller line height would result in larger component size as text wraps.

In some embodiments, the layout of components (i.e., the generation of blueprint) is also constrained by the design rules of the device. For a text component, enforcement of a design rule may affect the component's size and position based on the placement of the text and/or the other components (e.g., image) that the text wraps around.

Figure 20:
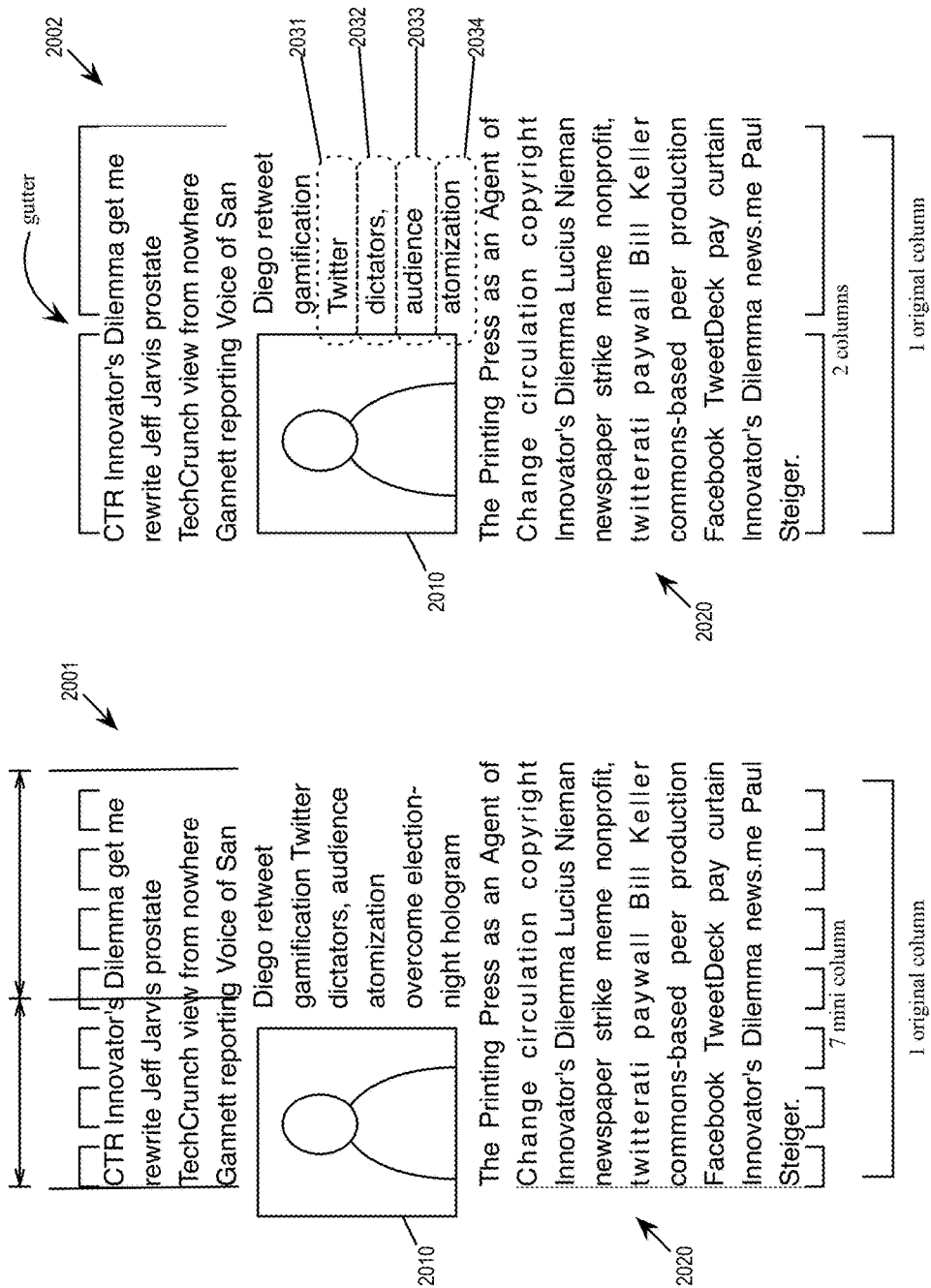
FIG. 20 illustrates some example design rules that affect the layout of text components.

FIG. 20 illustrates some example design rules that affect the layout of text components. Specifically, the figure illustrates some design rules regarding the placement of small images surrounded by bodytext. These images are narrower than one column. For client devices having smaller displays that are only one or two columns wide, the layout generator in some embodiments would stretch the image to span the width of the display rather than having the narrow display be divided between text and the small image. However, some embodiments would let the small image maintain its small size so to split the column between the small image and the wrap text. However, the layout generator of the device would enforce design rules to ensure that the wrap text remain professional looking.

FIG. 20 illustrates two layouts or (blueprints) 2001 and 2002 for a small image 2010 and a wrap text 2020. The layout 2001 divides the original column of the device into 7 mini-columns. The layout generator then places the components according to their original CPS specification (i.e., as if the small display device has 7 columns). In this instance, the small image 2010 spans three mini-columns, while the wrap text occupy four mini columns, letting a mini gutter separating the text 2020 and the image 2010. The layout 2002 divides the original column into two half-columns. The small image 2010 spans one half-column while the wrap text 2020 occupies the other half-column.

Some embodiments provide design rules for ensuring that the display of a small image would not cause the wrap text to look ugly. For example, design rules in some embodiments require that number of words per line be always be more than a certain number, as having too many lines with a single word would make the text look sparse and uneven (such as lines 2031-2034). Design rules in some embodiments therefore forbid single word lines or allow only a limited number of single word lines. To enforce these design rules, some embodiments choose a layout (e.g., 7 mini-columns vs. 2 half-columns) that would result in fewer one-word lines. Some embodiments would make the gutter smaller, or use a smaller font size, or use a smaller margin in order to fit more words per line and to reduce the number of one-word lines.

Figure 21:
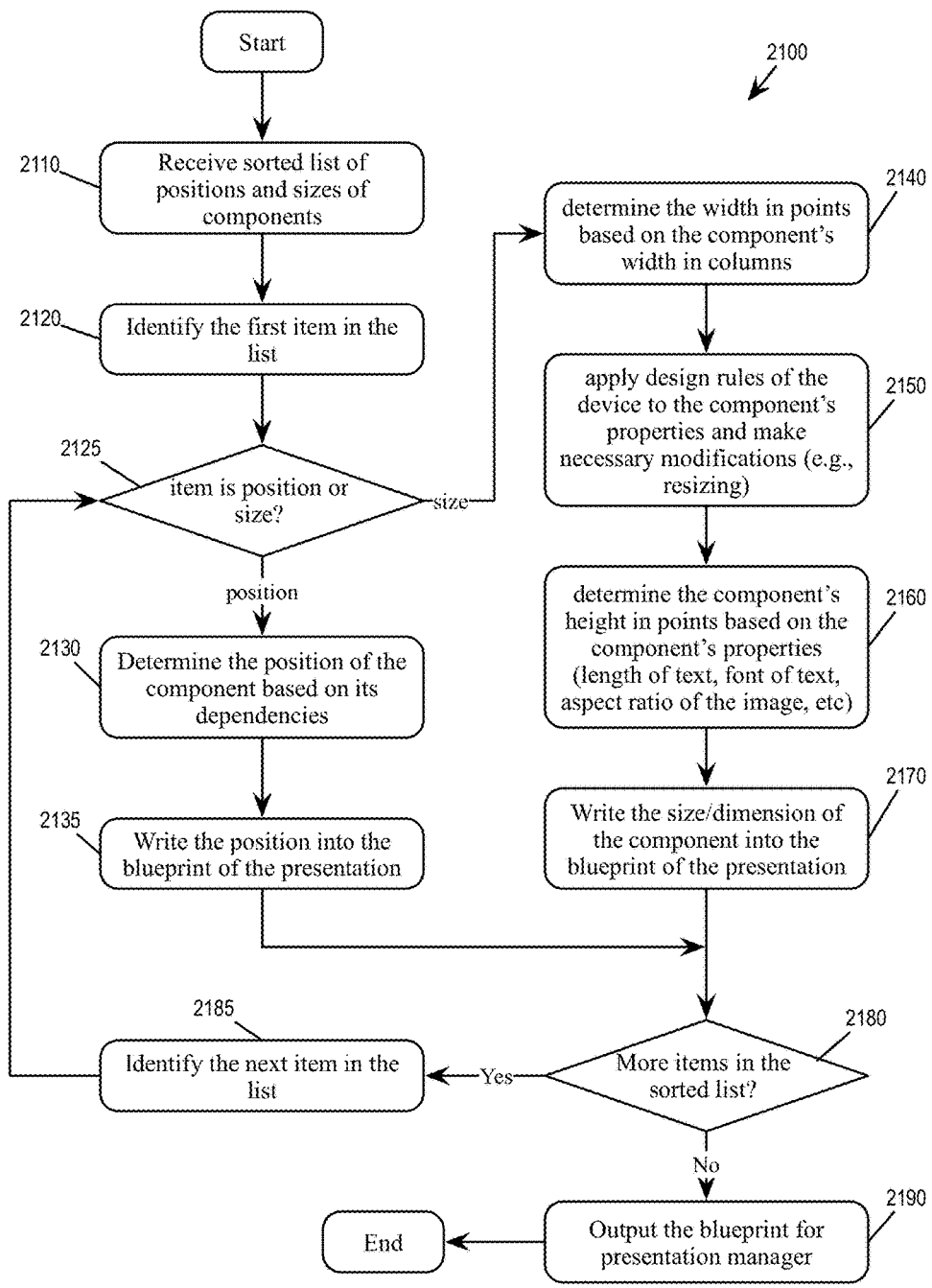
FIG. 21 conceptually illustrates a process for laying out components of a CPS.

For some embodiments, FIG. 21 conceptually illustrates a process 2100 for laying out components of a CPS (i.e., to finalize the shape/size and the position of each component). In some embodiments, the process is performed by the layout generator 1100 (of the reader application running on the client device) when it is producing a blueprint (at its blueprint generator 1140). The process starts when it receives (at 2110) a sorted list of positions and sizes of the components. Each item in the list is either a position of a component or a size of a component. The list provides an ordering that is based on dependencies between the positions and the sizes of the components in the CPS. By following the list, the process is guaranteed that when it is the time to determine the position (or size) of a component, everything that the position (or size) of the component depends on would have already been determined. The creation of such a list is described by reference to FIGS. 17*a-b* above. The process then identifies (2120) the first item in the list, which can correspond to the position of a component or the size of a component.

The process determines (2125) whether the identified item in the list is the position of a component or the size of a component. If the item is the position of a component, the process proceeds to 2130. If the item is the size of a component, the process proceeds to 2140.

At 2130, the process determines (computes) the position of the component based on its dependencies. For example, if the component is beneath a previously placed component, then the position of this component is computed by offsetting from the position and the size of that previously placed component. The process then writes (at 2135) the determined position into the blueprint of the presentation. The process then proceeds to 2180.

At 2140, the process determines (computes) the width of the component in display points or pixels based on the component's width in columns. As mentioned, each column spans a number of display points, and columns are separated by gutters, each of which also spans a number of display points. The true width of a component is thus the number of pixels or points that are spanned by the specified number of columns and gutters.

The process then applies (at 2150) design rules of the device to the component's properties and makes necessary modifications. In some embodiments, this involves changing the fonts of the component or the line height of the component. Examples of such modifications are described by reference to FIG. 20 above.

The process then determines (at 2160) (computes) the component's height/shape in display points or pixels based on the components properties, such as the length of its text, its font, its aspect ratio (if an image), or the geometries of other components that it has to wrap around, etc. Examples are described by reference to FIGS. 18 and 19 above. The process then writes (at 2170) the determined height/shape of the component into the blueprint of the presentation. The process then proceeds to 2180.

At 2180, the process determines whether there are more items in the sorted list that have not been used to determine the layout of the presentation. If there are more items in the sorted list, the process proceeds to 2185 to identify the next item in the sorted list and returns to 2125. If there are no more items in the sorted list, the process proceeds to 2190.

At 2190, the process output the blueprint of the presentation to the presentation manager (2200). The blueprint specifies the finalized positions and the geometries (size/shape) of each of the components. In some embodiments, the blueprint also carries other properties of each of the components that the presentation manager use for rendering and enact other behaviors when presenting the authored content. The process 2100 then ends.

IV. Presentation

As mentioned, the authored content delivery system delivers an internal CPS of an authored content to the client device to be presented by its reader application. An internal CPS contains the authored content in presentation structures that are enriched with styling/formatting/layout information and elaborated with necessary presentation resources. The client device in turn performs layout operations in order to determine the actual position and size/shape of each component in the presentation of the authored document according to the received internal CPS and the client device's own design rules.

In some embodiments, these actual positions and sizes/shapes of the components are recorded in a blueprint. The layout generator of the client device forwards the blueprint to a presentation manager, which in turn puts together the presentation by rendering the components and enabling other features such as snaplines and animation. (In some embodiments, the layout generator and the presentation manager are different operations performed by the same reader application running on the client device.)

Figure 22:
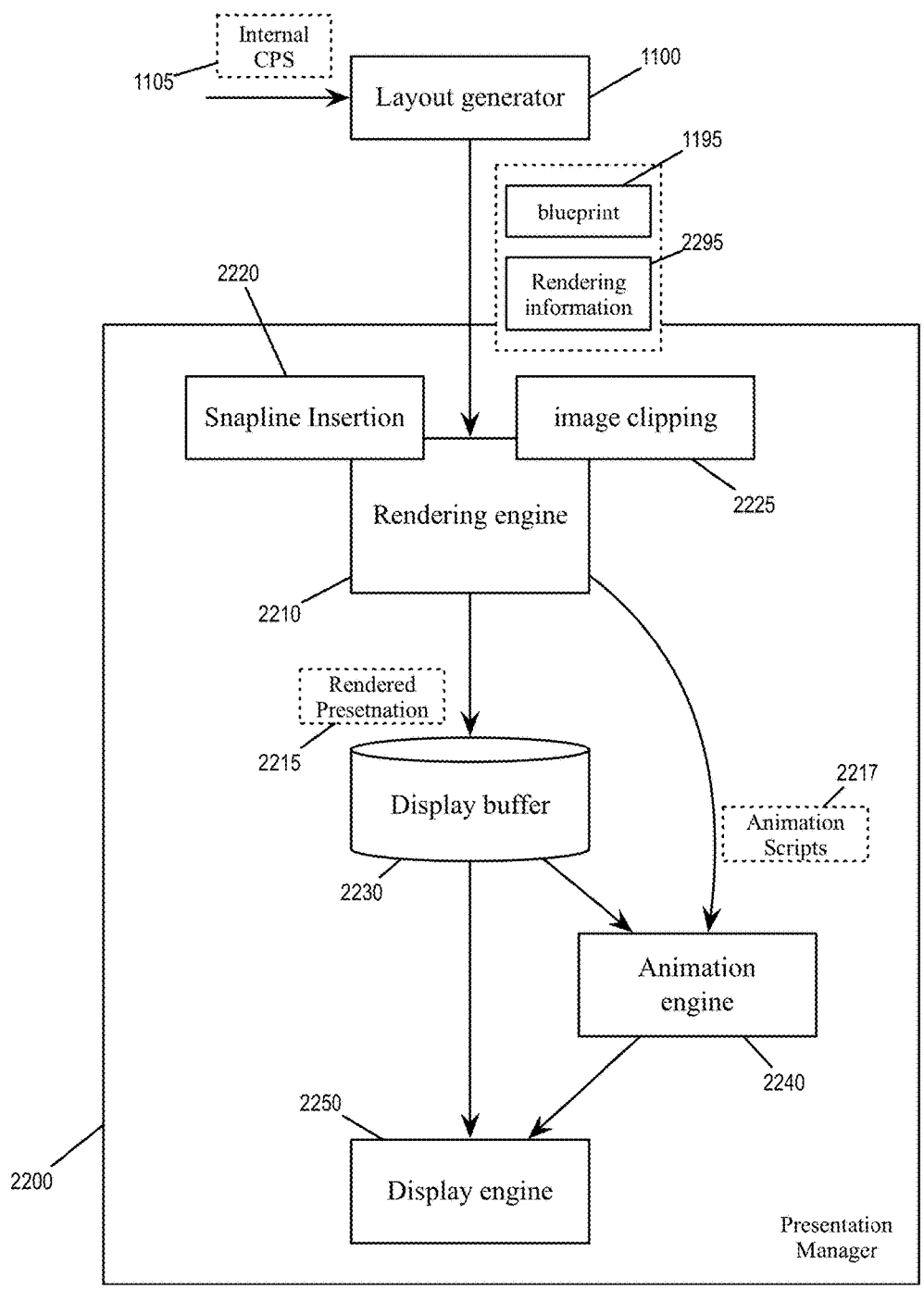
FIG. 22 illustrates a diagram of a presentation manager for putting together the presentation of the authored content for display at the client device.

FIG. 22 illustrates a diagram of a presentation manager 2200 for putting together the presentation of the authored content for display at the client device. The presentation is based on the blueprint 1195 and generated by the layout generator 1100. The presentation is also based on rendering information 2295.

The rendering information 2295 in some embodiments includes information from the internal CPS 1105 that are not carried by the blueprint 1195, such as the actual image data for rendering, font information, roles of components, as well as other properties of the presentation specified by the internal CPS that are beyond the sizes and positions of the components. In some embodiments, the rendering information is embedded in the blueprint. In some embodiments, the rendering information 2295 is provided separately to the presentation manager 2200 by the layout generator 1100.

As illustrated, the presentation manager 2200 includes a rendering engine 2210, a display buffer 2230, an animation engine 2240, and a display engine 2250. The rendering block 2200 also includes a snapline insertion block 2220 and an image clipping block 2225. The blueprint 1195 and the rendering information 2295 are received by the rendering engine 2210, which produces a rendered presentation 2215 to be stored in the display buffer 2230. The rendering engine 2210 also creates animation scripts 2217 for driving the animation engine 2240. The display engine 2250 then displays the presentation based on information stored in the display buffer 2230 as well as animation provided by the animation engine 2240.

The snapline insertion block 2220 is an operational block of the rendering engine. In some embodiments, the snapline insertion block analyzes the blueprint 1195 and the rendering information 2295 to establish snaplines as positions in the presentation that the scrolling by user is more likely to stop at. In some embodiments, snapline insertion is based on the position and sizes of the components as well as the roles of the components. These are information provided by internal CPL 1105 through the blueprint 1195 and the rendering information 2295 in some embodiments. Snapline insertion is further described in concurrently filed U.S. patent application Ser. No. 14/871,815, filed Sept. 30, 2015, and entitled "Intelligent Scrolling of Electronic Document".

The image clipping block 2225 will be described below.

a. Image Clipping

In some embodiments, the images originally provided by a public CPS (either the authored CPS or the template CPS) for image components are not necessarily of the right aspect ratio, or may include scenery or objects irrelevant to the subject matter of the authored document or to the role of the image component. Some embodiments therefore perform clipping to remove parts of the image so the remainder will fit the layout of the component while showing what is relevant to the subject matter as intended by the author. Some embodiments perform image clipping so the resulting image will comply with the image component's size and shape as specified in the blueprint (i.e., as determined by the layout generator based on the device-specific design rules). Furthermore, some embodiments determine the region of the image to crop by identifying a region of interest in the image data based on the role of the component as specified by the CPS.

In some embodiments, the image clipping is performed by the client device, specifically at its presentation manager (2200) after the layout generator (1100) has determined the size/shape and position of all the components in the presentation of the authored document. The presentation manager 2200 performs the image cropping based on the layout information of the component as specified by the blueprint 1195. In some embodiments, the image cropping is further based on the role of the component and the image data itself, which is provided by the rendering information 2295 in some embodiments. In some embodiments, the presentation manager 2200 performs the image clipping at its rendering engine (2210), which includes an image clipping operational block 2225 in some embodiments.

Figure 23:
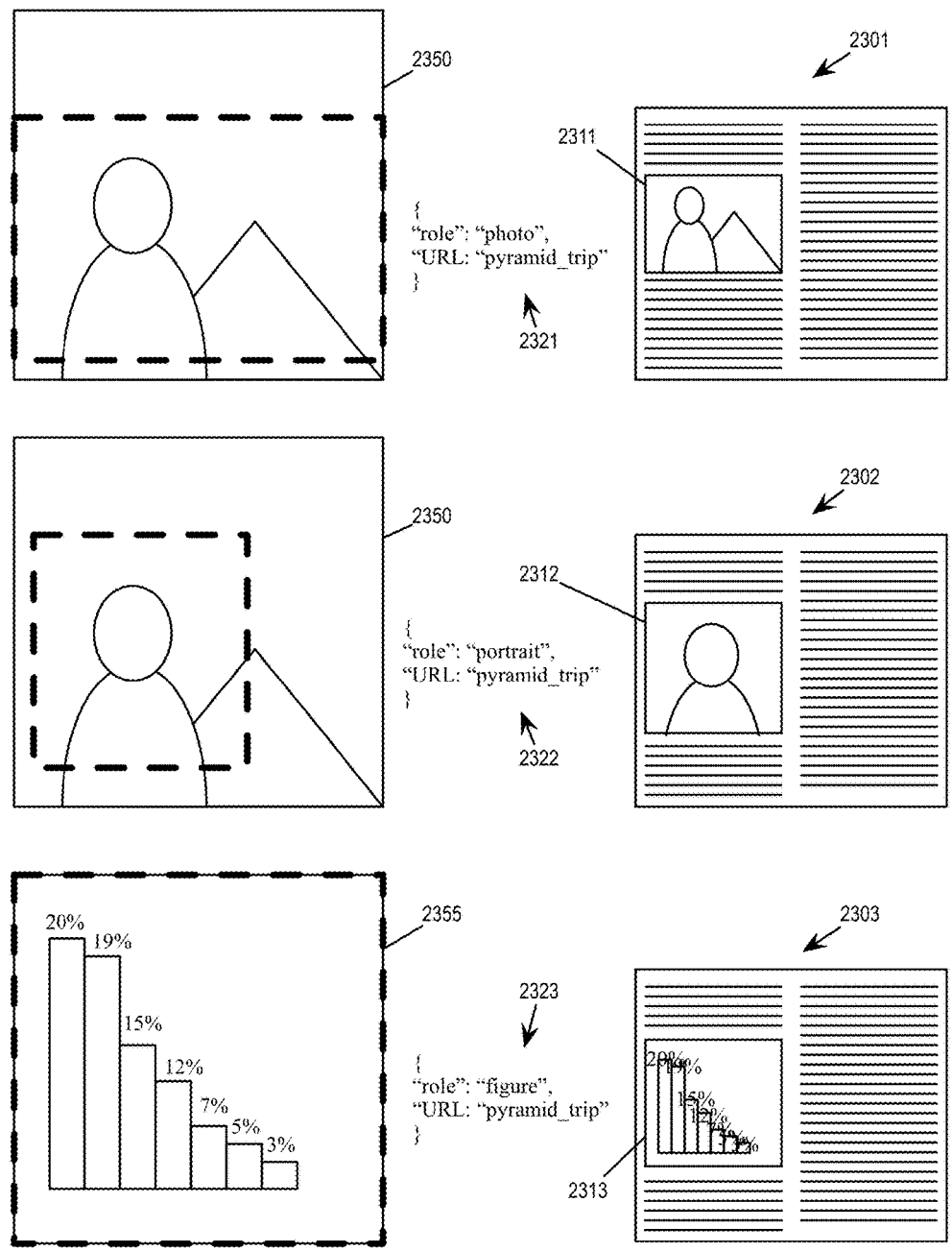
FIG. 23 illustrates several examples of image clipping based on the role and the layout of the image component.

FIG. 23 illustrates several examples of image clipping based on the role and the layout of the image component. The figure illustrates three examples 2301-2303 of image clipping, each has a different role as specified by the CPS, and the image clipping is performed based on the semantic value of the role.

The first example 2301 is an image component 2311 having the role of "photo" that is specified by the CPS 2321. The image data is that of image 2350, which is a square image (aspect ratio 1:1). On the other hand, the image component 2310 according to the layout has aspect ratio of 4:3. Image clipping is thus required in order to fit the image 2350 into the layout of the image component.

In some embodiments, an image with a role of "photo" will be cropped to include as much as the original image into the image component as possible by matching either the height or width of the image to the width/height of the component. In some embodiments, the cropping is accomplished without analyzing the image to identify a region of interest. Some methods of such cropping will be described by reference to FIG. 24 below. In some embodiments, the cropping of photo does include an analysis of the image data for identifying a region of interest, for example, to identify part of image having more information. In this example, the lower portion of the image 2350 has more information (a man and a pyramid) than the higher portion, so the clipping keeps the lower portion for the image component 2310.

The second example is an image component 2312 having the role of "portrait" that is specified by the CPS 2322. The image data is also that of image 2350, which includes more than just the portrait of a person, i.e., the pyramid. In some embodiments, a component having the role of "portrait" would cause the presentation manager to analyze the image to look for a human face and to identify a region of interest around the human face. In this case, the presentation manager identifies a region around the man in the image 2350 for cropping so the remaining image would look like a portrait of a person. The aspect ratio or the shape of the cropped region is determined by the layout of the image component (which is subject to the design rules of the client device), which is in turn based on the role of the component as specified in the CPL.

The third example 2303 is an image component 2313 having the role of "figure" that is specified by the CPS 2323. The image data is that of a bar graph 2355. In some embodiments, the image clipping operation of the presentation manager would not clip an image that has a role of "figure", because it is assumed all information in a figure (such as a generated chart or graph) are intended by the authored to be important and cannot be cropped off. In some embodiments, the layout generator would not alter the aspect ratio of a figure, (i.e., the design rule of the client device would allow a component having the role of "figure" to keep its original aspect ratio). In some embodiments, the aspect ratio as specified by the layout may be different than the figure image (e.g., due to device-specific design rules) so that the image clipping mechanism would alter the aspect ratio/shape of the figure to fit that of the layout.

Figure 24:
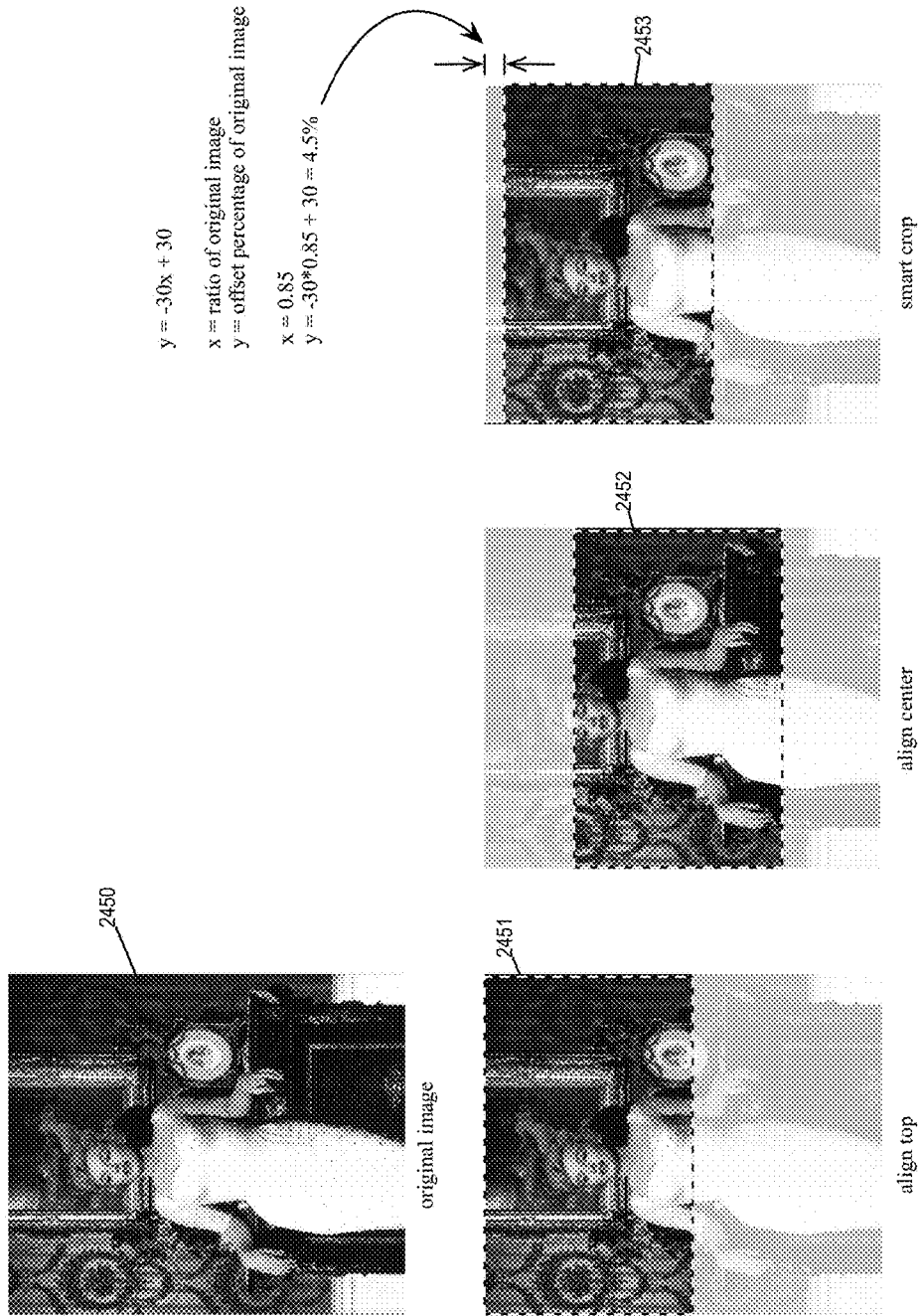
FIG. 24 illustrates image clipping operations performed by some embodiments that are based on the dimensions of the image rather than the content of the image.

FIG. 24 illustrates image clipping operations performed by some embodiments that are based on the dimensions of the image rather than the content of the image. These methods do not involve analyzing the image data to identify a region of interest. Such methods have the advantage of being less computationally intensive thus requiring less delay when presenting the authored content. The figure shows three cropped images 2451-2453 that correspond to three different types of dimension-based image clipping: align-top, align-center, and smart-crop. In some embodiments, the CPS includes further information that specify which cropping method should be used. The examples are based on an image 2450 with a role of "photo". The aspect ratio of the image is 0.85:1. It is to be cropped into a 4:3 image component layout.

The cropped image 2451 is created by align-top, i.e., the cropping starts at the very top of the image so the very top portion of the image is included in the cropped image. The cropped image 2452 is created by align-center, i.e., the cropping is aligned to the center of the image so the middle portion of the image is included in the cropped image.

The cropped image 2453 is created by smart-crop. This method recognizes that for most images, the most relevant part of the image is not necessarily the very top or the very center, but rather at an offset from the top based on the aspect ratio of the original image. In some embodiments, this specific offset is calculated according to the following:

$y=-30*x+30$, where x is the aspect ratio of the original image, and y is the offset percentage of the original image. For the example image 2450, the aspect ratio x is 0.85, its offset percentage y is 4.5%. In other words, if the height of the image is 10,000 pixels, then the smart-cropping of the image starts at the 450th pixel from the top.

Figure 25:
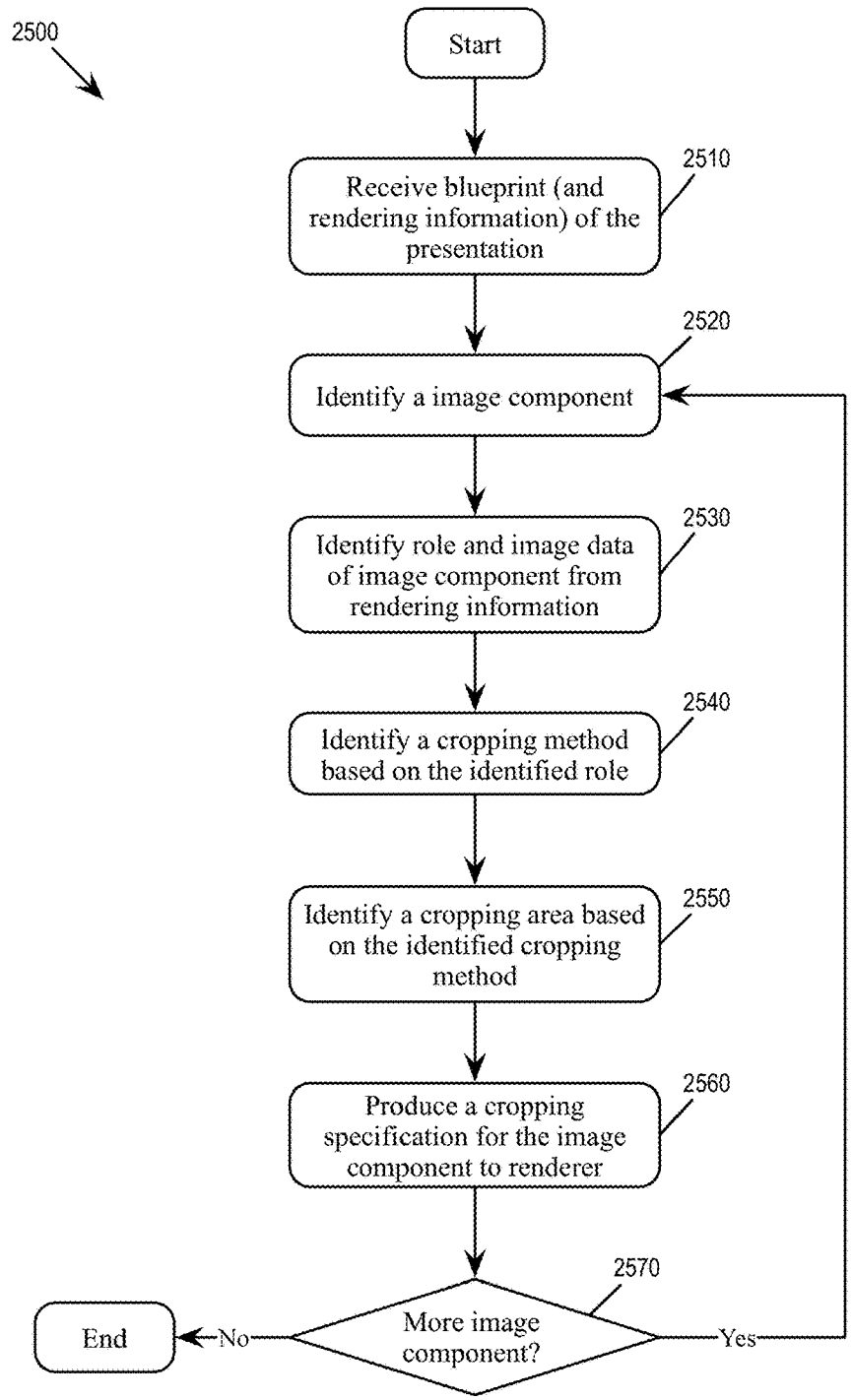
FIG. 25 conceptually illustrates a process for performing clipping/cropping for image components of a CPS-based presentation of authored content.

For some embodiments, FIG. 25 conceptually illustrates a process 2500 for performing clipping/cropping for image components of a CPS-based presentation of authored content. In some embodiments, the process 2500 is performed by the presentation manager of a client device. In some embodiments, the process is performed by the rendering engine 2210 when it is rendering the components of an article. The process receives (at 2510) a blueprint of the presentation of the authored content. The blueprint includes the layout information (position and size/shape of the components) generated by the layout generator. In some embodiments, the blueprint also includes rendering information that provides other information such as image data, component properties, and component roles. In some embodiments, the rendering information is received separately from the blueprint.

The process then identifies (2520) an image component from the blueprint. The process also identifies (2530) the corresponding role and the image data from the rendering information, which is derived from CPS.

The process then identifies (2540) a cropping method based on the identified role. Some of these role-based methods are described by reference to FIGS. 23-24 above. The method then identifies (at 2550) a cropping area based on the identified cropping method. In some embodiments, some methods require an analysis of the image data in order to identify the cropping area (e.g., facial recognition for portraits), while others do not (e.g., smart-crop). Based on the identified cropping area of the image, the process then produces (at 2560) an image-clipping specification for the image component to the renderer.

The process then determines whether there are more image components in the blueprint that have yet to go through image clipping. If so, the process returns to 2520. Otherwise, the process 2500 ends.

b. Animation

In some embodiments, a publisher/author can specify that the authored content be presented by using animation. In some embodiment, a public CPS (authored CPS, template CPS or rich CPS) can specify that the presentation of a component is animated, or that the behavior of a component in the presentation of the authored content involves animation. In some embodiments, the public CPS can specify an animated scene involving several components. In some embodiments, a CPS may specify many different types of animation, including parallax effects, animation that highlights user interaction with the article, animation in response to motions sensed by the client device, and other types of animations. Section VI below provides a listing and a description of animations that can be specified by JSON-based CPSL.

In some embodiments, the specification for an animation in the public CPS is elaborated into resources needed to show the animation. In some embodiments, the elaboration is performed by the elaboration stage of the distribution sub-system and the elaborated animation resources are included in the internal CPS. Once a client device receives the internal CPS, it translates the elaborated animation resources in the internal CPS into device-specific animation scripts that in turn enable the client device to display the animation when presenting the article/authored content.

Figure 26:
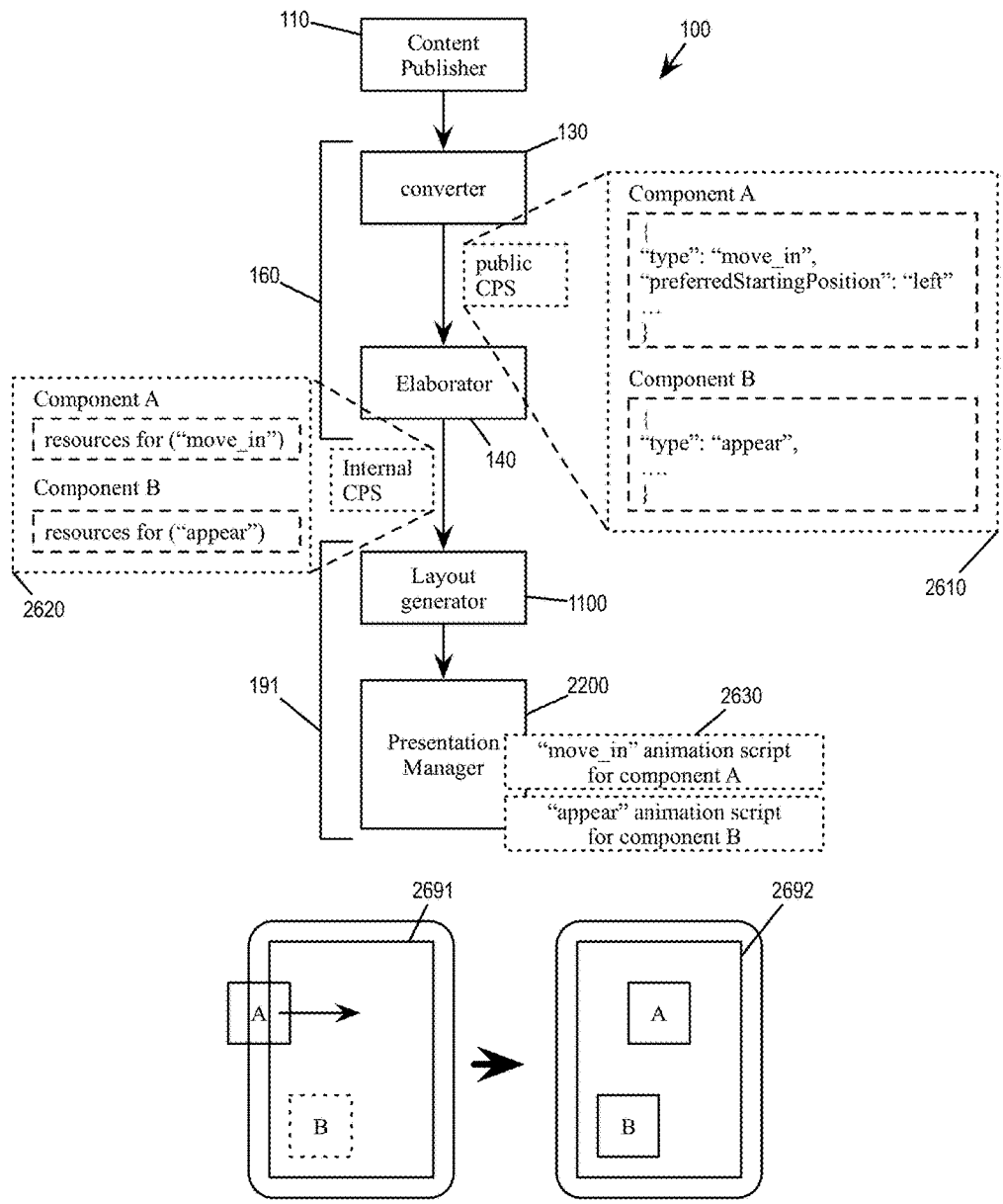
FIG. 26 conceptually illustrates the specification of animation for presentation of an authored document using CPS.

For some embodiments, FIG. 26 conceptually illustrates the specification of animation for presentation of an authored document using CPS. The figure also illustrates the processing of animation related information by an authored content delivery system 100. For purpose of descriptive clarity, FIG. 26 includes only some of the functional blocks in the system 100 that are relevant to the presenting CPS-specified animation for some embodiments.

As mentioned and as illustrated, the authored content delivery system 100 includes the distribution subs-system 160 for processing and delivering content to client devices 191-0193. The distribution sub-system includes the converter 130 and the elaborator 140, while the client device 191 includes the layout generator 1100 and the presentation manager 2200.

As illustrated, the animation is specified by a public CPS 2610. The public CPS 2610 can be a rich CPS that is created by the converter 130 when it combines an authored CPS with a matching template CPS, or authored CPS directly from the publisher 110. In some embodiments, the animation specification is specified by the publisher in the authored CPS. In some embodiments, the animation specification can be provided by a template CPS while the authored CPS makes no direct specification of animation.

The public CPS 2610 specifies two components: component A and component B. Component A specifies an animation of the type called "move_in", while component B specifies an animation of a type called "appear". As illustrated in display 2691 and 2692, the "move_in" animation animates the movement of component A from outside of the display to within the display, while the "appear" animation animates the fade-in effect of component B.

The public CPS 2610 arrives at the elaborator 140, which gathers resources for components before distribution to the client devices. The elaborator 140 also gathers resources for presenting the animation, depending on the animation that is specified and the possible types of devices that may receive and present the CPS-based article. In this example, the elaborator 140 would gather the necessary graphical resources needed for presenting the "move_in" animation for component A and the "appear" animation for component B. The elaborated resources are included in the internal CPS 2620 for components A and B.

The internal CPS 2620 is delivered to the client device 191, which performs layout (at layout generator 1100) and rendering (at the presentation manager 2200). Based on the animation resources in the internal CPS 2620 as well as the layout information determined by the layout generator 1100, the presentation manager 2200 creates and uses a set of device-specific animation scripts 2630 that enables the animation of component A and component B at the display of the client device 191.

Figure 27:
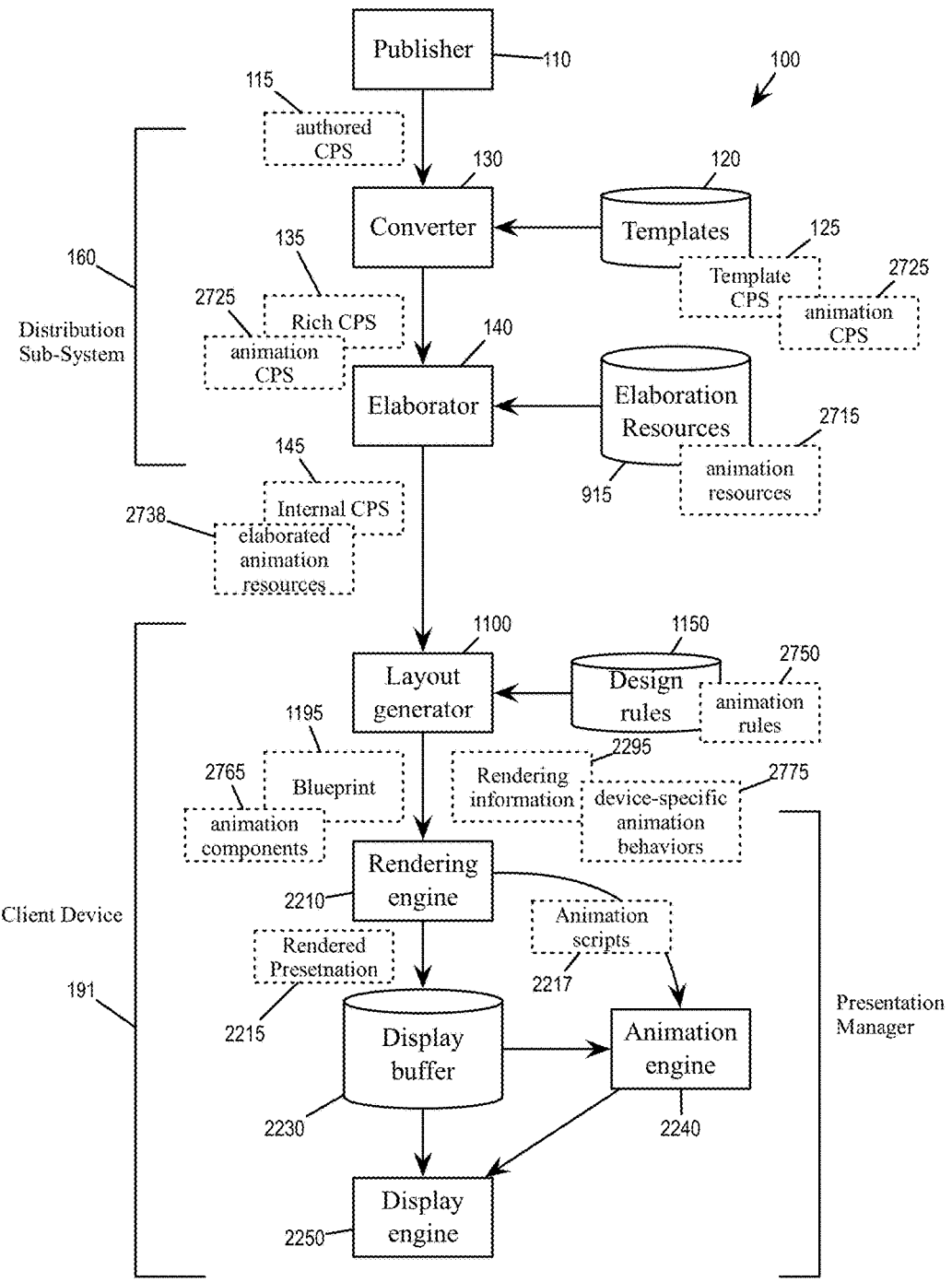
FIG. 27 illustrates various stages of processing CPS-based animation through the authored content delivery system.

FIG. 27 illustrates various stages of processing CPS-based animation through the authored content delivery system 100. As mentioned, the publisher 110 creates an authored CPS 115 which may or may not include specification for animation in the presentation of the authored content. The authored CPS 115 is received by the distribution sub-system 160, which includes the converter 130 that combines the template CPS 125 with the authored CPS 115 to create the rich CPS 135. As illustrated, the template CPS 125 includes animation specification in CPS form (i.e., written in CPSL as animation CPS 2725), and that animation CPS 2725 is included or integrated into the rich CPS 135 through the process of template combination as described above in Section II.a.

The rich CPS 135 (which is a public CPS) is sent to the elaborator 140, which gathers resources from the elaboration resources 915 in order to elaborate the various objects (components and properties) in the public CPS 135. Among the elaboration resources available from the storage 915 are resources 2715 for different types of animation. Such resources in some embodiments include sequences of images, specification of motion, image transformation specifications (e.g., coefficients, matrix, or equations), or other animation related data structures for different types of presentation behaviors. From among the animation resources 2715 in the storage, the elaborator 140 identifies the animation resources that are needed for the animation (elaborated animation resources 2738) specified by the public CPS 135 (i.e., specified by the animation CPS 2725) and include them in the internal CPS 145 (after optimization). The elaboration for generating internal CPS is described in Section II.b above.

The internal CPS 145 is distributed by the server (not illustrated) in the distribution sub-system to the client device 191. The layout generator 1100 of the client device 191 then performs the layout operations (i.e., determining the shape/size and position of the various components) according to the received internal CPS. The layout generator 1100 generates a blueprint 1195 that specifies the geometries and positions of components in the presentation. Layout generation is described in further detail in Section III above. The blueprint 1195 includes layout information 2765 for components that are involved with animation. The layout generator 1100 also produces rendering information 2295, which includes properties of the presentation specified by the internal CPS (beyond the sizes and positions of the components). Among the information carried by the rendering information 2295 are animation behaviors that relies on the elaborated animation resource 2738 in the internal CPS 145.

The design rules 1150 is used by the layout generator 1100 to constrain the layout generation process according to device specific rules. Such rules determine the result of layout generation process, i.e., the blueprint 1195 and the rendering information. As the blueprint 1195 includes layout information 2765 on animation components as well as rendering information that includes animation behaviors 2775, these animation related result of the layout generator 1100 are also constrained by the design rules 1150. Such rules in some embodiments include limit on speed motion, limit on range of motion, limit on range of color change, limit on size of animated objects, limit to the types of sensor input or user interface input used, or any other device-specific limits on animation.

The blueprint 1195 and the rendering information 2295 are then passed to the presentation manager 2200 of the client device. The rendering engine 2210 creates animation scripts 2217 for driving the animation engine 2240. These animation scripts in some embodiments are for driving the hardware of the client device to perform the animation specified by the device-specific animation behaviors 2775 corresponding to the animation components 2765. The display engine 2250 then displays the presentation based on information stored in the display buffer 2230 as well as animation provided by the animation engine 2240.

Figure 28:
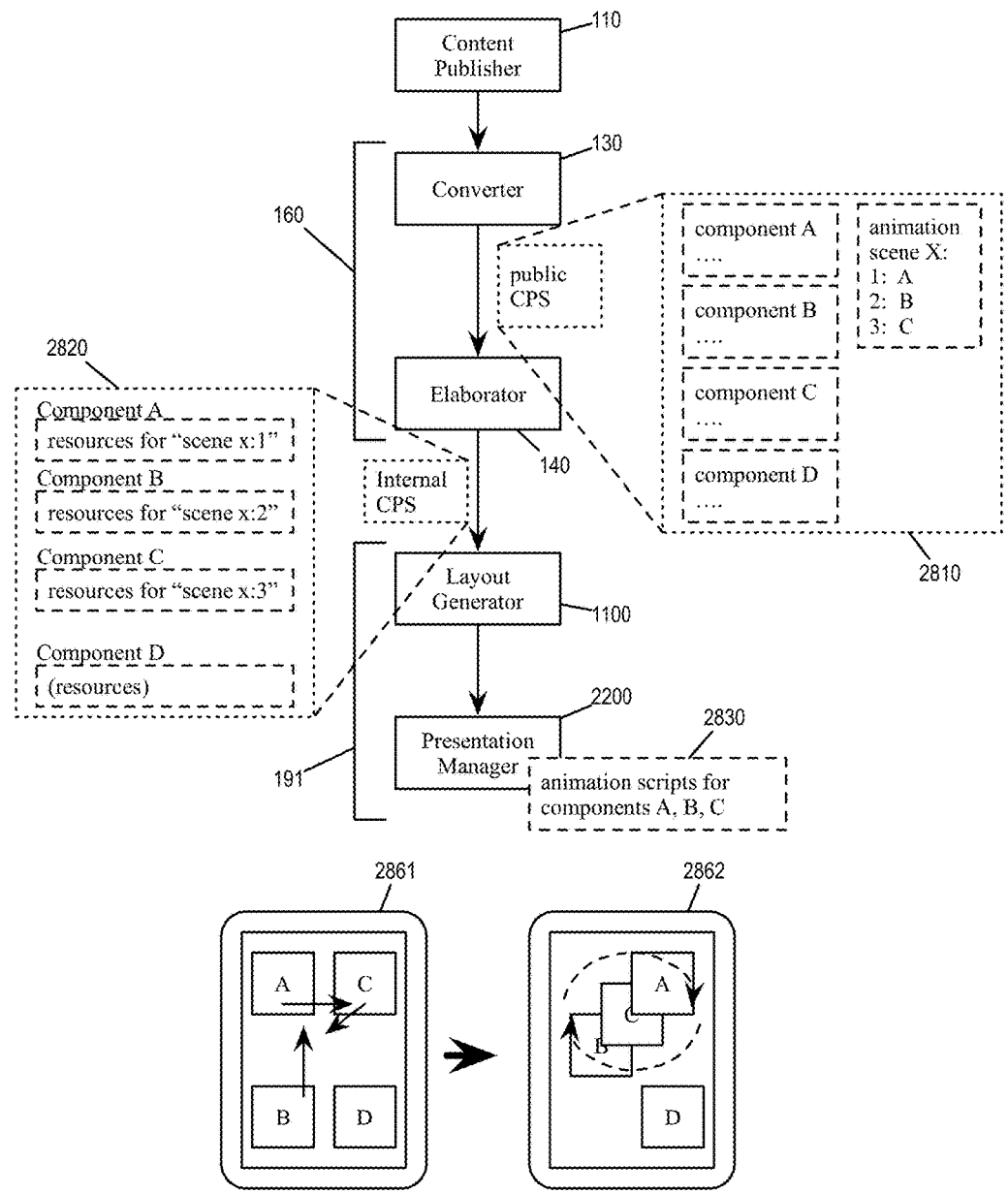
FIG. 28 illustrates the specification of a scene of animation by CPS.

As described above by reference to FIG. 26, a public CPS can specify animation for individual components of a presentation of an authored content. In some embodiments, a public CPS can specify an animation that involves a group of components. In some embodiments, such animation is referred to as a scene. FIG. 28 illustrates the specification of a scene of animation by CPS.

Like FIG. 26, FIG. 28 includes only some of the functional blocks in the system 100 that are relevant to the presentation of CPS-specified animation for some embodiments, namely the converter 130 and the elaborator 140 of the distribution sub-system 160, the layout generator 1100, and the presentation manager 2200.

The publisher 110 through the converter 130 produced a public CPS 2810 (either a rich CPS from template or an authored CPS). The public CPS 2810 specifies four components A, B, C, and D. The CPS also specifies a scene animation for a group of components that includes the components A, B, and C, but not component D. The identifier of the scene animation is X.

The elaborator 140 elaborates the specification of the scene animation X into animation resources for components A, B, and C, each component being specified animation resources corresponding to its role in the scene animation. Component D is elaborated with its own resource corresponding to its own role and properties. The elaborated resources are included in an internal CPS 2820.

The internal CPS 2820 is delivered to the client device 191, which performs layout (at layout generator 1100) and rendering (at the presentation manager 2200). Based on the elaborated animation resources in the internal CPS 2820 as well as the layout information determined by the layout generator 1100, the presentation manager 2200 creates and uses a set of device-specific animation scripts 2830 that enables the scene animation. Specifically, the set of animation scripts 2830 include an animation script for animating each of the components A, B, and C.

Figure 29:
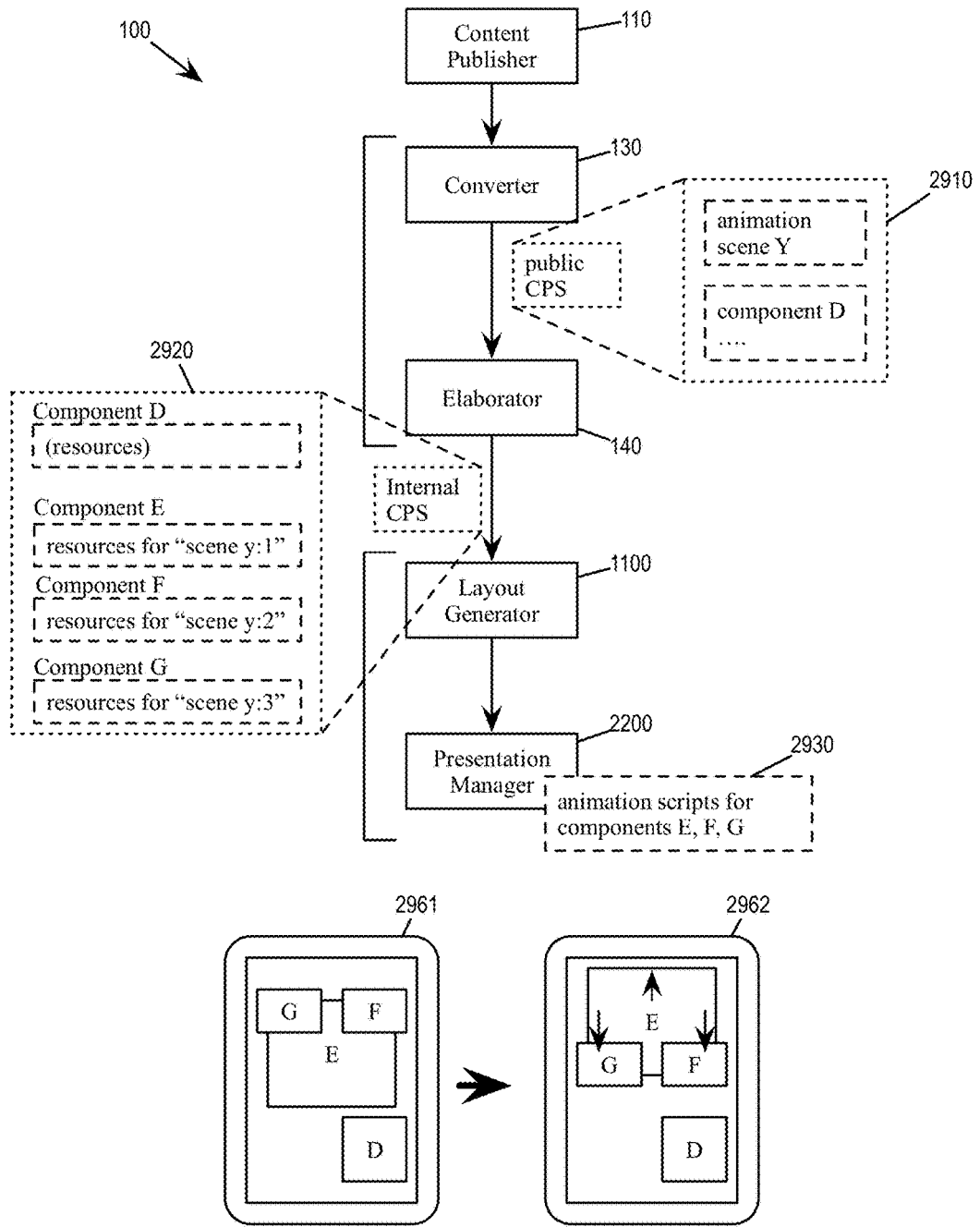
FIG. 29 illustrates the specification of a scene animation where components of the scene are elaborated into internal CPS rather than being explicitly specified by public CPS.

In some embodiments, a specification of a scene animation in a public CPS does not require the CPS to explicitly define the components involved in the animation. Rather, the components of the scene animation are elaborated into the internal CPS during elaboration. FIG. 29 illustrates the specification of a scene animation where components of the scene are elaborated into internal CPS rather than being explicitly specified by public CPS.

FIG. 29 illustrates a public CPS 2910, which specifies a scene animation "Y" and a component D. Unlike the scene animation "X" specified by the public CPS 2810 of FIG. 28 which is defined with reference to defined components in the public CPS 2810, the scene animation "Y" is defined without referring to component in the public CPS 2910. Rather, when the scene animation "Y" is elaborated by the elaborator 140 into a corresponding internal CPS 2920, additional components E, F, G are introduced into the presentation that were not explicitly defined by the public CPS. In other words, the scene animation "Y" implicitly defines components that are necessary to implement the animation effect. As shown in animated sequence 2961-2962, the components E, F, and G are being animated in the presentation as a group.

An example of an animation enabled by CPS that involves a group of components is parallax animation. A parallax animation, or parallax scrolling in particular, is a technique in computer graphics in which background images move by the display slower than foreground images, creating an illusion of depth in a 2D scene.

Figure 30:
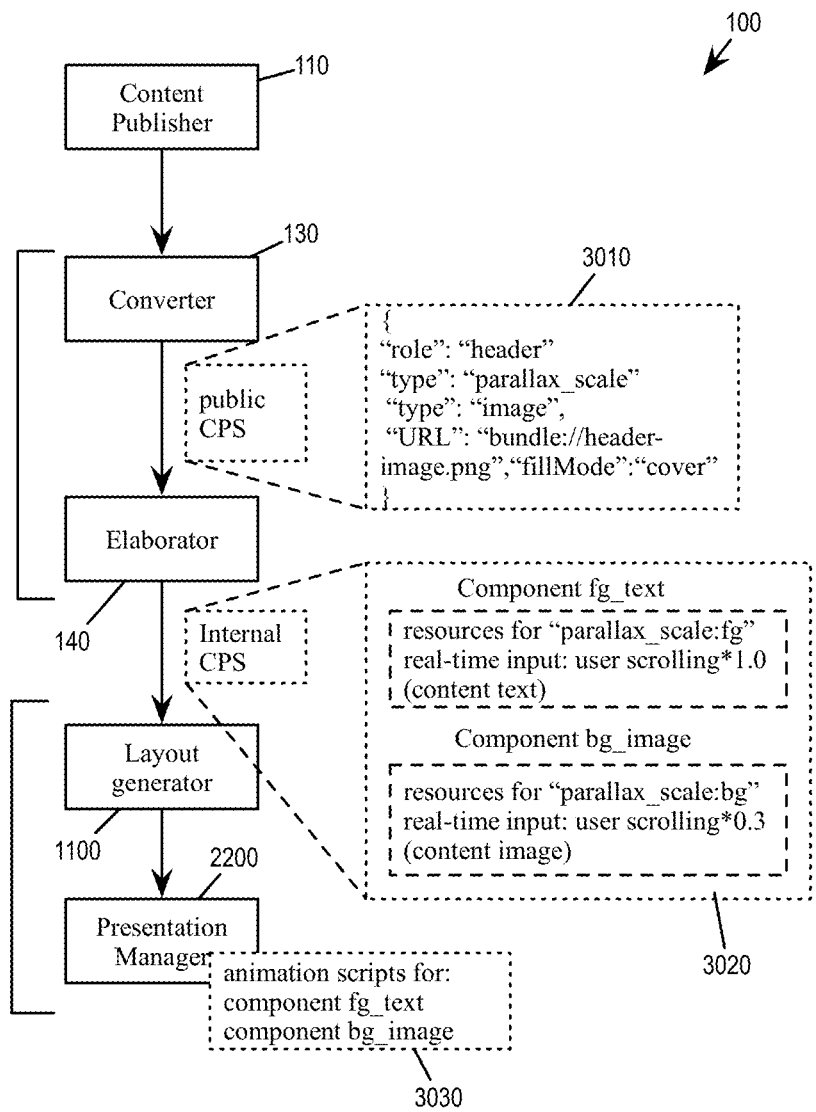
FIG. 30 illustrates the specification of parallax effect by a public CPS.

FIG. 30 illustrates the specification of parallax effect by a public CPS 3010. The public CPS 3010 specifies a component with role "header". The header component is to be filled by an image that is to be fetched from a certain URL address. The component also includes a specification of a parallax effect called "parallax_scale", in which when the reader scrolls down (away from the header component), the header background will zoom out and scroll slightly more slowly than the user scroll interaction, giving a parallax effect.

The public CPS 3010 (written in JSON-based CPSL) specifies that that the "parallax_scale" effect is to be implemented for the header component, but it does not explicitly describe the various moving pieces of the animation (i.e., similar to the example of FIG. 29 but unlike the example of FIG. 28). However, the elaborator 140 does elaborate the "parallax_scale" into its foreground component ("fg_text") and its background component ("bg_image") for the internal COS 3020. The foreground component is the header that scrolls based on user's scroll interaction, while the background component is the background image that scrolls slightly more slowly than the foreground.

Based on the elaborated animation resources in the internal CPS 3020 as well as the layout information determined by the layout generator 1100, the presentation manager 2200 creates and uses a set of device-specific animation scripts 3030 that enables the parallax effect. Specifically, the set of animation scripts 3030 include an animation script for animating the background image and an animation script for animating the foreground header.

As mentioned, parallax effect is animation that moves objects in the presentation based on user scrolling interaction. More generally, in some embodiments, animation in a presentation of an authored content can be specified to be responsive to real time inputs such as user scrolling interaction, user gesture on a touchscreen, user input via mouse or keyboard, motion that are sensed by device motion sensors, or other types of input data that are generated and received in real time as the reader is viewing the CPS-based presentation of the authored document.

In the example of FIG. 30, the parallax effect is elaborated into various animation resources in the internal CPS 3020, among these resources is the specification of the types of real-time input that is needed to drive the animation. Specifically, internal CPS 3020 specifies that the animation of the components "fg_text" and "bg_image" are both responsive to real-time inputs, specifically user scrolling. The internal CPS 3020 further specifies that the animation in response to user scrolling be slower for the background component than the foreground component (0.3 versus 1.0).

Figure 31:
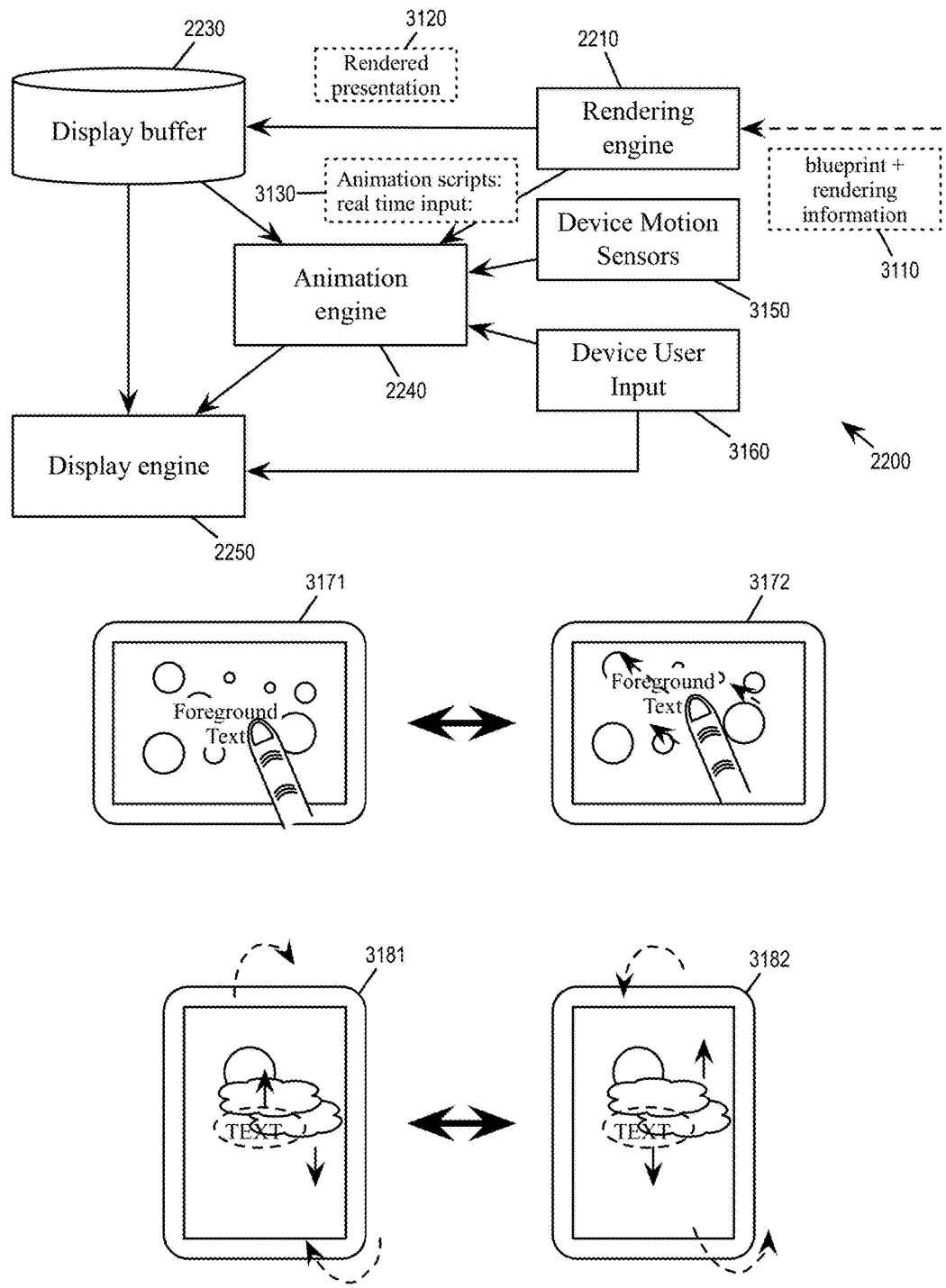
FIG. 31 illustrates the implementation of CPS-based animation that is responsive to real-time inputs.

FIG. 31 illustrates the implementation of CPS-based animation that is responsive to real-time inputs. Specifically the figure illustrates how the presentation manager 2200 of the client device 191 presents animated objects by using the real-time data. As illustrated, the presentation manager 2200 receives blueprint and rendering information 3110. The blueprint and rendering information 3110 are derived from an internal CPS and constrained by device design rules, and they include animation resources and specifications of animation behaviors that are constrained by device design rules. The rendering engine 2210 renders them into a rendered presentation 3120 that is stored in the display buffer 2230. The rendering engine 2210 also generates a set of animation scripts 3130 for the animation engine 2240. The animation engine 2240 in turn takes the rendered presentation stored in the display buffer 2230 and generates the corresponding animation for the display engine 2250 based on the animated scripts 3130.

The animation scripts 3130 specifies the types of real-time input that are required, as well as any operations that are needed to translate the real-time data into parameters for animation. These specifications of real-time input refer to real-time input sources that are available on the client device and accessible by the animation engine 2240. As illustrated, the animation engine has access to data produced by real-time input data generation sources, including device motion sensors 3150 and device user input 3160.

Device motion sensors 3150 can include sensors for the client device's speed, acceleration, orientation, level, etc. These sensors provide real time data that can be used by the animation engine to drive animation or have the animation be responsive to the data from the sensors. Device user input 3160 includes user scrolling interaction, user gesture on a touchscreen, user input via mouse or keyboard, etc. These user input data are sometimes provided by the graphical user interface (GUI) of the client device.

Animation sequence 3171-3172 illustrates a CPS-based presentation having objects whose animated motions are in response to user input data. Specifically, the background image is moving in response to the user's gesture (scrolling) on the touch screen in order to create a parallax effect (background graphics moving slower than foreground text). Animation sequence 3181-3182 illustrates a CPS-based presentation having objects whose animated motions are in response to device sensor data. Specifically, the background image and foreground text are moving in different directions in response to the forward and backward tilt of the device.

Different client device may provide different sets of sensors and user input that can be used for animation in a presentation. A client device in some embodiments therefore applies design rules to limit the animation to use only sensors and user input that are available to the client device, or maps one type of sensor/user input to another type of sensor/user input. In some embodiments, this application of design rule occurs when the client device is performing layout generation (at the layout generator 1100) to produce 2725 device-specific animation resources and behaviors. In some embodiments, this application of design rules occurs at the rendering engine when it generates the animation scripts 3130. In some embodiments, this application of design rules occurs at the animation engine 2240 when it uses animation scripts to perform the animation.

Figure 32:
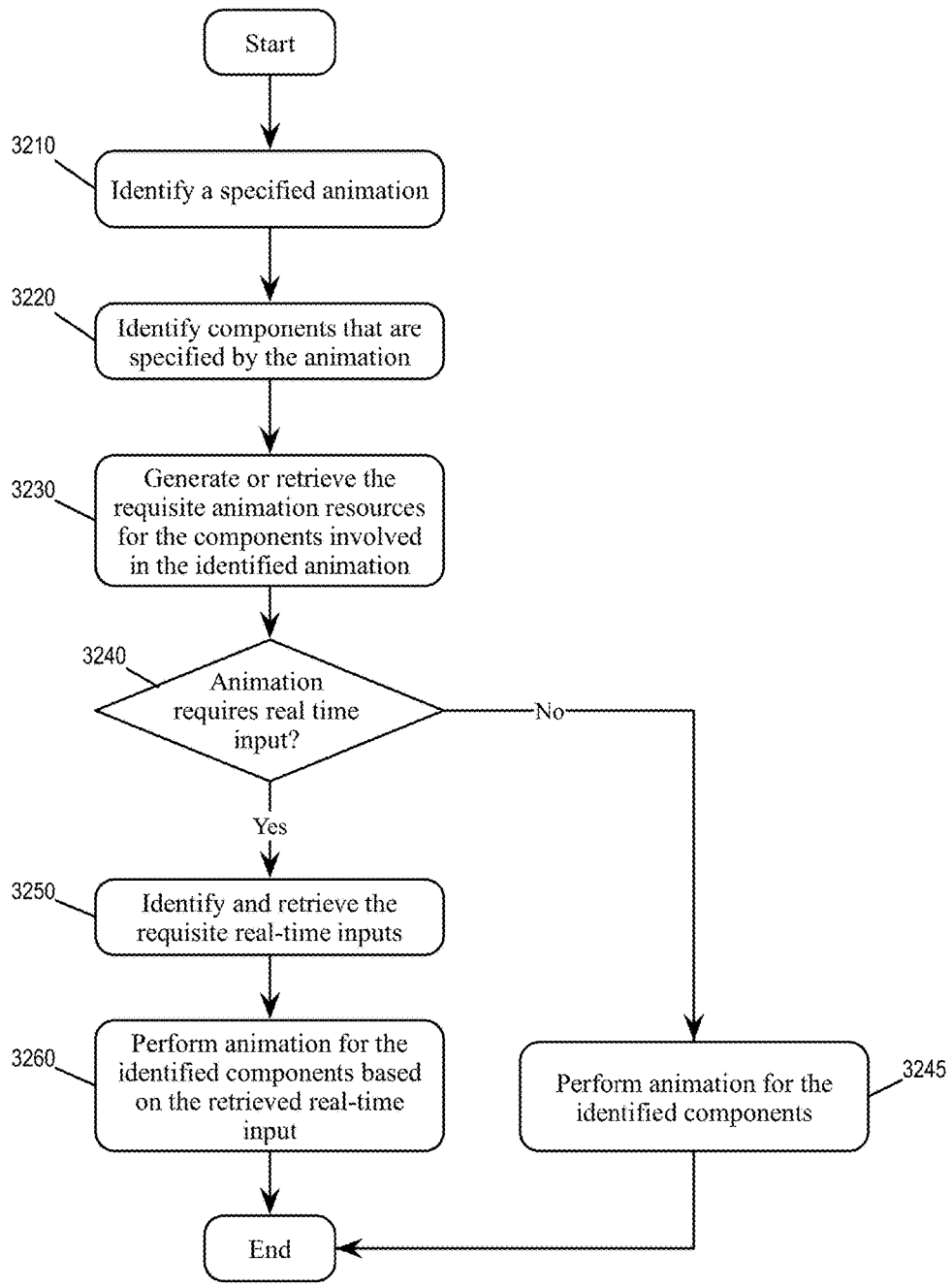
FIG. 32 conceptually illustrates a process for presenting animation in a client device for a CPL-based article.

FIG. 32 conceptually illustrates a process 3200 for presenting animation in a client device for a CPL-based article. In some embodiments, the process is performed by the animation engine 2240, which receives resources for animation and specification for animation from an elaborated internal CPS through layout generation and rendering processes.

The process 3200 starts when it identifies (at 3210) a specified animation (from the internal CPS). As mentioned, in some embodiments, a client device upon receiving an internal CPS would generate animation scripts for enabling animation at the device. Such scripts are generated in accordance with the design rules of the device and in accordance with the blueprint and the rendering information created by the layout generator. The process would identify animations to perform based on the animation scripts.

The process then identifies (at 3220) components that are specified by the animation. As discussed above by reference to FIGS. 28-30, some animation are scene animation that involve multiple components, while some animation are single component animations.

Next, the process generates or retrieves (at 3230) the requisite animation resources for the components involved in the identified animation. In some embodiments, some of these animation resources are stored in the display buffer and can be retrieved by the animation engine when it is performing animation according to the animation scripts.

The process then determines (at 3240) whether the identified animation require real-time input from the device. Such real-time input can be from sensors equipped by the client device or from user input such as touchscreen, mouse, or keyboard. In some embodiments, the specification of an animation would indicate whether the animation requires real-time input. In some embodiments, such indication is added to the internal CPS by the CPS elaboration process and then relayed to the client device. If the identified animation requires real-time input, the process proceeds to 3250. Otherwise, the process proceeds to 3245.

At 3245, the process performs the animation for the identified components that are involved with the animation. The process 3200 then ends.

At 3250, the process identifies and retrieves the requisite real-time inputs. In some embodiments, the type of real-time input that is required by the animation is identified in the internal CPS and in turn become part of the animation script. In some embodiments, the type of real-time input being used is further constrained by the design rule of the client device, which may modify the identity of real-time input based on what is available at the client device. Once the source of the real-time input is ascertained, the process retrieves the real-time input. The process then performs (3260) the animation for the components that are involved with the animation based on the retrieved real-time data. The process 3200 then ends.

As mentioned, in some embodiments, the public CPS specifies only the types of animation that are to be included in the presentation. It is the distribution sub-system that fills in the resources needed by the animation during elaboration (such as image sequences). Some embodiments, on the other hand, allow a public CPS to specify multiple still images for a same component in the presentation, and the client device would display the multiple still images specified by the public CPS sequentially at a same layout slot in the presentation, thus achieving an animated effect. In some embodiments, the sequence of images can be specified by the publisher at the authored CPS, or be provided as a template in a template CPS.

Figure 33:
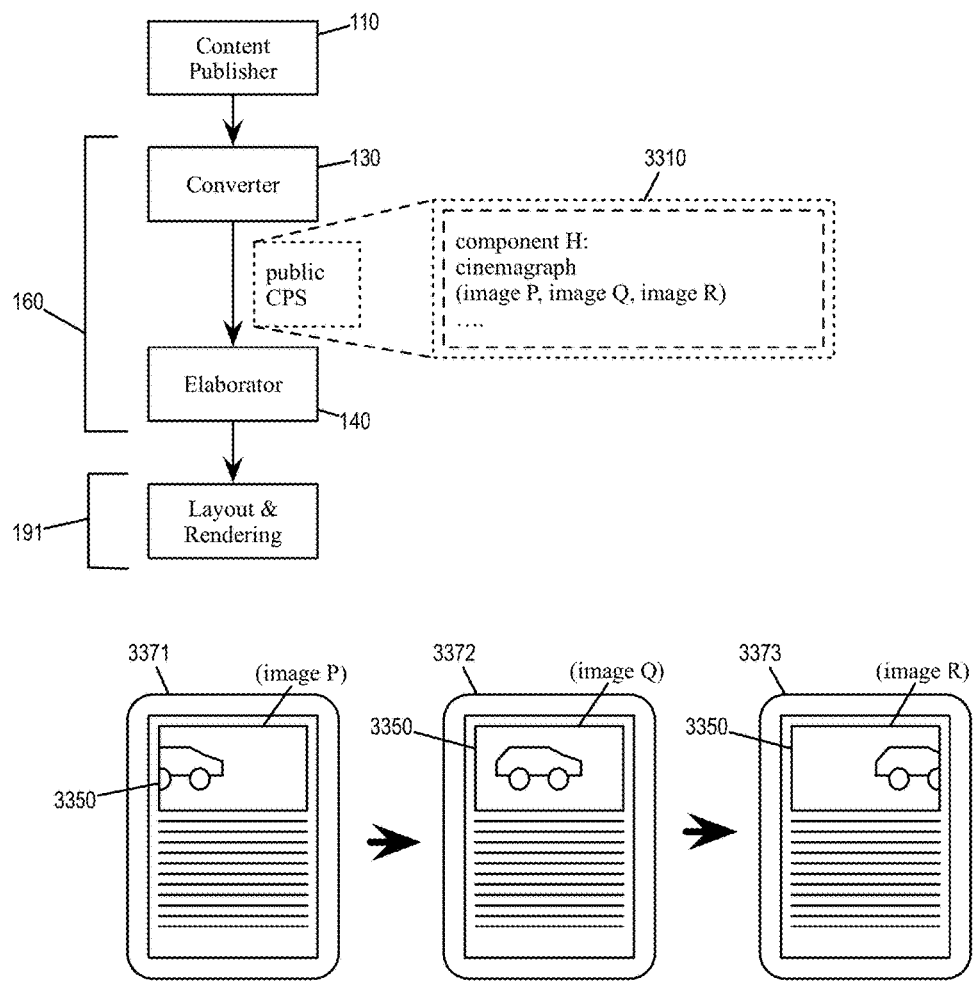
FIG. 33 illustrates an animation effect achieved by specifying a sequence of images for one article component in the authored content delivery system.

FIG. 33 illustrates an animation effect achieved by specifying a sequence of images for one article component in the authored content delivery system 100. As illustrated, a public CPS 3300 specifies a cinemagraph for the component H. The cinemagraph specifies a series still images P, Q, and R, which will be continuously/repeatedly played in the presentation of the authored content to give an illusion of video.

The public CPS 3310 is elaborated by the elaborator 140, which processes the still images of the cinemagraph as it does for any other images (i.e., to obtain the image from URL, to resolve the references, to produce different copies of the image for different devices, etc.). However, the elaborator does not need to gather any other resources for animating the component H (resources such as sequences of images, specification of motion, image transformation, etc.), since all images required for the cinemagraph is already specified by the public CPS 3310 and need not be computed or derived. The elaborated internal CPS is then delivered to the client device 191 for layout, rendering and display (as shown by animated sequence 3371-3373, in which images P, Q, and R take turn being displayed at a layout slot 3350 for the component H).

As mentioned, some embodiments determine behaviors of components are by their respective roles. In some embodiments, a component having the role of "cinemagraph" has as its behavior displaying a sequence of images as cinemagraph upon selection of the article for display in a news feed.

V. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 34:
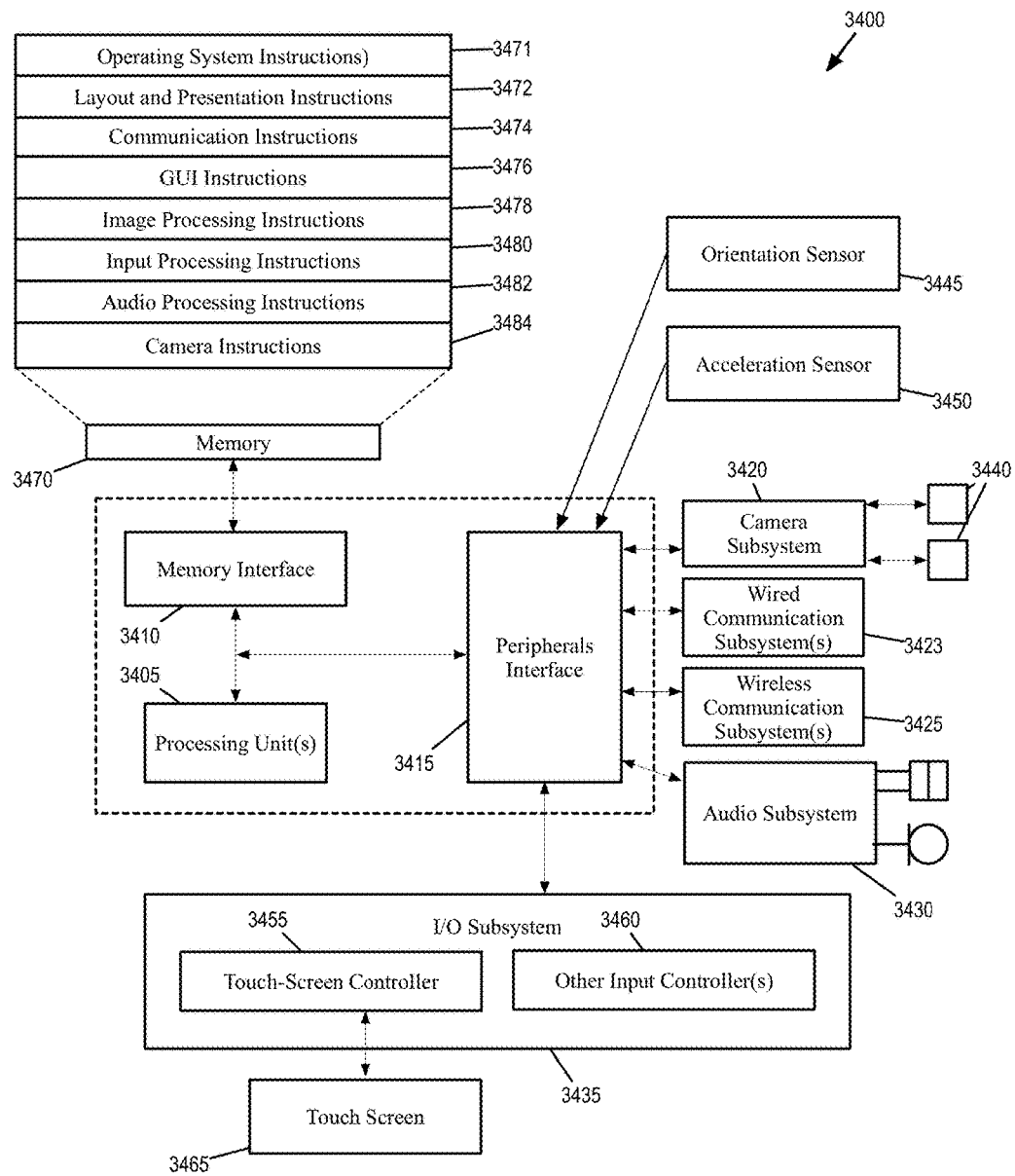
FIG. 34 is an example of an architecture of a mobile computing device.

The user data sharing of some embodiments occurs on mobile devices, such as smart phones (e.g., iPhones®) and tablets (e.g., iPads®). FIG. 34 is an example of an architecture 3400 of such a mobile computing device. As shown, the mobile computing device 3400 includes one or more processing units 3405, a memory interface 3410 and a peripherals interface 3415.

The peripherals interface 3415 is coupled to various sensors and subsystems, including a camera subsystem 3420, a wired communication subsystem(s) 3423, a wireless communication subsystem(s) 3425, an audio subsystem 3430, an I/O subsystem 3435, etc. The peripherals interface 3415 enables communication between the processing units 3405 and various peripherals. For example, an orientation sensor 3445 (e.g., a gyroscope) and an acceleration sensor 3450 (e.g., an accelerometer) is coupled to the peripherals interface 3415 to facilitate orientation and acceleration functions.

The camera subsystem 3420 is coupled to one or more optical sensors 3440 (e.g., a charged coupled device (CCD) optical sensor, a complementary metal-oxide-semiconductor (CMOS) optical sensor, etc.). The camera subsystem 3420 coupled with the optical sensors 3440 facilitates camera functions, such as image and/or video data capturing. The wired communication subsystem 3423 and wireless communication subsystem 3425 serve to facilitate communication functions.

In some embodiments, the wireless communication subsystem 3425 includes radio frequency receivers and transmitters, and optical receivers and transmitters (not shown in FIG. 34). These receivers and transmitters of some embodiments are implemented to operate over one or more communication networks such as a GSM network, a Wi-Fi network, a Bluetooth network, etc. The audio subsystem 3430 is coupled to a speaker to output audio (e.g., to output voice navigation instructions). Additionally, the audio subsystem 3430 is coupled to a microphone to facilitate voice-enabled functions in some embodiments.

The I/O subsystem 3435 involves the transfer between input/output peripheral devices, such as a display, a touch screen, etc., and the data bus of the processing units 3405 through the peripherals interface 3415. The I/O subsystem 3435 includes a touch-screen controller 3455 and other input controllers 3460 to facilitate the transfer between input/output peripheral devices and the data bus of the processing units 3405. As shown, the touch-screen controller 3455 is coupled to a touch screen 3465. The touch-screen controller 3455 detects contact and movement on the touch screen 3465 using any of multiple touch sensitivity technologies. The other input controllers 3460 are coupled to other input/control devices, such as one or more buttons. Some embodiments include a near-touch sensitive screen and a corresponding controller that can detect near-touch interactions instead of or in addition to touch interactions.

The memory interface 3410 is coupled to memory 3470. In some embodiments, the memory 3470 includes volatile memory (e.g., high-speed random access memory), non-volatile memory (e.g., flash memory), a combination of volatile and non-volatile memory, and/or any other type of memory. As illustrated in FIG. 34, the memory 3470 stores an operating system (OS) 3471. The OS 3471 includes instructions for handling basic system services and for performing hardware dependent tasks. The memory 3470 additionally includes layout and presentation instructions 3472 in order for the device 3400 to perform the layout generation and the presentation management operations of some embodiments. In some embodiments, these instructions 3472 may be a subset of the operating system instructions 3471, or may be part of the instructions for an application such as the reader application.

The memory 3470 also includes communication instructions 3474 to facilitate communicating with one or more additional devices (e.g., for peer-to-peer data sharing, or to connect to a server through the Internet for cloud-based data sharing); graphical user interface instructions 3476 to facilitate graphic user interface processing; image processing instructions 3478 to facilitate image-related processing and functions; input processing instructions 3480 to facilitate input-related (e.g., touch input) processes and functions; audio processing instructions 3482 to facilitate audio-related processes and functions; and camera instructions 3484 to facilitate camera-related processes and functions. The instructions described above are merely exemplary and the memory 3470 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 34 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 34 may be split into two or more integrated circuits.

B. Computer System

Figure 35:
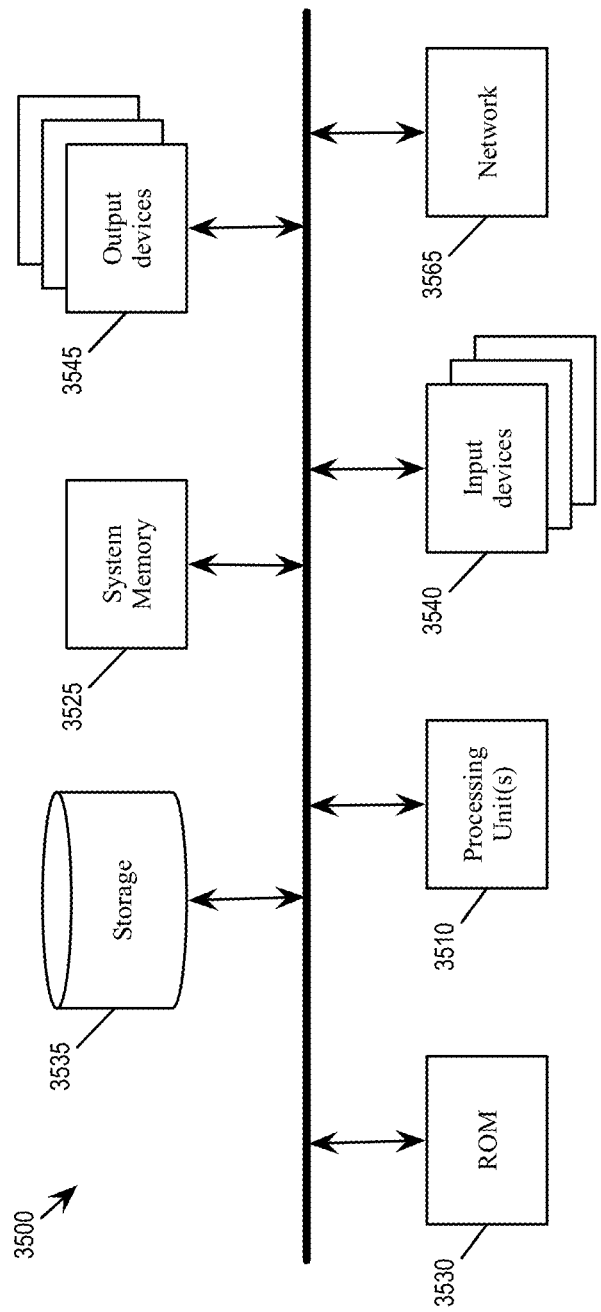
FIG. 35 conceptually illustrates an electronic system with which some embodiments of the invention are implemented.

FIG. 35 conceptually illustrates another example of an electronic system 3500 with which some embodiments of the invention are implemented. The electronic system 3500 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 3500 includes a bus 3505, processing unit(s) 3510, a graphics processing unit (GPU) 3515, a system memory 3520, a network 3525, a read-only memory 3530, a permanent storage device 3535, input devices 3540, and output devices 3545.

The bus 3505 collectively represents all system, peripheral, and chipset buses that communicatively connect the numerous internal devices of the electronic system 3500. For instance, the bus 3505 communicatively connects the processing unit(s) 3510 with the read-only memory 3530, the GPU 3515, the system memory 3520, and the permanent storage device 3535.

From these various memory units, the processing unit(s) 3510 retrieves instructions to execute and data to process in order to execute the processes of the invention. The processing unit(s) may be a single processor or a multi-core processor in different embodiments. Some instructions are passed to and executed by the GPU 3515. The GPU 3515 can offload various computations or complement the image processing provided by the processing unit(s) 3510. In some embodiments, such functionality can be provided using CoreImage's kernel shading language.

The read-only-memory (ROM) 3530 stores static data and instructions that are needed by the processing unit(s) 3510 and other modules of the electronic system. The permanent storage device 3535, on the other hand, is a read-and-write memory device. This device is a non-volatile memory unit that stores instructions and data even when the electronic system 3500 is off. Some embodiments of the invention use a mass-storage device (such as a magnetic or optical disk and its corresponding disk drive, integrated flash memory) as the permanent storage device 3535.

Other embodiments use a removable storage device (such as a floppy disk, flash memory device, etc., and its corresponding drive) as the permanent storage device. Like the permanent storage device 3535, the system memory 3520 is a read-and-write memory device. However, unlike storage device 3535, the system memory 3520 is a volatile read-and-write memory, such a random access memory. The system memory 3520 stores some of the instructions and data that the processor needs at runtime. In some embodiments, the invention's processes are stored in the system memory 3520, the permanent storage device 3535, and/or the read-only memory 3530. For example, the various memory units include instructions for processing multimedia clips in accordance with some embodiments. From these various memory units, the processing unit(s) 3510 retrieves instructions to execute and data to process in order to execute the processes of some embodiments.

The bus 3505 also connects to the input and output devices 3540 and 3545. The input devices 3540 enable the user to communicate information and select commands to the electronic system. The input devices 3540 include alphanumeric keyboards and pointing devices (also called "cursor control devices"), cameras (e.g., webcams), microphones or similar devices for receiving voice commands, etc. The output devices 3545 display images generated by the electronic system or otherwise output data. The output devices 3545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 35, bus 3505 also couples electronic system 3500 to a network 3525 through a network adapter (not shown). In this manner, the computer can be a part of a network of computers (such as a local area network ("LAN"), a wide area network ("WAN"), or an Intranet), or a network of networks, such as the Internet. Any or all components of electronic system 3500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 8, 10, 16, 21, 25, and 32) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

VI. JSON-Based CPSL

This section describes JSON-based CPSL, which some embodiments of the invention adopts as the Native Format of the authored conent delivery system. Some embodiments use this format to provide content, metadata, and resources (such as images) in a CPS. A CPS written in the Native format is also referred to as a Native Document.

A basic Native document contains the required properties defined in this section. Semantic information about the components of the content can also be included, as can styling and layout information, mapped according to the role property of each component. The following is a list of properties of a basic Native Document:

| property | type | contains | description | required | version |
|---|---|---|---|---|---|
| version | string | | The Native format version used in this JSON document. | yes | 0.9 |
| identifier | string | | A unique identifier for this article. This identifier must remain the same each time the article is updated. | yes | 0.9 |
| title | string | | The article title. | yes | 0.9 |
| subtitle | string | | An optional article subtitle. | no | 0.10 |
| language | string | | A code that indicates the language of the article. Use the IANA.org language subtag registry to find the appropriate code; e.g., en for English, or more specific: en_UK for English (U.K.) or en_US for English (U.S.). | yes | 0.9 |
| layout | Layout | | The layout parameters used in the original design of this article. This information may be used to calculate relative positioning and size for other views of the article. | yes | 0.9 |
| components | array | Component | An array of components that make up this article. Components have different roles and types; e.g., Text, Image, Music. | yes | 0.9 |
| componentTextStyles | object | ComponentTextStyle | The component text styles that are available for reference from within this document. Each article.json document must have at least a default ComponentTextStyle named default. | yes | 0.9 |

-continued

| property | type | contains | description | required | version |
|---|---|---|---|---|---|
| | | | Components without an explicitly referenced text style will look for a text style called default-role in the componentTextStyles section, where role is the component's role. For example, Title components without an explicit textStyle will look for a default-title in the componentTextStyles. When no default-role style is available, the default text style is used. | | |
| metadata | Metadata | | Article metadata for defining publish date, authors and other document information. | no | 0.9 |
| documentStyle | DocumentStyle | | Allows to set the background color for the entire article. | no | 0.10 |
| textStyles | object | TextStyle | The inline text styles that are available for reference from within this document. | no | 0.9 |
| componentStyles | object | ComponentStyle | The component styles that are available for reference from within this document. | no | 0.9 |
| componentLayouts | object | ComponentLayout | Document-level ComponentLayout objects that can be referenced by identifier from Components. | no | 0.9 |

Example

```
{
    "version": "0.10",
    "identifier": "SampleArticle",
    "language": "en",
    "title": "Sample Article",
    "subtitle": "A Very Basic Article",
    "layout": {
        "columns": 7,
        "width": 1024,
        "margin": 75,
        "gutter": 20
    },
    "components": [
        {
            "role": "title",
            "text": "A Very Basic Article",
            "textStyle": "title"
        },
        {
            "role": "body",
            "text": "It was a dark and stormy night. Suddenly, a shot rang out!"
        },
        {
            "role": "photo",
            "URL": "bundle://image.jpg"
        }
    ],
    "documentStyle": {
        "backgroundColor": "F7F7F7"
    },
    "componentTextStyles": {
        "default": {
            "fontName": "Helvetica",
            "fontSize": 13,
```

-continued

```
            "linkStyle": {
                "textColor": "428bca"
            }
        },
        "title": {
            "fontName": "Helvetica-Bold",
            "fontSize": 30,
            "hyphenation": false
        },
        "default-body": {
            "fontName": "Helvetica",
            "fontSize": 13
        }
    }
}
```

The following are the different types of objects used in Native documents in some embodiments:

Animations

Animations can be applied to individual components. Combined sets of animations, called Scenes, can be applied to a Header component that is a child component of a Section or a Chapter. Subsection A below further describes various types of animations.

Behaviors

These components can be thought of as defining the physics of a component and its context. Sub section B below further describes various types of behaviors.

Components

Native component definitions are available for many types of content, including Text, Image, and Pullquote. Each type extends the abstract Component. Subsection C below describes various types of components.

Layouts
Objects that define layout information for a document or the components within a document. Subsection D below further describes various types of layouts objects.

Styles
Style definitions that can be applied to components or text. Subsection E below further describes various types of style definitions.

Anchor
Defines the anchoring of one component to another component. An Anchor can be used to align components vertically. Subsection F below further describes anchoring.

Metadata
Various metadata for a Native document.

A. Animations
Animations can be applied to individual components. Combined sets of animations, called Scenes, can be applied to a Header component that is a child component of a Section or a Chapter.

Component Animations
Component animations are applied to individual components. Some animations are userControllable (can be controlled by user action).

Scenes
Section and Chapter components can have scene animations. A scene is a combination of animations and behaviors.
To use a scene, apply it to a Header component that is a child of a Section or Chapter.

Component Animations
Component animations are applied to individual components. Some animations are userControllable (can be controlled by user action).

ComponentAnimation
This abstract animation component definition is the basis for the other animation types that extend it.

AppearAnimation
A type of animation that defines a simple "appear" of a component. When this animation is applied, the component starts out invisible. As it enters the user's view, it appears with a slight fade-in.
See also FadeInAnimation, which allows you to set the initial appearance of the component.

FadeInAnimation
A type of animation that defines a simple "appear" of a component. The initial alpha of the component is configurable, and the component will fade in as it enters the view.

MoveInAnimation
A type of animation in which the component moves into view from the left or right side of the screen. Initially, the component is off screen.
One can configure a preferred starting position, but this position is not guaranteed. If another component is blocking the preferred position, the move-in animation will attempt to start from the opposite side. If both sides are covered by other components, the move-in animation will not be applied.

ScaleFadeAnimation
A type of animation that defines a scale-and-fade-in effect for a component. Initially, the component is scaled down and partially transparent. Upon entering the view, the component will scale up to a factor of 1 and fade in to be completely visible.

ComponentAnimation Abstract
This abstract animation component definition is the basis for the other animation types that extend it. This applies to only the objects that extend ComponentAnimation.

Properties

| property | type | contains | description | required | version |
| --- | --- | --- | --- | --- | --- |
| type | string | | Type of animation, e.g., move_in for a MoveInAnimation. | yes | 0.10 |
| userControllable | boolean | | Indicates whether the animation is controlled by user action (true) or happens automatically (false). Note that for some animations, this property cannot be set to true because the animation cannot be controlled by users; instead, it can only happen automatically. If userControllable cannot be set, the documentation for the animation contains a note to that effect. Default value: false | no | 0.10 |

Example

```
{
    "type": "move_in",
    "userControllable": false
}
```

Extended By
AppearAnimation/FadeInAnimation/MoveInAnimation/ScaleFadeAnimation

Used in Component

AppearAnimation
A type of animation that defines a simple "appear" of a component. When this animation is applied, the component starts out invisible. As it enters the user's view, it appears with a slight fade-in. See also FadeInAnimation, which allows one to set the initial appearance of the component.
Extends Abstract ComponentAnimation
Properties

| property | type | contains | description | required | version |
| --- | --- | --- | --- | --- | --- |
| type | string | | This animation always has the type appear. | yes | 0.10 |
| userControllable | boolean | | This animation cannot be controlled by users, so any value set for this property will be ignored. | no | 0.10 |

Example

```
{
    "type": "appear"
}
```

FadeInAnimation
A type of animation that defines a simple "appear" of a component. The initial alpha of the component is configurable, and the component will fade in as it enters the view.
Extends Abstract ComponentAnimation Properties

| property | type | contains | description | required | version |
|---|---|---|---|---|---|
| type | string | | This animation always has the type fade_in. | yes | 0.10 |
| userControllable | boolean | | Indicates whether the animation is controlled by user action (true) or happens automatically (false). Note that for some animations, this property cannot be set to true because the animation cannot be controlled by users; instead, it can only happen automatically. If userControllable cannot be set, the documentation for the animation contains a note to that effect. Default value: false | no | 0.10 |
| initialAlpha | float | | The initial alpha value of the component (and the animation). Set alpha to a value between 0 (completely transparent) and 1 (completely visible). Default value: 0.3 | no | 0.10 |

Example

```
{
    "type": "fade_in",
    "userControllable": true,
    "initialAlpha": 0.5
}
```

MoveInAnimation

A type of animation in which the component moves into view from the left or right side of the screen. Initially, the component is off screen. One can configure a preferred starting position, but this position is not guaranteed. If another component is blocking the preferred position, the move-in animation will attempt to start from the opposite side. If both sides are covered by other components, the move-in animation will not be applied. Extends Abstract ComponentAnimation Properties

| property | type | contains | description | required | version |
|---|---|---|---|---|---|
| type | string | | This animation always has the type move_in. | yes | 0.10 |
| userControllable | boolean | | Indicates whether the animation is controlled by user action (true) or happens automatically (false). Note that for some animations, this property cannot be set to true because the animation cannot be controlled by users; instead, it can only happen automatically. If userControllable cannot be set, the documentation for the animation contains a note to that effect. Default value: false | no | 0.10 |
| preferredStartingPosition | string | | The preferred starting position for the animation. The value left will animate the component from the left side of the screen. The value right will animate the component from the right side of the screen. By default, the animation will start on the side that is closest to the component. | no | 0.10 |

Example

```
{
    "type": "move_in",
    "preferredStartingPosition": "left"
}
```

ScaleFadeAnimation

A type of animation that defines a scale-and-fade-in effect for a component. Initially, the component is scaled down and partially transparent. Upon entering the view, the component will scale up to a factor of 1 and fade in to be completely visible. Extends Abstract ComponentAnimation Properties

| property | type | contains | description | required | version |
|---|---|---|---|---|---|
| type | string | | This type of animation always has the value scale_fade. | yes | 0.10 |
| userControllable | boolean | | Indicates whether the animation is controlled by user action (true) or happens automatically (false). Note that for some animations, this property cannot be set to true because the animation cannot be controlled by users; instead, it can only happen automatically. If userControllable cannot be set, the documentation for the animation contains a note to that effect. Default value: false | no | 0.10 |
| initialAlpha | float | | The initial alpha value of the component (and the animation). Set alpha to a value between 0 (completely transparent) and 1 (completely visible). Default value: 0.25 | no | 0.10 |
| initialScale | float | | The initial scale of the component (and the animation). Set scale to a value between 0 (completely scaled down) and 1 (the component's original size). Default value: 0.75 | no | 0.10 |

Example

```
{
  "type": "scale_fade",
  "initialAlpha": 0.5,
  "initialScale": 0.75
}
```

Scenes

Section and Chapter components can have scene animations. A scene is a combination of animations and behaviors.

To use a scene, apply it to a Header component that is a child of a Section or Chapter.

Scene Abstract

This abstract scene definition is the basis for the other scene types that extend it.

FadingStickyHeader

One can use this scene on a Section or Chapter that contains a Header component (a component with the role header). The Header component will briefly stick to the top of the screen as the reader scrolls through the article. While the user scrolls down (away from the header component), the header background—either a background color, ImageFill, or LinearGradientFill—will fade to the color defined in the fadeColor property.

ParallaxScaleHeader

One can use this scene on a Section or Chapter that contains a Header component (a component with the role header). While the reader scrolls down (away from the header component), the header background—either an ImageFill or a LinearGradientFill—will zoom out and scroll slightly more slowly than the user scroll interaction, giving the impression of a parallax effect.

Scene Abstract

This abstract scene definition is the basis for the other scene types that extend it. This is an abstract definition. This is only used for objects that extend Scene.

Properties

| property | type | contains | description | required | version |
|---|---|---|---|---|---|
| type | string | | Type of scene, e.g., parallax_scale for a ParallaxScaleHeader scene. | yes | 0.10 |

Example

```
{
  "type": "fading_sticky_header"
}
```

Extended By
FadingStickyHeader
ParallaxScaleHeader
Used in
Chapter
Section
FadingStickyHeader One can use this scene on a Section or Chapter that contains a Header component (a component with the role header). The Header component will briefly stick to the top of the screen as the reader scrolls through the article. While the user scrolls down (away from the header component), the header background—either a background color, ImageFill, or LinearGradientFill—will fade to the color defined in the fadeColor property.

Extends Abstract Scene
Properties

| property | type | contains | description | required | version |
|---|---|---|---|---|---|
| type | string | | This scene always has the type fading_sticky_header. | yes | 0.10 |
| fadeColor | string | | The color the header background will fade to, defined as a 3- to 8-character hexadecimal string. Default value: 00000 (black) | no | 0.10 |

Example

Note: Object examples cannot be used with the Preview Tool without additional structure. Examples are for use within a complete article and may need parent objects to function properly.

```
{
    "type": "fading_sticky_header",
    "fadeColor": "00"
}
```

ParallaxScaleHeader

One can use this scene on a Section or Chapter that contains a Header component (a component with the role header). While the reader scrolls down (away from the header component), the header background—either an ImageFill or a LinearGradientFill—will zoom out and scroll slightly more slowly than the user scroll interaction, giving the impression of a parallax effect. Extends Abstract Scene Properties

| property | type | contains | description | required | version |
|---|---|---|---|---|---|
| type | string | | This scene always has the type parallax_scale. | yes | 0.10 |

Example

Note: Object examples cannot be used with the Preview Tool without additional structure. Examples are for use within a complete article and may need parent objects to function properly.

{"type": "parallax_scale"}

B. Behaviors

These components can be thought of as defining the physics of a component and its context.

Behavior Abstract

A behavior defines the physics of a component and its context. A behavior can say something about the gravitational effect of a component, or how it reacts to device motion.

Background Motion

When this behavior is applied, the background of the component will move in the opposite direction of the device motion, much like the background image on an iPhone home screen.

Background Parallax

When this behavior is applied, the background of the component will move slightly more slowly than the scroll speed.

Motion

When this behavior is applied, the component will react to the movement of the device. When the user tilts their device, the component will move in the same direction.

Parallax

When this behavior is applied, the component will move at a different speed than the scroll speed. The speed at which the component moves can be defined with factor.

Springy

When this behavior is applied, the component behaves as if it is held in place using a short spring.

Behavior Abstract

A behavior defines the physics of a component and its context. A behavior can say something about the gravitational effect of a component, or how it reacts to device motion.

Properties

| property | type | contains | description | required | version |
|---|---|---|---|---|---|
| type | string | | The type of behavior. For example, parallax for Parallax. | yes | 0.10 |

Example

{"type": "motion"}

Extended By
Background Motion
Background Parallax
Motion
Parallax
Springy
Used in Component
Background Motion When this behavior is applied, the background of the component will move in the opposite direction of the device motion, much like the background image on an iPhone home screen.

Extends Abstract Behavior

Properties

| property | type | contains | description | required | version |
|---|---|---|---|---|---|
| type | string | | This behavior always has the type background_motion. | yes | 0.10 |

Example

```
{
    "type": "background_motion"
}
```

Background Parallax

When this behavior is applied, the background of the component will move slightly more slowly than the scroll speed.

Extends Abstract Behavior

Properties

| property | type | contains | description | required | version |
|---|---|---|---|---|---|
| type | string | | This behavior always has the type background_parallax. | yes | 0.10 |

Example

{"type": "background_parallax"}

Motion

When this behavior is applied, the component will react to the movement of the device. When the user tilts their device, the component will move in the same direction.

Extends Abstract Behavior

Properties

| property | type | contains | description | required | version |
|---|---|---|---|---|---|
| type | string | | This behavior always has the type motion. | yes | 0.10 |

Example

```
{
  "type": "motion"
}
```

Parallax

When this behavior is applied, the component will move at a different speed than the scroll speed. The speed at which the component moves can be defined with factor.

Extends Abstract Behavior

Properties

| property | type | contains | description | required | version |
|---|---|---|---|---|---|
| type | string | | This behavior always has the type parallax. | yes | 0.10 |
| factor | float | | The parallax factor 1.0 sets a speed equal to the scroll speed. A factor lower than 1.0 will make the component move more slowly than the user scrolls. A factor higher than 1.0 means the component will move more quickly than the scrolling speed. This factor must be between 0.5 and 2.0. Values outside of this range will be reset to the minimum or maximum value. If this property is omitted, a default value of 0.9 will be applied. | no | 0.10 |

Example

```
{
  "type": "parallax",
  "factor": 0.8
}
```

Springy

When this behavior is applied, the component behaves as if it is held in place using a short spring.

Extends Abstract Behavior

Properties

| property | type | contains | description | required | version |
|---|---|---|---|---|---|
| type | string | | This behavior always has the type springy. | yes | 0.10 |

Example

```
{
  "type": "springy"
}
```

C. Components

Native component definitions are available for many types of content, including Text, Image, and Pullquote. Each type extends the abstract Component.

Component Abstract

A component definition. Many properties can be omitted; same defaults will be inferred.

Advertisements

Component definitions for advertisements: Medium Rectangle Advertisement and Banner Advertisement.

Audio Abstract

Generic audio component.

Author

The name of one of the authors of the article. Note that a Byline component is also available.

Body

The article's body text. An article can contain multiple body components.

Byline

A byline describes one or more contributors to the article, and usually includes the word "by" or "from" as well as the contributors' names. Note that components for the names of specific contributors are also available: Author, Illustrator, and Photographer.

The byline may also include the date of publication, as text.

Caption

The text of a caption for another component in the document.

Chapter

A chapter is similar to a Section: it's a full-width container with child components. One can use it to divide an article into separate parts with different styling. The overall height of a chapter component is determined by the height of its child components. Chapter components can exist only at the top level of the document.

Note: Be sure to use the component that is the best semantic fit for your content: Section or Chapter.

Container

A container component has child components that are rendered relative to the parent component. Containers can also include layout and styling information. The minimum size of a container component is determined by the size of its child components.

Divider

Describes a horizontal divider line.

Embed Web Video

A component that displays an embeddable web video from YouTube or Vimeo.

Figure

Renders an image that is considered a figure. Figures are graphical depictions of information that adds important context to the article. In contrast to Photos that may be cropped, figures are displayed without alteration, to the extent possible.

Gallery

A gallery component displays a sequence of images as a horizontal strip. Use this component for sequences of images where the ordering of the items is important to the story.

Header

A header (top area) can be defined for an article, or for a Section or Chapter. A header can contain child components. In most cases, a header will contain a Title or Heading. A header can also have an ImageFill and can include layout and styling information.

The minimum size of a header component is determined by the size of its child components.

Heading

Describes a heading in an article, such as a section title. Six different heading roles (hierarchical levels) are available.

Illustrator

The name of a contributor whose illustrations appear in the article. Note that a Photographer component is also available.

Image Abstract

Image component for displaying JPEG, PNG, or GIF images.

Instagram

With the Instagram component, one can embed an Instagram post in an article.

Intro

Text that serves as the introduction of the article.

Logo

Describes an image of a company logo or brand.

Mosaic

A mosaic-style gallery. This gallery displays a sequence of images as a mosaic.

Music

Add a song to your article. The Music component allows you to play an audio file and optionally display an image (such as cover art).

Photo

Renders a photograph.

Photographer

The name of a contributor whose photographs appear in the article. Note that an Illustrator component is also available.

Portrait

A photograph of a person.

Pullquote

A pullquote is usually a selection from the body text (a duplication). Pullquotes are often used to break up long portions of text or draw attention to the text near the pullquote.

Quote

The text of a quote. Unlike a Pullquote, a quote is usually not duplicated content.

Scalable Image Abstract

Scalable images include Figures, Portraits, and Photos. A caption can be displayed when the image is presented full screen.

Section

A section is a full-width Container with child components. One can use a section component to divide an article into separate parts with different styling. The overall height of a section component is determined by the height of its child components. Section components can exist only at the top level of the document.

Note: Be sure to use the component that is the best semantic fit for your content: Section or Chapter.

Text Abstract

Generic text component. Many properties may be omitted; sane defaults will be inferred.

Title

The article's main title.

Tweet

With the Tweet component, one can embed a Twitter tweet in an article.

Video

A component that displays a video.

Component Abstract

A component definition. Many properties can be omitted; sane defaults will be inferred.

Properties

| property | type | contains | description | required | version |
|---|---|---|---|---|---|
| role | string | | The role of a component (for example, title, body, or pullquote) says something about the semantic value of the content. A role captures intent, meaning and behavior. A role can have design significance; styling and behavior can be derived from it. Roles are also used for accessibility, indicating which components support VoiceOver. Note that the value of the role property is simply the role name; it does not include the text or other information the role describes. For example, a role with the value pullquote would describe a text property whose value is the actual pullquote text. The available roles are listed in the Roles.md file attached to this page (see below). | yes | 0.9 |
| identifier | string | | An optional unique identifier for this component. If used, this identifier must be unique across the entire document. You will need an identifier for your component if you want to Anchor other components to it. | no | 0.9 |

-continued

| property | type | contains | description | required | version |
|---|---|---|---|---|---|
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |

Example

Note: Component examples cannot be used with the Preview Tool without additional structure. Examples are for use within a complete article and may need parent objects to function properly.

```
{
    "role": "pullquote",
    "text": "The text of the pullquote.",
    "layout": {
        "columnStart": 0,
        "columnSpan": 4
    }
}
```

Extended By
Banner Advertisement
Medium Rectangle Advertisement
Audio
Container
Divider
Embed Web Video
Gallery
Image
Instagram
Mosaic
Scalable Image
Text
Tweet
Video
Used In
Chapter
Container
Header
Section
Basic
Referenced From
Anchor.targetComponentIdentifier
Component Roles
This summarizes the available roles. Refer to the component definitions for more details.
 Text Roles
 Body
 Article body text.
 Title
 Text that will be treated and positioned as the document title.
 Heading
 Text that will be treated as a heading or subheading, depending on the context. One can use multiple levels of subheadings: heading1, heading2, heading3, heading4, heading5.
 Intro
 An introduction text for the article.
 Pullquote
 A pullquote is usually a selection from the body text, often used to break up long portions of text or draw attention to a specific section.
 Quote
 A quote in the article text. A quote is treated differently than a pullquote: a quote is a unique portion of text, while a pullquote duplicates a selection of text.
 Caption
 Caption text for another component in the document, such as a photo.
 Byline
 Text that describes one or more contributors to the article.
 Author
 The name of an author of the article.
 Photographer
 The name of a contributor whose photographs appear in the article.
 Illustrator
 The name of a contributor whose illustrations appear in the article.
 Image Roles
 Photo
 A photograph; photos may be cropped when presented.
 Figure
 A figure or illustration that adds important context to the article. Figures are less likely to be cropped than photos.
 Logo
 An image that identifies a brand, company, or publication.
 Portrait
 An image that is a portrait of a person. A portrait may or may not be presented differently than a photo, depending on the template used.

Gallery
A collection of images displayed in a horizontal strip.
Mosaic
A collection of images displayed in a mosaic layout.
Media Roles
Video
A component that can play a video.
Embedvideo
A component that contains a link to an embeddable web video (e.g., YouTube or Vimeo).
Audio
A component that can play audio.
Music
A component that plays an audio file and can also display an accompanying image (such as cover art).
Container
A container component has child components that are rendered relative to the parent component. Containers can also include layout and styling information.
Divider
A horizontal divider line.
Section
A full-width container with child components. See the Section component definition for more details.
Chapter
A type of section; text that is intended to be viewed as a chapter.
Advertisements
Component definitions for advertisements: Medium Rectangle Advertisement and Banner Advertisement.
Banner Advertisement
Banner advertisements always span the full width of the screen. These components can exist only as top-level components (not within Container components) or as immediate descendants of Section or Chapter components.
Medium Rectangle Advertisement
"Medium rectangle" advertisements have a fixed size of 320×250 points.
Banner Advertisement
Banner advertisements always span the full width of the screen. These components can exist only as top-level components (not within Container components) or as immediate descendants of Section or Chapter components. Extends Abstract Component
Properties

| property | type | contains | description | required | version |
|---|---|---|---|---|---|
| role | string | | This component always has the role banner_advertisement. | yes | 0.10 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| bannerType | string | | The banner type that should be shown. Valid types are any (Default), standard, double_height, and large. | no | 0.10 |

Example

Note: Component examples cannot be used with the Preview Tool without additional structure. Examples are for use within a complete article and may need parent objects to function properly.

```
{
    "role": "banner_advertisement",
    "bannerType": "standard"
}
```

Medium Rectangle Advertisement
"Medium rectangle" advertisements have a fixed size of 320×250 points. Extends Abstract Component Properties

| property | type | contains | description | required | version |
|---|---|---|---|---|---|
| role | string | | This component always has the role medium_rectangle_advertisement. | yes | 0.10 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |

Example

Note: Component examples cannot be used with the Preview Tool without additional structure. Examples are for use within a complete article and may need parent objects to function properly.

```
{
    "role": "medium_rectangle_advertisement"
}
```

Audio Abstract

Generic audio component. Extends Abstract Component
This is an abstract definition. This is used only for objects that extend Audio.

Properties

| property | type | contains | description | required | version |
|---|---|---|---|---|---|
| role | string | | The type of audio file. Currently only the roles audio and music are supported. | yes | 0.9 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the | no | 0.9 |

-continued

| property | type | contains | description | required | version |
|---|---|---|---|---|---|
| style | ComponentStyle/string | | content size and the role of this component. Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| URL | string | | The URL of an audio file beginning with http:// or https://. This component supports all audio formats that are supported by AVPlayer on iOS devices. Supported audio file types include: MP3 MPEG-1 audio layer 3 AAC MPEG-4 Advanced Audio Coding ALAC Apple Lossless HE-AAC MPEG-4 High Efficiency AAC For a full list of supported codecs, refer to the Supported Audio Formats developer documentation[1]. | yes | 0.9 |
| imageURL | string | | An optional URL to an image that should accompany the audio file, such as a still or a cover image. Supported image types include JPEG (with .jpg or .jpeg extension), PNG, and GIF. For use in the Preview Tool, image URLs must begin with bundle:// and must refer to images in the same directory as the document. Image file names should be properly encoded as URLs. For example, spaces in a URL should be encoded as %20. | no | 0.9 |
| caption | string | | A caption that describes the content of the audio file. This text can be used by VoiceOver, or it can be shown when the audio cannot be played. | no | 0.9 |
| accessibilityCaption | string | | Optional caption text describing the contents of the audio file. Note that this property differs from caption: although the caption may be displayed to readers, the accessiblityCaption is used for VoiceOver[2] only. If this | no | 0.10 |

| property | type | contains | description | required | version |
|---|---|---|---|---|---|
| explicitContent | boolean | | property is omitted, the value from the caption is used for VoiceOver. This property indicates that the audio track may contain explicit/graphic content. Default value: false | no | 0.10 |

[1] Supported Audio Formats Developer Documentation available at https://developer.apple.com/library/ios/documentation/AudioVideo/Conceptual/MultimediaPG/RevisionHistory.html//apple_ref/doc/uid/TP40009767-CH99-SW1
[2] VoiceOver available at https://www.apple.com/accessibility/ios/voiceover/

Example

Note: Component examples cannot be used with the Preview Tool without additional structure. Examples are for use within a complete article and may need parent objects to function properly.

```
{
    "role": "audio",
    "URL": "http://audio.apple.com/files/sample.mp3",
    "caption": "A sample audio file"
}
```

Extended By Music
Author
The name of one of the authors of the article. Note that a Byline component is also available.
Extends Abstract Text
Properties

| property | type | contains | description | required | version |
|---|---|---|---|---|---|
| role | string | | This component always has the role author. | yes | 0.9 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline ComponentStyle object that defines the appearance of this component, or a string reference to a | no | 0.9 |

-continued

| property | type | contains | description | required | version |
|---|---|---|---|---|---|
| | | | ComponentStyle that is defined at the top level of the document. | | |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| text | string | | The text, styled according to the textStyle definition. One can also use a subset of Markdown syntax by setting format to markdown, or by styling ranges of text individually using inlineTextStyles. When format is set to markdown, one can apply *emphasis* and strong emphasis, and one can add dividers, lists, and links. Please see the attached list of supported Markdown formatting. | yes | 0.9 |
| format | string | | The formatting or markup method applied to the text. Valid values: markdown and none (default) If format is set to markdown, inlineTextStyles are not supported. | no | 0.10 |
| textStyle | ComponentTextStyle/string | | Either an inline ComponentTextStyle object that contains styling or information, a string reference to a ComponentTextStyle object that is defined at the top level of the document in the componentTextStyles property. | no | 0.9 |
| inlineTextStyles | array | InlineTextStyle | By providing an array of InlineTextStyle objects, one can apply different text styles to ranges of text. For each inline text style, you should supply a rangeStart, rangeLength, and either a TextStyle or the identifier of a TextStyle that is defined at the top level of the document. Inline text styles are ignored when format is set to markdown. | no | 0.10 |

Example

Note: Component examples cannot be used with the Preview Tool without additional structure. Examples are for use within a complete article and may need parent objects to function properly.

```
{
    "role": "author",
    "text": "Chris Katzner"
}
```

Body

The article's body text. An article can contain multiple body components. Extends Abstract Text

Properties

| property | type | contains | description | required | version |
|---|---|---|---|---|---|
| role | string | | This component always has the role body. | yes | 0.9 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| text | string | | The text, styled according to the textStyle definition. One can also use a subset of Markdown syntax by setting | yes | 0.9 |

-continued

| property | type | contains | description | required | version |
|---|---|---|---|---|---|
| format | string | | format to markdown, or by styling ranges of text individually using inlineTextStyles. When format is set to markdown, one can apply *emphasis* and strong emphasis, and one can add dividers, lists, and links. Please see the attached list of supported Markdown formatting. The formatting or markup method applied to the text. Valid values: markdown and none (default) If format is set to markdown, inlineTextStyles are not supported. | no | 0.10 |
| textStyle | ComponentTextStyle/string | | Either an inline ComponentTextStyle object that contains styling information, or a string reference to a ComponentTextStyle object that is defined at the top level of the document in the componentTextStyles property. | no | 0.9 |
| inlineTextStyles | array | InlineTextStyle | By providing an array of InlineTextStyle objects, one can apply different text styles to ranges of text. For each inline text style, you should supply a rangeStart, rangeLength, and either a TextStyle or the identifier of a TextStyle that is defined at the top level of the document. Inline text styles are ignored when format is set to markdown. | no | 0.10 |

Example

Note: Component examples cannot be used with the Preview Tool without additional structure. Examples are for use within a complete article and may need parent objects to function properly.

{
  "role": "body",
  "text": "We crossed the footbridge and the entrance to the cave was exposed. It was an easy climb 15 feet up from the beaten path. A single dead tree stood on top of the rock ledge that served as the roof of the cave, almost as if it had been strategically placed there. Its white bark stood out against the rest of the trees and all of its branches had fallen off over time. It seemed like more than a coincidence that this specific tree served as the perfect landmark for the cave. It was clear that other hikers had made it a point to venture up into the cave. Some symbols resembling *hieroglyphics*, etched into the stone, added to the cave's allure.",
  "format": "markdown"
}

Byline

A byline describes one or more contributors to the article, and usually includes the word "by" or "from" as well as the contributors' names. Note that components for the names of specific contributors are also available: Author, Illustrator, and Photographer. The byline may also include the date of publication, as text. Extends Abstract Text Properties

| property | type | contains | description | required | version |
|---|---|---|---|---|---|
| role | string | | This component always has the role byline. | yes | 0.10 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| text | string | | The text, styled according to the textStyle definition. One can also use a subset of Markdown syntax by setting format to markdown, or by styling ranges of text individually using inlineTextStyles. When format is set to markdown, one can apply *emphasis* and strong emphasis, and one can add dividers, lists, and links. Please see the attached list of supported Markdown formatting. | yes | 0.9 |
| format | string | | The formatting or markup method applied to the text. | no | 0.10 |

-continued

| property | type | contains | description | required | version |
|---|---|---|---|---|---|
| | | | Valid values: markdown and none (default) If format is set to markdown, inlineTextStyles are not supported. | | |
| textStyle | ComponentTextStyle/string | | Either an inline ComponentTextStyle object that contains styling information, or a string reference to a ComponentTextStyle object that is defined at the top level of the document in the componentTextStyles property. | no | 0.9 |
| inlineTextStyles | array | InlineTextStyle | By providing an array of InlineTextStyle objects, one can apply different text styles to ranges of text. For each inline text style, you should supply a rangeStart, rangeLength, and either a TextStyle or the identifier of a TextStyle that is defined at the top level of the document. Inline text styles are ignored when format is set to markdown. | no | 0.10 |

Example

Note: Component examples cannot be used with the Preview Tool without additional structure. Examples are for use within a complete article and may need parent objects to function properly.

```
{
    "role": "byline",
    "text": "by Chris Katzner"
}
```

Caption
The text of a caption for another component in the document. Extends Abstract Text
Properties

| property | type | contains | description | required | version |
|---|---|---|---|---|---|
| role | string | | Captions always have the role caption. | yes | 0.9 |
| identifier | string | | An optional unique identifier for this component. If used, this identifier must be unique across the entire document. You will need an identifier for your component if you want to Anchor other components to it. | no | 0.9 |

-continued

| property | type | contains | description | required | version |
|---|---|---|---|---|---|
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| text | string | | The text, styled according to the textStyle definition. One can also use a subset of Markdown syntax by setting format to markdown, or by styling ranges of text individually using inlineTextStyles. When format is set to markdown, one can apply *emphasis* and strong emphasis, and one can add dividers, lists, and links. Please see the attached list of supported Markdown formatting. | yes | 0.9 |
| format | string | | The formatting or markup method applied to the text. Valid values: markdown and none (default) If format is set to markdown, inlineTextStyles are not supported. | no | 0.10 |
| textStyle | ComponentTextStyle/string | | Either an inline ComponentTextStyle object that contains styling information, or a string reference to a ComponentTextStyle object that is defined at the top level of the | no | 0.9 |

-continued

| property | type | contains | description | required | version |
|---|---|---|---|---|---|
| inlineTextStyles | array | InlineTextStyle | document in the componentTextStyles property. By providing an array of InlineTextStyle objects, one can apply different text styles to ranges of text. For each inline text style, you should supply a rangeStart, rangeLength, and either a TextStyle or the identifier of a TextStyle that is defined at the top level of the document. Inline text styles are ignored when format is set to markdown. | no | 0.10 |

Example

Note: Component examples cannot be used with the Preview Tool without additional structure. Examples are for use within a complete article and may need parent objects to function properly.

```
{
  "role": "caption",
  "text": "New York City's finest are under increased scrutiny."
}
```

Chapter

A chapter is similar to a Section: it's a full-width container with child components. One can use it to divide an article into separate parts with different styling. The overall height of a chapter component is determined by the height of its child components. Chapter components can exist only at the top level of the document. Extends Container Note: Be sure to use the component that is the best semantic fit for your content: Section or Chapter.

Properties

| property | type | contains | description | required | version |
|---|---|---|---|---|---|
| role | string | | This component always has the role chapter. | yes | 0.9 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |

-continued

| property | type | contains | description | required | version |
|---|---|---|---|---|---|
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| components | array | Component | An array of components to display as child components. Child components are positioned and rendered relative to their parent component. | no | 0.9 |
| scene | Scene | | One can use a scene to apply a set of animations to the child components of this Chapter. Currently, ParallaxScaleHeader and FadingStickyHeader scenes are supported. | no | 0.10 |

Example

Note: Component examples cannot be used with the Preview Tool without additional structure. Examples are for use within a complete article and may need parent objects to function properly.

```
{
    "role": "chapter",
    "components": [
        {
            "role": "pullquote",
            "text": "The text of the pullquote.",
```

-continued

```
            "layout": {
                "columnStart": 0,
                "columnSpan": 4
            }
        }
    ]
}
```

Container

A container component has child components that are rendered relative to the parent component. Containers can also include layout and styling information. The minimum size of a container component is determined by the size of its child components. Extends Abstract Component Properties

| property | type | contains | description | required | version |
|---|---|---|---|---|---|
| role | string | | Containers always have the role container. | yes | 0.9 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline Component Style object that defines the appearance of this component, or a string reference to a ComponentStyle that is defined at the top level of the document. | no | 0.9 |
| anchor | Anchor | | An Anchor object that defines vertical alignment with another component. | no | 0.9 |

-continued

| property | type | contains | description | required | version |
|---|---|---|---|---|---|
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| components | array | Component | An array of components to render as child components. Child components are positioned and rendered relative to their parent component. | no | 0.9 |

Example

Note: Component examples cannot be used with the Preview Tool without additional structure. Examples are for use within a complete article and may need parent objects to function properly.

```
{
  "role": "container",
  "layout": {
    "columnStart": 0,
    "columnSpan": 7,
    "ignoreDocumentMargin": true
  },
  "components": [
    {
      "role": "title",
      "layout": {
        "columnStart": 0,
        "columnSpan": 7,
        "margin": {
          "top": 45,
          "bottom": 15
        }
      },
      "textStyle": "sectionTitle",
      "text": "Season Preview: Nobody Saw This Coming"
    },
    {
      "role": "quote",
      "textStyle": "body",
      "text": "We wanted to make the audience's head spin."
    }
  ]
}
```

Extended By
Chapter
Header
Section
Divider
Describes a horizontal divider line. Extends Abstract Component
Properties

| property | type | contains | description | required | version |
|---|---|---|---|---|---|
| role | string | | This component always has the role divider. | yes | 0.9 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |

| property | type | contains | description | required | version |
|---|---|---|---|---|---|
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| stroke | StrokeStyle | | The stroke properties that apply to the horizontal line. | no | 0.9 |

Example

Note: Component examples cannot be used with the Preview Tool without additional structure. Examples are for use within a complete article and may need parent objects to function properly.

```
{
  "role": "divider",
  "stroke": {
    "color": "FFC800",
    "width": 2
  }
}
```

Embed Web Video

A component that displays an embeddable web video from YouTube or Vimeo. Extends Abstract Component Properties

| property | type | contains | description | required | version |
|---|---|---|---|---|---|
| role | string | | This component always has the role embedwebvideo or embedvideo. | yes | 0.9 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline ComponentStyle object that defines the appearance of this component, or a string reference to a ComponentStyle that | no | 0.9 |

-continued

| property | type | contains | description | required | version |
|---|---|---|---|---|---|
| anchor | Anchor | | is defined at the top level of the document. An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| aspectRatio | float | | The aspect ratio of the video: width divided by height. The aspect ratio determines the height of the video player. When this property is omitted, the video player will have a 16:9 aspect ratio (1.777), and videos with ratios other than 16:9 will automatically be letterboxed. | no | 0.9 |
| URL | string | | The URL of the embeddable video to display (the YouTube or Vimeo embed link). Note that the embed URL is usually different from the standard video URL. A Vimeo embed URL typically looks like this: https://player.vimeo.com/video/121450839 A YouTube embed URL typically looks like this: https://www.youtube.com/embed/r4DQKtYL62Q | yes | 0.9 |
| caption | string | | A caption that describes the content of the video. This text can be used by VoiceOver, or it can be shown when the video cannot be played. | no | 0.9 |
| accessibilityCaption | string | | Optional caption text describing the contents of the embedded web video. Note that this property differs from caption: although the caption may be displayed to readers, the accessiblityCaption is used for VoiceOver only. The value in this property should describe the contents of the video for non-sighted users. If this property is omitted, the value from the caption is used for VoiceOver. | no | 0.10 |
| explicitContent | boolean | | This property indicates that the embedded web video and/or its still image may contain | no | 0.10 |

| property | type | contains | description | required | version |
|---|---|---|---|---|---|
| | | | explicit/graphic content. Default value: false | | |

Example

Note: Component examples cannot be used with the Preview Tool without additional structure. Examples are for use within a complete article and may need parent objects to function properly.

```
{
  "role": "embedwebvideo",
  "aspectRatio": 1.777,
  "URL": "http://player.vimeo.com/video/53018096",
  "caption": "Time-lapse video of the Swiss Matterhorn mountain",
  "accessibilityCaption": "Time-lapse video showing a view of the Swiss Matterhorn mountain and surrounding woods."
}
```

Figure

Renders an image that is considered a figure. Figures are graphical depictions of information that adds important context to the article. In contrast to Photos that may be cropped, figures are displayed without alteration, to the extent possible. Extends Abstract Scalable Image Properties

| property | type | contains | description | required | version |
|---|---|---|---|---|---|
| role | string | | This component always has the role figure. | yes | 0.9 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| URL | string | | The URL of an image file. Images should be high-resolution so they can be smoothly scaled down. Supported image types | yes | 0.9 |

| property | type | contains | description | required | version |
|---|---|---|---|---|---|
| | | | include JPEG (with .jpg or .jpeg extension), PNG, and GIF. For use in the Preview Tool, image URLs must begin with bundle:// and must refer to images in the same directory as the document. Image file names should be properly encoded as URLs. For example, spaces in a URL should be encoded as %20. | | |
| caption | string | | A string that describes the image. Captions can be used by VoiceOver, or for other purposes. To display text above or next to an image within an article, use Containers with child components, and Anchors. The rendering client may use the caption text in a full-screen display of the image. | no | 0.9 |
| accessibilityCaption | string | | Optional caption text describing the contents of the figure. Note that this property differs from caption: although the caption may be displayed to readers, the accessiblityCaption is used for VoiceOver only. The value in this property should describe the contents of the figure for non-sighted users. If this property is omitted, the value from the caption is used for VoiceOver. | no | 0.10 |
| explicitContent | boolean | | This property indicates that the figure may contain explicit/graphic content. Default value: false | no | 0.10 |

Example

Note: Component examples cannot be used with the Preview Tool without additional structure. Examples are for use within a complete article and may need parent objects to function properly.

```
{
  "role": "figure",
  "URL": "bundle://Q1-contributions.jpg",
  "caption": "Contributions to the Wildlife foundation (Q1 2014).",
  "accessibilityCaption": "Graph showing government grants for the Wildlife foundation in the first quarter of 2014."
}
```

Gallery

A gallery component displays a sequence of images as a horizontal strip. Use this component for sequences of images where the ordering of the items is important to the story. Extends Abstract Component Properties

| property | type | contains | description | required | version |
|---|---|---|---|---|---|
| role | string | | This component always has the role gallery. | yes | 0.9 |
| identifier | string | | An optional unique identifier for this component. If used, this identifier must be unique across the entire document. You will | no | 0.9 |

| property | type | contains | description | required | version |
|---|---|---|---|---|---|
| | | | need an identifier for your component if you want to Anchor other components to it. | | |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| items | array | GalleryItem | An array containing Gallery items. The order used in the array may affect layout and positioning in the gallery, depending on the gallery type. Gallery items may reference JPEG (with .jpg or .jpeg extension), PNG, or GIF images. | yes | 0.9 |

Example

Note: Component examples cannot be used with the Preview Tool without additional structure. Examples are for use within a complete article and may need parent objects to function properly.

```
{
  "role": "gallery",
  "items": [
    {
      "URL": "bundle://image1.jpg",
      "caption": "Thanks to the record drought, mountain lions have begun to descend from the peaks, sometimes into urban settings."
    },
    {
      "URL": "bundle://image2.jpg",
      "caption": "Coyotes are also seen in cities more often."
    },
    {
      "URL": "bundle://image3.jpg",
      "explicitContent": true
    }
  ]
}
```

Header

A header (top area) can be defined for an article, or for a Section or Chapter. A header can contain child components. In most cases, a header will contain a Title or Heading. A header can also have an ImageFill and can include layout and styling information. The minimum size of a header component is determined by the size of its child components.

Extends Container

Properties

| property | type | contains | description | required | version |
| --- | --- | --- | --- | --- | --- |
| role | string | | This component always has the role header. | yes | 0.10 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| components | array | Component | An array of components to render as child components. Child components are positioned and rendered relative to their parent component. | no | 0.10 |

Example

Note: Component examples cannot be used with the Preview Tool without additional structure. Examples are for use within a complete article and may need parent objects to function properly.

```
{
  "role": "header",
  "layout": {
    "columnStart": 0,
    "columnSpan": 7,
    "ignoreDocumentMargin": true,
    "minimumHeight": "65vh"
  },
  "style": {
    "fill": {
      "type": "image",
      "URL": "bundle://header-image.jpg"
    }
  },
```

-continued

```
  "components": [
    {
      "role": "title",
      "layout": {
        "columnStart": 0,
        "columnSpan": 7
      },
      "textStyle": "sectionTitle",
      "text": "Season Preview: Nobody Saw This Coming"
    },
    {
      "role": "byline",
      "textStyle": "byline",
      "text": "by John Appleseed"
    }
  ]
}
```

Heading

Describes a heading in an article, such as a section title. Six different heading roles (hierarchical levels) are available. Extends Abstract Text

| property | type | contains | description | required | version |
|---|---|---|---|---|---|
| role | string | | A heading component has the role heading, heading1, heading2, heading3, heading4, heading5, or heading6. | yes | 0.9 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |

-continued

| property | type | contains | description | required | version |
|---|---|---|---|---|---|
| behavior | Behavior | | Define Behavior for a component, like Parallax or Springy. | no | 0.10 |
| text | string | | The text, styled according to the textStyle definition. One can also use a subset of Markdown syntax by setting format to markdown, or by styling ranges of text individually using inlineTextStyles. When format is set to markdown, one can apply *emphasis* and strong emphasis, and one can add dividers, lists, and links. Please see the attached list of supported Markdown formatting. | yes | 0.9 |
| format | string | | The formatting or markup method applied to the text. Valid values: markdown and none (default) If format is set to markdown, inlineTextStyles are not supported. | no | 0.10 |
| textStyle | ComponentTextStyle/string | | Either an inline ComponentTextStyle object that contains styling information, or a string reference to a ComponentTextStyle object that is defined at the top level of the document in the componentTextStyles property. | no | 0.9 |
| inlineTextStyles | array | InlineTextStyle | By providing an array of InlineTextStyle objects, one can apply different text styles to ranges of text. For each inline text style, you should supply a rangeStart, rangeLength, and either a TextStyle or the identifier of a TextStyle that is defined at the top level of the document. Inline text styles are ignored when format is set to markdown. | no | 0.10 |

Example

Note: Component examples cannot be used with the Preview Tool without additional structure. Examples are for use within a complete article and may need parent objects to function properly.

```
{
  "role": "heading",
  "text": "Not only in New York"
}
```

Illustrator

The name of a contributor whose illustrations appear in the article. Note that a Photographer component is also available. Extends Abstract Text Properties

| property | type | contains | description | required | version |
|---|---|---|---|---|---|
| role | string | | This component always has the role illustrator. | yes | 0.10 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| text | string | | The text, styled according to the textStyle definition. One can also use a subset of Markdown | yes | 0.9 |

-continued

| property | type | contains | description | required | version |
|---|---|---|---|---|---|
| format | string | | syntax by setting format to markdown, or by styling ranges of text individually using inlineTextStyles. When format is set to markdown, one can apply *emphasis* and strong emphasis, and one can add dividers, lists, and links. Please see the attached list of supported Markdown formatting. The formatting or markup method applied to the text. Valid values: markdown and none (default) If format is set to markdown, inlineTextStyles are not supported. | no | 0.10 |
| textStyle | ComponentTextStyle/string | | Either an inline ComponentTextStyle object that contains styling information, or a string reference to a ComponentTextStyle object that is defined at the top level of the document in the componentTextStyles property. | no | 0.9 |
| inlineTextStyles | array | InlineTextStyle | By providing an array of InlineTextStyle objects, one can apply different text styles to ranges of text. For each inline text style, you should supply a rangeStart, rangeLength, and either a TextStyle or the identifier of a TextStyle that is defined at the top level of the document. Inline text styles are ignored when format is set to markdown. | no | 0.10 |

Example

Note: Component examples cannot be used with the Preview Tool without additional structure. Examples are for use within a complete article and may need parent objects to function properly.

```
{
  "role": "illustrator",
  "text": "John Appleseed"
}
```

Image Abstract
Image component for displaying JPEG, PNG, or GIF images. Extends Abstract Component
  Properties

| property | type | contains | description | required | version |
|---|---|---|---|---|---|
| role | string | | An image can have the role logo. See also Scalable Image and the the Roles.md file attached to the Component definition. | yes | 0.9 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| URL | string | | The URL of an image file. Images should be high-resolution so they can be smoothly scaled down. Supported image types: JPEG (with .jpg or .jpeg extension), PNG, and GIF. For use in the Preview Tool, image URLs must begin | yes | 0.9 |

| property | type | contains | description | required | version |
|---|---|---|---|---|---|
| | | | with bundle:// and must refer to images in the same directory as the document. Image file names should be properly encoded as URLs. For example, spaces in a URL should be encoded as %20. Images used with the Preview Tool should be no more than 20 MB, and height and width should not exceed 6000 pixels. Because minimum size is determined by the size of the component (e.g., the size of a full-width image is determined by the viewport you're using to define "full width"), there is no precise minimum size for images. Generally, images will be displayed at least at a width of 100-150 points (width and height). Therefore its best to provide an image that is at least 300 by 300 pixels at 72 dpi. | | |
| caption | string | | A string that describes the image. Captions for images may not be displayed to readers but could be used by VoiceOver, or for other purposes. | no | 0.9 |
| accessibilityCaption | string | | Optional caption text describing the contents of the image. Note that this property differs from caption: although the caption may be displayed to readers, the accessiblityCaption is used for VoiceOver only. The value in this property should describe the contents of the image for non-sighted users. If this property is omitted, the value from the caption is used for VoiceOver. | no | 0.10 |
| explicitContent | boolean | | This property indicates that the image may contain explicit/graphic content. Default value: false | no | 0.10 |

Example

Note: Component examples cannot be used with the Preview Tool without additional structure. Examples are for use within a complete article and may need parent objects to function properly.

```
{
  "role": "photo",
  "URL": "bundle://summer.jpg",
  "caption": "Thanks to the record drought, mountain lions have begun to descend, sometimes into urban settings."
}
```

Extended By Logo

Instagram

With the Instagram component, one can embed an Instagram post in an article. Extends Abstract Component Properties

| property | type | contains | description | required | version |
|---|---|---|---|---|---|
| role | string | | This component always has the role instagram. | yes | 0.10 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| URL | string | | The URL of the Instagram post you want to embed. | yes | 0.10 |

Example

Note: Component examples cannot be used with the Preview Tool without additional structure. Examples are for use within a complete article and may need parent objects to function properly.

```
{
  "role": "instagram",
  "URL": "https://instagram.com/p/1yHWrys9M-/"
}
```

Intro

Text that serves as the introduction of the article. Extends Abstract Text

Properties

| property | type | contains | description | required | version |
|---|---|---|---|---|---|
| role | string | | This component always has the role intro. | yes | 0.9 |
| identifier | string | | An optional unique identifier for this component. If used, this identifier must be unique across the entire document. You will need an identifier for your component if you want to Anchor other components to it. | no | 0.9 |

| property | type | contains | description | required | version |
|---|---|---|---|---|---|
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| text | string | | The text, styled according to the textStyle definition. One can also use a subset of Markdown syntax by setting format to markdown, or by styling ranges of text individually using inlineTextStyles. When format is set to markdown, one can apply *emphasis* and strong emphasis, and one can add dividers, lists, and links. Please see the attached list of supported Markdown formatting. | yes | 0.9 |
| format | string | | The formatting or markup method applied to the text. Valid values: markdown and none (default) If format is set to markdown, inlineTextStyles are not supported. | no | 0.10 |
| textStyle | ComponentTextStyle/string | | Either an inline ComponentTextStyle object that contains styling information, or a string reference to a ComponentTextStyle object that is defined at the top level of the | no | 0.9 |

-continued

| property | type | contains | description | required | version |
|---|---|---|---|---|---|
| inlineTextStyles | array | InlineTextStyle | document in the componentTextStyles property. By providing an array of InlineTextStyle objects, one can apply different text styles to ranges of text. For each inline text style, you should supply a rangeStart, rangeLength, and either a TextStyle or the identifier of a TextStyle that is defined at the top level of the document. Inline text styles are ignored when format is set to markdown. | no | 0.10 |

Example

Note: Component examples cannot be used with the Preview Tool without additional structure. Examples are for use within a complete article and may need parent objects to function properly.

```
{
  "role": "intro",
  "text": ""People who haven't visited the Cook Islands often say they think there is nothing to do," said a staffer at the local tourist board.",
  "format": "markdown"
}
```

Logo
Describes an image of a company logo or brand. Extends Abstract Image
Properties

| property | type | contains | description | required | version |
|---|---|---|---|---|---|
| role | string | | This component always has the role logo. | yes | 0.9 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |

| property | type | contains | description | required | version |
|---|---|---|---|---|---|
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| URL | string | | The URL of an image file. Images should be high-resolution so they can be smoothly scaled down. Supported image types include JPEG (with .jpg or .jpeg extension), PNG, and GIF. For use in the Preview Tool, image URLs must begin with bundle:// and must refer to images in the same directory as the document. Image file names should be properly encoded as URLs. For example, spaces in a URL should be encoded as %20. | yes | 0.9 |
| caption | string | | A string that describes the image. Captions for images may not be displayed to readers but could be used by VoiceOver, or for other purposes. | no | 0.9 |
| accessibilityCaption | string | | Optional caption text describing the contents of the logo. Note that this property differs from caption: although the caption may be displayed to readers, the accessiblityCaption is used for VoiceOver only. The value in this property should describe the contents of the logo for non-sighted users. If this property is omitted, the value from the caption is used for VoiceOver. | no | 0.10 |
| explicitContent | boolean | | This property indicates that the logo image may contain explicit/graphic content. Default value: false | no | 0.10 |

Example

Note: Component examples cannot be used with the Preview Tool without additional structure. Examples are for use within a complete article and may need parent objects to function properly.

```
{
  "role": "logo",
  "URL": "bundle://apple-logo-hires.png",
```

```
  "caption": "Apple Inc logo",
  "accessibilityCaption": "Logo image for technology company Apple Inc."
}
```

Mosaic

A mosaic-style gallery. This gallery displays a sequence of images as a mosaic.

Extends Abstract Component Properties

| property | type | contains | description | required | version |
|---|---|---|---|---|---|
| role | string | | This component always has the role mosaic. | yes | 0.10 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document.<br>If no layout property is present, size and position will be determined by the predefined template applied, as well as by the content size and the role of this component. | no | 0.9 |
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| items | array | GalleryItem | An array containing GalleryItems. The order used in the array may affect layout and positioning in the gallery, depending on the gallery type. Gallery items may reference JPEG (with .jpg or .jpeg extension), PNG, or GIF images. | yes | 0.10 |

Example

Note: Component examples cannot be used with the Preview Tool without additional structure. Examples are for use within a complete article and may need parent objects to function properly.

```
{
  "role": "mosaic",
  "items": [
    {
      "URL": "bundle://image1.jpg",
      "caption": "Thanks to the record drought, mountain lions have begun to descend from the peaks, sometimes into urban settings."
    },
    {
      "URL": "bundle://image2.jpg",
      "caption": "Coyotes are also seen in cities more often."
    },
    {
      "URL": "bundle://image3.jpg",
      "explicitContent": true
    }
  ]
}
```

Music

Add a song to your article. The Music component allows you to play an audio file and optionally display an image (such as cover art). Extends Abstract Audio Properties

| property | type | contains | description | required | version |
|---|---|---|---|---|---|
| role | string | | The type of audio file. Currently only the roles audio and music are supported. | yes | 0.9 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| URL | string | | The URL of an audio file beginning with http:// or https://. This component supports all audio formats that are supported by AVPlayer on iOS devices. Supported audio file types include: MP3 MPEG-1 audio layer 3 AAC MPEG-4 Advanced Audio Coding ALAC Apple Lossless HE-AAC MPEG-4 High Efficiency AAC For a full list of supported codecs, refer to the Supported Audio Formats developer documentation. | yes | 0.9 |
| imageURL | string | | An optional URL to an image that should accompany the audio file, such as a still or a cover image. Supported image types include JPEG (with | no | 0.9 |

| property | type | contains | description | required | version |
|---|---|---|---|---|---|
| | | | .jpg or .jpeg extension), PNG, and GIF. For use in the Preview Tool, image URLs must begin with bundle:// and must refer to images in the same directory as the document. Image file names should be properly encoded as URLs. For example, spaces in a URL should be encoded as %20. | | |
| caption | string | | A caption that describes the content of the audio file. This text can be used by VoiceOver, or it can be shown when the audio cannot be played. | no | 0.9 |
| accessibilityCaption | string | | Optional caption text describing the contents of the audio file. Note that this property differs from caption: although the caption may be displayed to readers, the accessiblityCaption is used for VoiceOver only. If this property is omitted, the value from the caption is used for VoiceOver. | no | 0.10 |
| explicitContent | boolean | | This property indicates that the audio track may contain explicit/graphic content. Default value: false | no | 0.10 |

Example

Note: Component examples cannot be used with the Preview Tool without additional structure. Examples are for use within a complete article and may need parent objects to function properly.

```
{
  "role": "music",
  "URL": "http://audio.apple.com/files/sample.mp3",
  "imageURL": "bundle://album_cover.jpg",
  "caption": "Cosmic-Sonic by Crater Lake"
}
```

Photo
Renders a photograph. Extends Abstract Scalable Image
Properties

| property | type | contains | description | required | version |
|---|---|---|---|---|---|
| role | string | | This component always has the role photo. | yes | 0.9 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string | no | 0.9 |

| property | type | contains | description | required | version |
|---|---|---|---|---|---|
| | | | reference to a ComponentLayout that is defined at the top level of the document. If no layout property is present, size and position will be determined by the predefined template applied, as well as by the content size and the role of this component. | | |
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| URL | string | | The URL of an image file. Images should be high-resolution so they can be smoothly scaled down. Supported image types: JPEG (with .jpg or .jpeg extension), PNG, and GIF. For use in the Preview Tool, image URLs must begin with bundle:// and must refer to images in the same directory as the document. Image file names should be properly encoded as URLs. For example, spaces in a URL should be encoded as %20. Images used with the Preview Tool should be no more than 20 MB, and height and width should not exceed 6000 pixels. Because minimum size is determined by the size of the component (e.g., the size of a full-width image is determined by the viewport you're using to define "full width"), there is no precise minimum size for images. Generally, images should be at least 100-150 points (width and height). | yes | 0.9 |
| caption | string | | A string that describes the image. Captions can be used by VoiceOver, or for other purposes. To display text above or next to an image within an article, use Containers, child components, and Anchors. The rendering client may use the caption text in a full-screen display of the image. | no | 0.9 |

-continued

| property | type | contains | description | required | version |
|---|---|---|---|---|---|
| accessibilityCaption | string | | Optional caption text describing the contents of the photo. Note that this property differs from caption: although the caption may be displayed to readers, the accessiblityCaption is used for VoiceOver only. The value in this property should describe the contents of the photo for non-sighted users. If this property is omitted, the value from the caption is used for VoiceOver. | no | 0.10 |
| explicitContent | boolean | | This property indicates that the photograph may contain explicit/graphic content. Default value: false | no | 0.10 |

Example

Note: Component examples cannot be used with the Preview Tool without additional structure. Examples are for use within a complete article and may need parent objects to function properly.

```
{
  "role": "photo",
  "URL": "bundle://summer.jpg",
```

-continued

```
  "caption": "Thanks to the record drought, mountain lions have begun to descend, sometimes into urban settings."
}
```

Photographer

The name of a contributor whose photographs appear in the article. Note that an Illustrator component is also available. Extends Abstract Text Properties

| property | type | contains | description | required | version |
|---|---|---|---|---|---|
| role | string | | This component always has the role photographer. | yes | 0.10 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline ComponentStyle object that defines the appearance of this | no | 0.9 |

| property | type | contains | description | required | version |
|---|---|---|---|---|---|
| | | | component, or a string reference to a ComponentStyle that is defined at the top level of the document. | | |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| text | string | | The text, styled according to the textStyle definition. One can also use a subset of Markdown syntax by setting format to markdown, or by styling ranges of text individually using inlineTextStyles. When format is set to markdown, one can apply *emphasis* and strong emphasis, and one can add dividers, lists, and links. Please see the attached list of supported Markdown formatting. | yes | 0.9 |
| format | string | | The formatting or markup method applied to the text. Valid values: markdown and none (default) If format is set to markdown, inlineTextStyles are not supported. | no | 0.10 |
| textStyle | ComponentTextStyle/string | | Either an inline ComponentTextStyle object that contains styling information, or a string reference to a ComponentTextStyle object that is defined at the top level of the document in the componentTextStyles property. | no | 0.9 |
| inlineTextStyles | array | InlineTextStyle | By providing an array of InlineTextStyle objects, one can apply different text styles to ranges of text. For each inline text style, you should supply a rangeStart, rangeLength, and either a TextStyle or the identifier of a TextStyle that is defined at the top level of the document. Inline text styles are ignored when format is set to markdown. | no | 0.10 |

Example

Note: Component examples cannot be used with the Preview Tool without additional structure. Examples are for use within a complete article and may need parent objects to function properly.

```
{
  "role": "photographer",
  "text": "Jochem Wijnands"
}
```

Portrait

A photograph of a person. Extends Abstract Scalable Image

Properties

| property | type | contains | description | required | version |
|---|---|---|---|---|---|
| role | string | | This component always has the role portrait. | yes | 0.9 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| URL | string | | The URL of an image file. Images should be high-resolution so they can be smoothly scaled down. Supported image types: JPEG (with .jpg or .jpeg extension), PNG, and GIF. For use in the Preview Tool, image URLs must begin with bundle:// and must | yes | 0.9 |

-continued

| property | type | contains | description | required | version |
|---|---|---|---|---|---|
| | | | refer to images in the same directory as the document. Image file names should be properly encoded as URLs. For example, spaces in a URL should be encoded as %20. Images used with the Preview Tool should be no more than 20 MB, and height and width should not exceed 6000 pixels. Because minimum size is determined by the size of the component (e.g., the size of a full-width image is determined by the viewport you're using to define "full width"), there is no precise minimum size for images. Generally, images will be displayed at least at a width of 100-150 points (width and height). Therefore its best to provide an image that is at least 300 by 300 pixels at 72 dpi. | | |
| caption | string | | A string that describes the image. Captions can be used by VoiceOver, or for other purposes. The rendering client may use the caption text in a full screen display of the image. | no | 0.9 |
| accessibilityCaption | string | | Optional caption text describing the contents of the image. Note that this property differs from caption: although the caption may be displayed to readers, the accessiblityCaption is used for VoiceOver only. The value in this property should describe the contents of the image for non-sighted users. If this property is omitted, the value from the caption is used for VoiceOver. | no | 0.10 |
| explicitContent | boolean | | This property indicates that the image may contain explicit/graphic content. Default value: false | no | 0.10 |

Example

Note: Component examples cannot be used with the Preview Tool without additional structure. Examples are for use within a complete article and may need parent objects to function properly.

```
{
  "role": "portrait",
  "URL": "bundle://louis-armstrong.jpg",
```

-continued

```
  "caption": "Louis Armstrong, jazz trumpeter
   (August 4, 1901-July 6, 1971)"
}
```

Pullquote

A pullquote is usually a selection from the body text (a duplication). Pullquotes are often used to break up long portions of text or draw attention to the text near the pullquote.

Extends Abstract Text Properties

| property | type | contains | description | required | version |
|---|---|---|---|---|---|
| role | string | | This component always has the role pullquote. | yes | 0.9 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| text | string | | The text, styled according to the textStyle definition. One can also use a subset of Markdown syntax by setting format to markdown, or by styling ranges of text individually using inlineTextStyles. When format is set to markdown, one can apply *emphasis* and strong emphasis, and one can add dividers, lists, and links. Please see the attached list of supported Markdown formatting. | yes | 0.9 |
| format | string | | The formatting or markup method applied to the text. | no | 0.10 |

-continued

| property | type | contains | description | required | version |
|---|---|---|---|---|---|
| | | | Valid values: markdown and none (default) If format is set to markdown, inlineTextStyles are not supported. | | |
| textStyle | ComponentTextStyle/string | | Either an inline ComponentTextStyle object that contains styling information, or a string reference to a ComponentTextStyle object that is defined at the top level of the document in the componentTextStyles property. | no | 0.9 |
| inlineTextStyles | array | InlineTextStyle | By providing an array of InlineTextStyle objects, one can apply different text styles to ranges of text. For each inline text style, you should supply a rangeStart, rangeLength, and either a TextStyle or the identifier of a TextStyle that is defined at the top level of the document. Inline text styles are ignored when format is set to markdown. | no | 0.10 |

Example

Note: Component examples cannot be used with the Preview Tool without additional structure. Examples are for use within a complete article and may need parent objects to function properly.

```
{
  "role": "pullquote",
  "text": "It didn't feel like basketball; it felt like dancing.",
  "inlineTextStyles": [
```

-continued

```
    {
      "rangeStart": 32,
      "rangeLength": 20,
      "textStyle": {
        "textColor": "FF0000"
      }
    }
  ]
}
```

Quote

The text of a quote. Unlike a Pullquote, a quote is usually not duplicated content.
Extends Abstract Text
Properties

| property | type | contains | description | required | version |
|---|---|---|---|---|---|
| role | string | | This component always has the role quote. | yes | 0.9 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains | no | 0.9 |

-continued

| property | type | contains | description | required | version |
|---|---|---|---|---|---|
| | | | layout information, or a string reference to a ComponentLayout that is defined at the top level of the document. If no layout property is present, size and position will be determined by the predefined template applied, as well as by the content size and the role of this component. | | |
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| text | string | | The text, styled according to the textStyle definition. One can also use a subset of Markdown syntax by setting format to markdown, or by styling ranges of text individually using inlineTextStyles. When format is set to markdown, one can apply *emphasis* and strong emphasis, and one can add dividers, lists, and links. Please see the attached list of supported Markdown formatting. | yes | 0.9 |
| format | string | | The formatting or markup method applied to the text. Valid values: markdown and none (default) If format is set to markdown, inlineTextStyles are not supported. | no | 0.10 |
| textStyle | ComponentTextStyle/string | | Either an inline ComponentTextStyle object that contains styling information, or a string reference to a ComponentTextStyle object that is defined at the top level of the document in the componentTextStyles property. | no | 0.9 |

-continued

| property | type | contains | description | required | version |
| --- | --- | --- | --- | --- | --- |
| inlineTextStyles | array | InlineTextStyle | By providing an array of InlineTextStyle objects, one can apply different text styles to ranges of text. For each inline text style, you should supply a rangeStart, rangeLength, and either a TextStyle or the identifier of a TextStyle that is defined at the top level of the document. Inline text styles are ignored when format is set to markdown. | no | 0.10 |

Example

Note: Component examples cannot be used with the Preview Tool without additional structure. Examples are for use within a complete article and may need parent objects to function properly.

```
{
  "role": "quote",
  "text": "*New York City's* finest are under increased scrutiny.",
  "format": "markdown"
}
```

Scalable Image Abstract

Scalable images include Figures, Portraits, and Photos. A caption can be displayed when the image is presented full screen. Extends Abstract Component Properties

| property | type | contains | description | required | version |
| --- | --- | --- | --- | --- | --- |
| role | string | | The type of scalable image. See Figure, Photo, or Portrait. | yes | 0.9 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline ComponentStyle object that defines the | no | 0.9 |

| property | type | contains | description | required | version |
|---|---|---|---|---|---|
| | | | appearance of this component, or a string reference to a ComponentStyle that is defined at the top level of the document. | | |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| URL | string | | The URL of an image file. Images should be high-resolution so they can be smoothly scaled down. Supported image types: JPEG (with .jpg or .jpeg extension), PNG, and GIF. For use in the Preview Tool, image URLs must begin with bundle:// and must refer to images in the same directory as the document. Image file names should be properly encoded as URLs. For example, spaces in a URL should be encoded as %20. Images used with the Preview Tool should be no more than 20 MB, and height and width should not exceed 6000 pixels. Because minimum size is determined by the size of the component (e.g., the size of a full-width image is determined by the viewport you're using to define "full width"), there is no precise minimum size for images. Generally, images will be displayed at least at a width of 100-150 points (width and height). Therefore its best to provide an image that is at least 300 by 300 pixels at 72 dpi. | yes | 0.9 |
| caption | string | | A string that describes the image. Captions can be used by VoiceOver, or for other purposes. The rendering client may use the caption text in a full screen display of the image. | no | 0.9 |
| accessibilityCaption | string | | Optional caption text describing the contents of the image. Note that this property differs from caption: although the caption may be displayed to readers, the accessiblityCaption is used for VoiceOver only. The value in this property should describe the contents of the image for non-sighted users. If this property is omitted, the value from the caption is used for VoiceOver. | no | 0.10 |

-continued

| property | type | contains | description | required | version |
|---|---|---|---|---|---|
| explicitContent | boolean | | This property indicates that the image may contain explicit/graphic content. Default value: false | no | 0.10 |

Example

Note: Component examples cannot be used with the Preview Tool without additional structure. Examples are for use within a complete article and may need parent objects to function properly.

```
{
  "role": "photo",
  "URL": "bundle://mountain-lions.jpg",
  "caption": "Thanks to the record drought, mountain lions have begun to descend, sometimes into urban settings."
}
```

Extended By
Figure
Photo
Portrait
Section

A section is a full-width Container with child components. One can use a section component to divide an article into separate parts with different styling. The overall height of a section component is determined by the height of its child components. Section components can exist only at the top level of the document.

Note: Be sure to use the component that is the best semantic fit for your content: Section or Chapter.

Extends Container

Properties

| property | type | contains | description | required | version |
|---|---|---|---|---|---|
| role | string | | This component always has the role section. | yes | 0.9 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| components | array | Component | An array of components to display as child components. Child components are positioned and rendered relative to their parent component. | no | 0.9 |
| scene | Scene | | One can use a scene to apply a set of animations to the child components of this Section. | no | 0.10 |

| property | type | contains | description | required | version |
|---|---|---|---|---|---|
| | | | Currently, ParallaxScaleHeader and FadingStickyHeader scenes are supported. | | |

Example

Note: Component examples cannot be used with the Preview Tool without additional structure. Examples are for use within a complete article and may need parent objects to function properly.

```
{
  "role": "section",
  "scene": {
    "type": "fading_sticky_header",
    "fadeColor": "FFFFFF"
  },
  "components": [
    {
      "role": "header",
      "layout": {
        "columnStart": 0,
        "columnSpan": 7,
        "minimumHeight": "50vh"
      },
      "style": {
        "fill": {
          "type": "image",
          "URL": "bundle://header-image.jpg"
        }
      },
      "components": [
        {
          "role": "title",
          "text": "FOURTEEN THOUSAND FEET & RISING"
        },
        {
          "role": "byline",
          "text": "by John Appleseed"
        }
      ]
    },
    {
      "role": "intro",
      "text": "On a surprisingly cold Saturday last June, nine brave climbers set out to conquer the highest 14er in the Ten Mile Range-Colorado's legendary Quandary Peak."
    }
  ]
}
```

Text Abstract

Generic text component. Many properties may be omitted; sane defaults will be inferred.

Extends Abstract Component

Properties

| property | type | contains | description | required | version |
|---|---|---|---|---|---|
| role | string | | The role of a text component depends on the type of content it contains. For example, a Pullquote should have the role pullquote, and for text in the article body, the role should be body. Refer to the role descriptions attached to Component. | yes | 0.9 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the | no | 0.9 |

| property | type | contains | description | required | version |
|---|---|---|---|---|---|
| | | | predefined template applied, as well as by the content size and the role of this component. | | |
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| text | string | | The text, styled according to the textStyle definition. One can also use a subset of Markdown syntax by setting format to markdown, or by styling ranges of text individually using inlineTextStyles. When format is set to markdown, one can apply *emphasis* and strong emphasis, and one can add dividers, lists, and links. Please see the attached list of supported Markdown formatting. | yes | 0.9 |
| format | string | | The formatting or markup method applied to the text. Valid values: markdown and none (default) If format is set to markdown, inlineTextStyles are not supported. | no | 0.10 |
| textStyle | ComponentTextStyle/string | | Either an inline ComponentTextStyle object that contains styling information, or a string reference to a ComponentTextStyle object that is defined at the top level of the document in the componentTextStyles property. | no | 0.9 |
| inlineTextStyles | array | InlineTextStyle | By providing an array of InlineTextStyle objects, one can apply different text styles to ranges of text. For each inline text style, you should supply a rangeStart, rangeLength, and | no | 0.10 |

-continued

| property | type | contains | description | required | version |
|---|---|---|---|---|---|
| | | | either a TextStyle or the identifier of a TextStyle that is defined at the top level of the document. Inline text styles are ignored when format is set to markdown. | | |

Example

Note: Component examples cannot be used with the Preview Tool without additional structure. Examples are for use within a complete article and may need parent objects to function properly.

```
{
    "role": "pullquote",
    "text": "The text of the pullquote.",
    "layout": {
        "columnStart": 0,
        "columnSpan": 4
    },
    "textStyle": "pullquote-medium",
    "inlineTextStyles": [
        {
            "rangeStart": 17,
            "rangeLength": 9,
            "textStyle": {
                "textColor": "FF0000",
                "backgroundColor": "00"
            }
        }
    ]
}
```

Extended By
Author
Body
Byline
Caption
Heading
Illustrator
Intro
Photographer
Pullquote
Quote
Title Title
The article's main title. Extends Abstract Text Properties
Hide Optional Properties

| property | type | contains | description | required | version |
|---|---|---|---|---|---|
| role | string | | This component always has the role title. | yes | 0.9 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |

| property | type | contains | description | required | version |
|---|---|---|---|---|---|
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| text | string | | The text, styled according to the textStyle definition. One can also use a subset of Markdown syntax by setting format to markdown, or by styling ranges of text individually using inlineTextStyles. When format is set to markdown, one can apply *emphasis* and strong emphasis, and one can add dividers, lists, and links. Please see the attached list of supported Markdown formatting. | yes | 0.9 |
| format | string | | The formatting or markup method applied to the text. Valid values: markdown and none (default) If format is set to markdown, inlineTextStyles are not supported. | no | 0.10 |
| textStyle | ComponentTextStyle/string | | Either an inline ComponentTextStyle object that contains styling information, or a string reference to a ComponentTextStyle object that is defined at the top level of the document in the componentTextStyles property. | no | 0.9 |
| inlineTextStyles | array | InlineTextStyle | By providing an array of InlineTextStyle objects, one can apply different text styles to ranges of text. For each inline text style, you should supply a rangeStart, rangeLength, and either a TextStyle or the identifier of a TextStyle that is defined at the top level of the document. | no | 0.10 |

| property | type | contains | description | required | version |
|---|---|---|---|---|---|
| | | | Inline text styles are ignored when format is set to markdown. | | |

Example

Note: Component examples cannot be used with the Preview Tool without additional structure. Examples are for use within a complete article and may need parent objects to function properly.

```
{
    "role": "title",
    "text": "Every City's Finest Citizens"
}
```

Tweet

With the Tweet component, one can embed a Twitter tweet in an article. Extends Abstract Component
Properties Example Note: Component examples cannot be used with the Preview Tool without additional structure. Examples are for use within a complete article and may need parent objects to function properly.

```
{
    "role": "tweet",
    "URL": "https://twitter.com/AppStore/status/591656099792683008"
}
```

Video

A component that displays a video. Extends Abstract Component

| property | type | contains | description | required | version |
|---|---|---|---|---|---|
| role | string | | This component always has the role tweet. | yes | 0.10 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| URL | string | | The URL of the tweet you want to embed. | yes | 0.10 |

Properties

| property | type | contains | description | required | version |
|---|---|---|---|---|---|
| role | string | | This component always has the role video. | yes | 0.9 |
| identifier | string | | An optional unique identifier for this component. If used, this identifier must be unique across the entire document. You will need an identifier for your component if you want to Anchor other components to it. | no | 0.9 |
| layout | ComponentLayout/string | | Either an inline ComponentLayout object that contains layout information, or a string reference to a ComponentLayout that is defined at the top level of the document. If no layout property is present, size and position will be determined by the predefined template applied, as well as by the content size and the role of this component. | no | 0.9 |
| style | ComponentStyle/string | | Either an inline ComponentStyle object that defines the appearance of this component, or a string reference to a ComponentStyle that is defined at the top level of the document. | no | 0.9 |
| anchor | Anchor | | An Anchor object that defines vertical alignment with another component. | no | 0.9 |
| animation | ComponentAnimation | | A ComponentAnimation object that defines an animation to be applied to the component. | no | 0.10 |
| behavior | Behavior | | Define Behavior for a component, like Parallax or Springy. | no | 0.10 |
| URL | string | | The URL of a video file that can be played using iOS's AVPlayer. HTTP Live Streaming (HLS)[3] is highly recommended (.M3U8). For more information on HLS, refer to the iOS developer documentation on HTTP Live Streaming[4], especially the following sections of the HTTP Live Streaming Overview[5]:<br>    Frequently Asked Questions[6] (includes supported formats and encoders)<br>    Preparing Media for Delivery to iOS-Based Devices[7]<br>    Adding Closed Captions[8] | yes | 0.9 |
| stillURL | string | | The identifier of a still image that will be shown when the video has not been played. Supported image types include JPEG (with .jpg or .jpeg extension), PNG, and GIF. For use in the Preview Tool, image URLs must begin | no | 0.9 |

| property | type | contains | description | required | version |
|---|---|---|---|---|---|
| | | | with bundle:// and must refer to images in the same directory as the document. Image file names should be properly encoded as URLs. For example, spaces in a URL should be encoded as %20. | | |
| aspectRatio | float | | The aspect ratio of the video: width divided by height. The aspect ratio determines the height of the video player. When this property is omitted, the video player will have a 16:9 aspect ratio (1.777), and videos with ratios other than 16:9 will automatically be letterboxed. | no | 0.9 |
| caption | string | | A caption that describes the content of the video. This text can be used by VoiceOver, or it can be shown when the video cannot be played. | no | 0.9 |
| accessibilityCaption | string | | Optional caption text describing the contents of the video. Note that this property differs from caption: although the caption may be displayed to readers, the accessiblityCaption is used for VoiceOver only. The value in this property should describe the contents of the video for non-sighted users. If this property is omitted, the value from the caption is used for VoiceOver. | no | 0.10 |
| explicitContent | boolean | | This property indicates that the video and/or video still image may contain explicit/graphic content. Default value: false | no | 0.10 |

[3] HTTP Live Streaming (HLS): https://developer.apple.com/streaming/
[4] iOS developer documentation on HTTP Live Streaming: https://developer.apple.com/streaming/
[5] HTTP Live Streaming Overview: https://developer.apple.com/library/ios/documentation/NetworkingInternet/Conceptual/StreamingMediaGuide/Introduction/Introduction.html
[6] Frequently Asked Questions: https://developer.apple.com/library/ios/documentation/NetworkingInternet/Conceptual/StreamingMediaGuide/FrequentlyAskedQuestions/FrequentlyAskedQuestions.html
[7] Preparing Media for Delivery to iOS-Based Devices: https://developer.apple.com/library/ios/documentation/NetworkingInternet/Conceptual/StreamingMediaGuide/UsingHTTPLiveStreaming/UsingHTTPLiveStreaming.html//apple_ref/doc/uid/TP40008332-CH102-SW8
[8] Adding Closed Captions: https://developer.apple.com/library/ios/documentation/NetworkingInternet/Conceptual/StreamingMediaGuide/UsingHTTPLiveStreaming/UsingHTTPLiveStreaming.html//apple_ref/doc/uid/TP40008332-CH102-SW23

Example

Note: Component examples cannot be used with the Preview Tool without additional structure. Examples are for use within a complete article and may need parent objects to function properly.

```
{
  "role": "video",
  "URL": "https://live-streaming.apple.com/hls/2015/fded0-1077dae/
    main.m3u8", "accessibilityCaption": "Live video coverage for
Apple's World Wide Developer Conference (WWDC) 2014"
}
```

D. Layouts

The following are objects that define layout information for a document or the components within a document.

ComponentLayout

Layout information for a component.

Layout

Layout properties for a Native document.

ComponentLayout

Layout information for a component.

Properties

| property | type | contains | description | required | version |
|---|---|---|---|---|---|
| columnStart | integer | | Indicates which column the component's start position is in, based on the number of columns in the document. By default, the component will start in the first column (note that the first column is 0, not 1). | no | 0.9 |
| columnSpan | integer | | Indicates how many columns the component spans, based on the number of columns in the document. By default, the component will span the entire width of the document or the width of its container component. | no | 0.9 |
| margin | Margin/integer | | Describes margins on all sides as a single integer, or as an object containing separate properties for top and bottom margins. | no | 0.9 |
| contentInset | boolean/ContentInset | | Describes the content inset for the component. If applied, the inset will be the same as half the document gutter. For example, When defining a gutter in the document's Layout of 40pt, the content inset will be 20 points. The value can either be a boolean or a ContentInset object to describe each side seperatly. | no | 0.10 |
| ignoreDocumentMargin | boolean/string | | Indicates whether a document's margins should be respected or should be ignored by the component. Ignoring document margins will position the component at the edge of the display. This property affects the layout only if the component is within the first or last column. Allowed values are:<br>none (default)<br>    Margins will not be ignored.<br>left<br>    Left margin will be ignored.<br>right<br>    Right margin will be ignored.<br>both<br>    Margins on both sides (if any) will be ignored.<br>One can also set this property to true, which is interpreted as ignoring both margins, or true for none. By default, none of the document margins are ignored. | no | 0.9 |
| ignoreDocumentGutter | boolean/string | | Indicates whether the gutters (if any) to the left and right of the component should be ignored. The gutter size is defined in the Layout at the top level of the document. Use this option if you want to position two components right next to | no | 0.10 |

| property | type | contains | description | required | version |
|---|---|---|---|---|---|
| | | | each other without a gutter between them. This property applies only when a gutter actually exists to the left or right of the component. The first column does not have a left gutter, and the last column does not have a right gutter. Allowed values are:<br>none (default)<br>    Gutters will not be ignored.<br>left<br>    Left gutter will be ignored.<br>right<br>    Right gutter will be ignored.<br>both<br>    Gutters on both sides (if any) will be ignored.<br>One can also set this property to true to indicate that you want to ignore both gutters, or to false for none. By default, none of the gutters are ignored. | | |
| minimumHeight | integer/Supported Units | | Describes the minimum height of the component. A component will be taller than its defined minimumHeight when the contents require the component to be taller. The minimum height can be defined as integer in points or using the available Units. | no | 0.10 |

Example

Note: Object examples cannot be used with the Preview Tool without additional structure. Examples are for use within a complete article and may need parent objects to function properly.

```
{
    "columnStart": 0,
    "columnSpan": 3,
    "margin": {
        "top": 50,
        "bottom": 50
    }
}
```

Used in Basic Layout
Layout properties for a Native document.
Properties

| property | type | contains | description | required | version |
|---|---|---|---|---|---|
| columns | integer | | The number of columns this document was designed for. | yes | 0.9 |
| width | integer | | The width (in points) this document was designed for. This property is used to calculate downscaling scenarios for smaller devices. | yes | 0.9 |
| margin | integer | | The outer (left and right) margins (in points) of this document. If this property is omitted, a default document margin of 60 is applied. | no | 0.9 |
| gutter | integer | | The gutter size (in points) to use for spacing between columns. If this property is omitted, a default gutter size of 20 is applied. | no | 0.9 |

Example

Note: Object examples cannot be used with the Preview Tool without additional structure. Examples are for use within a complete article and may need parent objects to function properly.

```
{
    "columns": 7,
    "width": 1024,
```

```
  "margin": 30,
  "gutter": 20
}
```

Used in Basic

E. Styles

The following are Style definitions that can be applied to components or text.

Fills

Fills for ComponentStyles.

Border

Defines a component border, including its style. Border styling is the same for all sides of the component. Individual border sides can be disabled by setting them to false.

ComponentStyle

Styling properties that can be applied to a component.

ComponentTextStyle

Text styling for an entire component. A ComponentTextStyle is an extension of a standard TextStyle, with additional properties such as drop caps and text alignment.

A ComponentTextStyle can be added as an object to a Text-like component, or a Text-like component can reference a ComponentTextStyle that is defined at the document level. For example, if you define a ComponentTextStyle with the key default-title at the document level, all Title components will automatically use that text styling. See the Basic example for more information.

DocumentStyle

Allows setting the background color for an entire article.

DropCapStyle

Defines a drop cap that can be used by a ComponentTextStyle. Drop caps are applied to only the first paragraph of a Text component.

InlineTextStyle

An inline text style contains a TextStyle object or references (by identifier) a TextStyle that is defined at the top level of the document. A TextStyle can contain a subset of properties that can then be applied to a portion of text via an InlineTextStyle. Only properties with values will be overridden for the given range.

Note that in a text component, the array of inline text styles has the label inlineTextStyles, plural. See the examples for Text and Pullquote.

StrokeStyle

Defines a stroke that can be used as a Border.

TextStrokeStyle

Defines a stroke that can be used as underline or strikethrough.

TextStyle

Applies styling to a specific range of text.

Fills

Fills for ComponentStyles.

Fill Abstract

Defines a fill for a component's background.

Gradients

Gradient fills for ComponentStyles.

ImageFill

Fills a component with a background image.

VideoFill

Fills a component's background with an auto-playing video without audio.

Video fills can be applied to components using a ComponentStyle.

Fill Abstract

Defines a fill for a component's background.

Properties

| property | type | contains | description | required | version |
|---|---|---|---|---|---|
| type | string | | The type of fill to apply. Currently, only image is supported. | yes | 0.9 |
| attachment | string | | Indicates how the fill should behave when a user scrolls. Valid values: scroll (default) The fill scrolls along with its component. fixed The fill stays at a fixed position within the viewport. | no | 0.10 |

Example

Note: Object examples cannot be used with the Preview Tool without additional structure. Examples are for use within a complete article and may need parent objects to function properly.

```
{
  "type": "image",
  "URL": "bundle://A73B-9AD5AEEA-KJHDSF3FD-124WFD.png"
}
```

Extended By

GradientFill

ImageFill

VideoFill

Used in ComponentStyle

Gradients

Gradient fills for ComponentStyles.

ColorStop

Color stop parts for gradients like the LinearGradientFill and other implementations of the abstract GradientFill definition.

GradientFill Abstract

Defines a gradient fill for a component's background. This abstract definition is the basis for the other fill types that extend it.

LinearGradientFill

Fills a component with a linear gradient.

ColorStop

Color stop parts for gradients like the LinearGradientFill and other implementations of the abstract GradientFill definition.

Properties

| property | type | contains | description | required | version |
|---|---|---|---|---|---|
| color | string | | The color of this color stop, defined as a 3- to 8-character RGBA hexadecimal string; e.g., 00 for black or FF00007F for red with an alpha (opacity) of 50%. | yes | 0.10 |
| location | float | | An optional location of the color stop within the gradient, as a percentage of the gradient size. If location is omitted, the length of the stop is | no | 0.10 |

-continued

| property | type | contains | description | required | version |
|---|---|---|---|---|---|
| | | | calculated by first subtracting color stops with specified locations from the full length, then equally distributing the remaining length. | | |

Example

```
{
    "color": "FF0000",
    "location": 25
}
```

Used in GradientFill

GradientFill Abstract

Defines a gradient fill for a component's background. This abstract definition is the basis for the other fill types that extend it.

Extends Abstract Fill

Properties

| property | type | contains | description | required | version |
|---|---|---|---|---|---|
| type | string | | The type of gradient; e.g., linear_gradient. | yes | 0.10 |
| attachment | string | | Indicates how the fill should behave when a user scrolls. Valid values: scroll (default) The fill scrolls along with its component. fixed The fill stays at a fixed position within the viewport. | no | 0.10 |
| colorStops | array | ColorStop | An array of color stops. Each stop sets a color and percentage. | yes | 0.10 |

Example

```
{
    "type": "linear_gradient",
    "angle": 90,
    "colorStops": [
        {
            "color": "FF0000"
        },
        {
            "color": "00000"
        }
    ]
}
```

Extended By LinearGradientFill

LinearGradientFill

Fills a component with a linear gradient.

Extends Abstract GradientFill

Properties

| property | type | contains | description | required | version |
|---|---|---|---|---|---|
| type | string | | This fill always has the type linear_gradient. | yes | 0.10 |
| attachment | string | | Indicates how the fill should behave when a user scrolls. Valid values: scroll (default) The fill scrolls along with its component. fixed The fill stays at a fixed position within the viewport. | no | 0.10 |
| colorStops | array | ColorStop | An array of color stops. Each stop sets a color and percentage. | yes | 0.10 |
| angle | float | | The angle of the gradient fill, in degrees Use the angle to set the direction of the gradient. For example, a value of 180 defines a gradient that changes color from top to bottom. An angle of 90 defines a gradient that changes color from left to right. If angle is omitted, an angle of 180 (top to bottom) is used. | no | 0.10 |

Example

```
{
    "type": "linear_gradient",
    "angle": 90,
    "colorStops": [
        {
            "color": "FF0000"
        },
        {
            "color": "00000"
        }
    ]
}
```

ImageFill

Fills a component with a background image.

Extends Abstract Fill

Properties

| property | type | contains | description | required | version |
|---|---|---|---|---|---|
| type | string | | The type of fill to apply. | yes | 0.9 |
| attachment | string | | Indicates how the fill should behave when a user scrolls. Valid values: scroll (default) | no | 0.10 |

-continued

| property | type | contains | description | required | version |
|---|---|---|---|---|---|
| | | | The fill scrolls along with its component.<br>fixed<br>    The fill stays at a fixed position within the viewport. | | |
| URL | string | | The URL of the image file to use for filling the component.<br>For use with the Preview Tool, URLs must start with bundle:// and point to a file in the same directory as article.json. | yes | 0.9 |
| fillMode | string | | Indicates how the image fill should be displayed. Available values:<br>fit<br>    Scales the image by aspect ratio to fit the component.<br>cover<br>    Scales the image by aspect ratio to completely fill the component (default). | no | 0.9 |
| verticalAlignment | string | | The vertical alignment of the image fill within its component.<br>top<br>    Aligns the top of the fill with the top edge of the component<br>center<br>    Aligns the vertical center of the fill with the center of the component (default)<br>bottom<br>    Aligns the bottom of the fill with the bottom edge of the component.<br>Using fillMode with verticalAlignment:<br>Using fillMode fit with top will fit the image based on its aspect ratio and align the top of the fill with the top edge of the component.<br>Using fillMode cover with top will scale the image vertically while aligning the top of the fill with the top of the component. | no | 0.10 |
| horizontalAlignment | string | | The horizontal alignment of the image fill within its component.<br>left<br>    Aligns the left edge of the fill with the left edge of the component<br>center<br>    Aligns the horizontal center of the fill with the center of the component (default)<br>right<br>    Aligns the right edge of the fill with the right edge of the component.<br>Using fillMode with horizontalAlignment:<br>Using fillMode fit with left will fit the image based on its aspect ratio and align the left of the fill with the left edge of the component.<br>Using fillMode cover with right will scale the image horizontally while aligning the right edge of the fill with the right edge of the component. | no | 0.10 |

Example

Note: Object examples cannot be used with the Preview Tool without additional structure. Examples are for use within a complete article and may need parent objects to function properly.

```
{
    "type": "image",
    "URL": "bundle://header-image.png",
    "fillMode": "cover",
    "verticalAlignment": "top"
}
```

VideoFill

Fills a component's background with an auto-playing video without audio. Video fills can be applied to components using a ComponentStyle.

Extends Abstract Fill Properties

| property | type | contains | description | required | version |
|---|---|---|---|---|---|
| type | string | | Describes the type of Fill. Must be video for a VideoFill. | yes | 0.10 |
| attachment | string | | Indicates how the fill should behave when a user scrolls. Valid values:<br>scroll (default)<br>    The fill scrolls along with its component.<br>fixed<br>    The fill stays at a fixed position within the viewport. | no | 0.10 |
| URL | string | | The URL of a video file that can be played using iOS's AVPlayer. HTTP Live Streaming (HLS) is highly recommended (.M3U8). For more information on HLS, refer to the iOS developer documentation on HTTP Live Streaming, especially the following sections of the HTTP Live Streaming Overview:<br>    Frequently Asked Questions (includes supported formats and encoders)<br>    Preparing Media for Delivery to iOS-Based Devices<br>    Adding Closed Captions | yes | 0.10 |
| stillURL | string | | The still URL of the image file to use as a still image. For use with the Preview Tool, URLs must start with bundle:// and point to a file in the same directory as article.json. | yes | 0.10 |
| fillMode | string | | A string defining how the video is displayed within the component's bounds.<br>The following fill modes are supported:<br>fit<br>    Preserve aspect ratio; fit within the component bounds.<br>cover<br>    Preserve aspect ratio; fill the component's bounds (default). | no | 0.10 |
| verticalAlignment | string | | The vertical alignment of the video fill within its component.<br>top<br>    Aligns the top of the fill with the top edge of the component<br>center<br>    Aligns the vertical center of the fill with the center of the component (default)<br>bottom<br>    Aligns the bottom of the fill with the bottom edge of the component.<br>Using fillMode with verticalAlignment:<br>Using fillMode fit with top will fit the video based on its aspect ratio and align the top of the fill with the top edge of the component.<br>Using fillMode cover with top will scale the video vertically while aligning the top of the fill with the top of the component. | no | 0.10 |
| horizontalAlignment | string | | The horizontal alignment of the video fill within its component.<br>left<br>    Aligns the left edge of the fill with the left edge of the component<br>center<br>    Aligns the horizontal center of the fill with the center of the component (default)<br>right<br>    Aligns the right edge of the fill with the right edge of the component.<br>Using fillMode with horizontalAlignment:<br>Using fillMode fit with left will fit the video based on its aspect ratio and align the left of the fill with the left edge of the component.<br>Using fillMode cover with right will scale the video horizontally while aligning the right edge of the fill with the right edge of the component. | no | 0.10 |

Example

```
{
  "type": "video",
  "URL": "https://live-streaming.apple.com/hls/2014/fded0-1077dae/main.m3u8",
  "stillURL": "bundle://video-still.jpg",
  "fillMode": "cover",
  "verticalAlignment": "top"
}
```

Border
Defines a component border, including its style. Border styling is the same for all sides of the component. Individual border sides can be disabled by setting them to false.
Properties

| property | type | contains | description | required | version |
|---|---|---|---|---|---|
| all | StrokeStyle | | Defines the stroke properties of the border. Stroke properties cannot be set for each side; the border can only be disabled or enabled for each side. | no | 0.9 |
| top | boolean | | Indicates whether the border should be applied to the top. Defaults to true. | no | 0.9 |
| bottom | boolean | | Indicates whether the border should be applied to the bottom. Defaults to true. | no | 0.9 |
| left | boolean | | Indicates whether the border should be applied to the left side. Defaults to true. | no | 0.9 |
| right | boolean | | Indicates whether the border should be applied to the right side. Defaults to true. | no | 0.9 |

Example

Note: Object examples cannot be used with the Preview Tool without additional structure. Examples are for use within a complete article and may need parent objects to function properly.

```
{
  "all": {
    "width": 2,
    "style": "dashed",
    "color": "FFFF00"
  },
  "left": false,
  "right": false
}
```

Used in ComponentStyle
ComponentStyle
Styling properties that can be applied to a component.
Properties

| property | type | contains | description | required | version |
|---|---|---|---|---|---|
| backgroundColor | string | | The component's background color, defined as a 3- to 8-character RGBA hexadecimal string; e.g., 00 for black or FF00007F for red with an alpha (opacity) of 50%. Defaults to transparent. | no | 0.9 |
| fill | Fill | | A fill object, such as an ImageFill, that will be applied on top of the specified backgroundColor. By default, no fill is applied. | no | 0.9 |
| opacity | float | | The opacity of the component, set as a float value between 0 (completely transparent) and 1 (completely opaque). The effects of the component's opacity are inherited by any child components. By default, opacity is set to 1. | no | 0.9 |
| border | Border | | The border for the component. A border is drawn inside the component and therefor influences the | no | 0.10 |

-continued

| property | type | contains | description | required | version |
|---|---|---|---|---|---|
| | | | size of the content within the component. A bigger border means less space for contents within a component. | | |

Example

Note: Object examples cannot be used with the Preview Tool without additional structure. Examples are for use within a complete article and may need parent objects to function properly.

```
{
    "backgroundColor": "FFFFFF",
    "opacity": 1,
    "border": {
        "all": {
            "width": 1
        },
        "left": false,
        "right": false
    },
}
```

```
"fill": {
    "type": "image",
    "URL": "bundle://A73B-9AD5AEEA-KJHDSF3FD-124WFD.png"
}
}
```

Used in Basic

ComponentTextStyle

Text styling for an entire component. A ComponentTextStyle is an extension of a standard TextStyle, with additional properties such as drop caps and text alignment.

A ComponentTextStyle can be added as an object to a Text-like component, or a Text-like component can reference a ComponentTextStyle that is defined at the document level. For example, if you define a ComponentTextStyle with the key default-title at the document level, all Title components will automatically use that text styling. See the Basic example for more information.

Extends TextStyle

Properties

| property | type | contains | description | required | version |
|---|---|---|---|---|---|
| fontName | string | | The PostScript name of the font to apply, such as GillSans-Bold. One can reference any iOS font by name; see iOSfonts.com for a list of available fonts. If you want to use your own font files, use OpenType (with .otf extension), or TrueType (with .ttf extension) fonts. Simply copy the font files into the same directory as your JSON document. Make sure to copy all variants (bold, italic, regular) of the font family if you want to be able to use any of those. | no | 0.9 |
| fontSize | integer | | The size of the font, in points. By default, the font size will be inherited from a parent component or a default style. | no | 0.9 |
| textColor | string | | The text color, defined as a 3- to 8-character RGBA hexadecimal string; e.g., 00 for black or FF00007F for red with an alpha (opacity) of 50%. Defaults to 00000 (black). | no | 0.9 |
| textTransform | string | | The transform to apply to the text. Available values: uppercase, lowercase, capitalize (title case), or none (default). textTransform is not currently supported. | no | 0.9 |
| underline | TextStrokeStyle/boolean | | Definition for text underlining, for example for links. One can set this to true to underline text using the text color, or provide a TextStrokeStyle with a different color. By default | no | 0.10 |

-continued

| property | type | contains | description | required | version |
|---|---|---|---|---|---|
| strikethrough | TextStrokeStyle/boolean | | underline will be omitted (false). Definition for text with strikethrough. Set strikethrough to true for striking through text using the text color, or provide a TextStrokeStyle definition with another color. By default strikethrough will be omitted (false). | no | 0.10 |
| backgroundColor | string | | The background color for text lines, defined as a 3- to 8-character RGBA hexadecimal string; e.g., 00 for black or FF00007F for red with an alpha (opacity) of 50%. Defaults to transparent. | no | 0.9 |
| verticalAlignment | string | | The vertical alignment of the text, allowing for superscript and subscript. Available values: superscript, subscript, or baseline. To override values specified in parent text styles, use baseline. Defaults to baseline when unspecified, and inherits the value specified in a TextStyle applied to the same range. The values superscript and subscript also adjust the font size to ⅔ of the size defined for that character range. | no | 0.9 |
| tracking | float | | The amount of tracking for characters in text, in percentage of the fontSize. The actual spacing between letters is determined by combining information from the font and font size. Tracking allows you to have less, or add more spacing between characters. The default tracking value is 0.0. Setting the value to 0.5 means that the distance between characters increases by 50% of the fontSize. With a font size of 10, the additional spacing between characters will be 5 points. | no | 0.9 |
| textAlignment | string | | Justification (horizontal alignment) style for all text within the component. Available values: left, center, right, justified, or none (default). If justification is omitted, or set to none the justification will be determined by the text direction (left-to-right text will be aligned left and right-to-left text will be aligned right). | no | 0.9 |
| relativeLineHeight | float | | A factor for the default calculation of the line height. | no | 0.9 |
| exactLineHeight | integer | | The exact line height, in points. Overrides any value specified for relativeLineHeight in the same ComponentTextStyle. | no | 0.9 |
| dropCapStyle | DropCapStyle | | Defines the style of drop cap to apply to the first paragraph of a Text component. | no | 0.9 |
| hyphenation | boolean | | Indicates whether a Text component (or components that are derived from that) should be hyphenated when | no | 0.9 |

-continued

| property | type | contains | description | required | version |
|---|---|---|---|---|---|
| | | | necessary. By default, only components with the role body have hyphenation enabled. All other components default to false. | | |
| linkStyle | TextStyle | | Text styling for all links within this ComponentTextStyle. | no | 0.10 |

Example

Note: Object examples cannot be used with the Preview Tool without additional structure. Examples are for use within a complete article and may need parent objects to function properly.

```
{
    "fontName": "GillSans-Bold",
    "fontSize": 12,
    "textColor": "00000",
    "textAlignment": "right",
    "relativeLineHeight": 1.2,
    "linkStyle": {
        "underline": {
            "color": "2a6496"
        }
    }
},
```
```
    "dropCapStyle": {
        "numberOfLines": 3,
        "numberOfCharacters": 2,
        "fontName": "HelveticaNeue",
        "textColor": "FFF",
        "backgroundColor": "00",
        "padding": 5
    }
}
```

Used in Basic

DocumentStyle

Allows setting the background color for an entire article.

Properties

| property | type | contains | description | required | version |
|---|---|---|---|---|---|
| backgroundColor | string | | The article's background color, defined as a 3- to 8-character RGBA hexadecimal string; e.g., 00 for black or FF00007F for red with an alpha (opacity) of 50%. Defaults to white. | yes | 0.10 |

Example

Note: Object examples cannot be used with the Preview Tool without additional structure. Examples are for use within a complete article and may need parent objects to function properly.

{"backgroundColor": "F7F7F7"}

Used in Basic

DropCapStyle

Defines a drop cap that can be used by a ComponentTextStyle. Drop caps are applied to only the first paragraph of a Text component.

Properties

| property | type | contains | description | required | version |
|---|---|---|---|---|---|
| numberOfLines | integer | | Indicates the number of text lines this drop cap should span. For example, if 3 is specified, the top of the drop cap will be aligned with the top of the first line, and it will drop to the bottom of the third line. Minimum: 2 Maximum: 6 | yes | 0.9 |
| numberOfCharacters | integer | | Indicates the number of characters this drop cap should use, i.e., how many characters to subtract from the original text and use in the drop cap instead. Defaults to 1 character. Minimum:1 Maximum: 4 | no | 0.9 |

-continued

| property | type | contains | description | required | version |
|---|---|---|---|---|---|
| fontName | string | | The PostScript name of the font to use for the drop cap. By default, the drop cap inherits the font name of the associated text. | no | 0.9 |
| textColor | string | | The color of the drop cap, defined as a 3- to 8-character RGBA hexadecimal string. Defaults to the color of the associated text. | no | 0.9 |
| backgroundColor | string | | The background color of the drop cap, defined as a 3- to 8-character RGBA hexadecimal string; e.g., 00 for black or FF00007F for red with an alpha (opacity) of 50%. By default, no background color is applied, making the background effectively transparent. | no | 0.9 |
| padding | integer | | Sets the padding of the drop cap in points. When padding is applied, the drop cap is smaller than the box that surrounds it. Defaults to 0. | no | 0.9 |

Example

Note: This example needs to be part of a ComponentTextStyle definition to function properly.

```
{
    "numberOfLines": 3,
    "numberOfCharacters": 2,
    "fontName": "HelveticaNeue",
    "textColor": "FFF",
    "backgroundColor": "00",
    "padding": 5
}
```

Used in ComponentTextStyle

InlineTextStyle

An inline text style contains a TextStyle object or references (by identifier) a TextStyle that is defined at the top level of the document. A TextStyle can contain a subset of properties that can then be applied to a portion of text via an InlineTextStyle. Only properties with values will be overridden for the given range.

Note that in a text component, the array of inline text styles has the label inlineTextStyles, plural. See the examples for Text and Pullquote.

Properties

| property | type | contains | description | required | version |
|---|---|---|---|---|---|
| rangeStart | integer | | The starting point of the text to which the alternative styling should be applied. Note: the first available character is at 0, not 1. | yes | 0.10 |
| rangeLength | integer | | The length (in characters) of the portion of text to which the alternative styling should be applied. | yes | 0.10 |
| textStyle | string/TextStyle | | Either an inline TextStyle object or a string identifier that references a TextStyle object defined at the top level of the document in the textStyles property. | yes | 0.10 |

Example

```
{
    "rangeStart": 17,
    "rangeLength": 9,
    "textStyle": {
        "textColor": "FF0000",
        "backgroundColor": "00"
    }
}
```

Used in Text

StrokeStyle

Defines a stroke that can be used as a Border.

Properties

| property | type | contains | description | required | version |
|---|---|---|---|---|---|
| color | string | | The stroke color, defined as a 3- to 8-character RGBA hexadecimal string; e.g., 00 for black or FF00007F for red with an alpha (opacity) of 50%. Defaults to 00 (black). | no | 0.9 |
| width | string/integer | | The width of the stroke line. Can be either an integer value in points, or a string compliant with the Supported_Units.md. Defaults to 1 point. | no | 0.9 |
| style | string | | Defines the style of the stroke. Available values:<br>solid<br>(Default) A solid stroke _<br>dashed<br>A dashed stroke _ _ _<br>dotted<br>A dotted stroke . . . | no | 0.9 |

Example

Note: Object examples cannot be used with the Preview Tool without additional structure. Examples are for use within a complete article and may need parent objects to function properly.

```
{
    "color": "FFC800",
    "width": 1
}
```

Used in Divider & Border

TextStrokeStyle

Defines a stroke that can be used as underline or strikethrough.

Properties

| property | type | contains | description | required | version |
|---|---|---|---|---|---|
| color | string | | Color of the stroke defined as a hexadecimal string.<br>If omitted, the context's stroke color will be used (from text color in case the stroke is for underline or strikethrough). | no | 0.9 |

Example

{"color": "FFC800"}

TextStyle

Applies styling to a specific range of text.

Properties

| property | type | contains | description | required | version |
|---|---|---|---|---|---|
| fontName | string | | The PostScript name of the font to apply, such as GillSans-Bold.<br>One can reference any iOS font by name; see iOSfonts.com for a list of available fonts.<br>If you want to use your own font files, use OpenType (with .otf extension), or TrueType (with .ttf extension) fonts.<br>Simply copy the font files into | no | 0.9 |

| property | type | contains | description | required | version |
|---|---|---|---|---|---|
| | | | the same directory as your JSON document. Make sure to copy all variants (bold, italic, regular) of the font family if you want to be able to use any of those. | | |
| fontSize | integer | | The size of the font, in points. By default, the font size will be inherited from a parent component or a default style. | no | 0.9 |
| textColor | string | | The text color, defined as a 3- to 8-character RGBA hexadecimal string; e.g., 00 for black or FF00007F for red with an alpha (opacity) of 50%. Defaults to 00000 (black). | no | 0.9 |
| textTransform | string | | The transform to apply to the text. Available values: uppercase, lowercase, capitalize (title case), or none (default). textTransform is not currently supported. | no | 0.9 |
| underline | TextStrokeStyle/boolean | | Definition for text underlining, for example for links. One can set this to true to underline text using the text color, or provide a TextStrokeStyle with a different color. By default underline will be omitted (false). | no | 0.10 |
| strikethrough | TextStrokeStyle/boolean | | Definition for text with strikethrough. Set strikethrough to true for striking through text using the text color, or provide a TextStrokeStyle definition with another color. By default strikethrough will be omitted (false). | no | 0.10 |
| backgroundColor | string | | The background color for text lines, defined as a 3- to 8-character RGBA hexadecimal string; e.g., 00 for black or FF00007F for red with an alpha (opacity) of 50%. Defaults to transparent. | no | 0.9 |
| verticalAlignment | string | | The vertical alignment of the text, allowing for superscript and subscript. Available values: superscript, subscript, or baseline. To override values specified in parent text styles, use baseline. Defaults to baseline when unspecified, and inherits the value specified in a TextStyle applied to the same range. The values superscript and subscript also adjust the font size to ⅔ of the size defined for that character range. | no | 0.9 |
| tracking | float | | The amount of tracking for characters in text, in percentage of the fontSize. The actual spacing between letters is determined by combining information from the font and font size. Tracking allows you to have less, or add more spacing between characters. The default tracking value is 0.0. Setting the value to 0.5 means that the distance between characters increases by 50% of the fontSize. With a font size of | no | 0.9 |

-continued

| property | type | contains | description | required | version |
|---|---|---|---|---|---|
| | | | 10, the additional spacing between characters will be 5 points. | | |

Example

Note: Object examples cannot be used with the Preview Tool without additional structure. Examples are for use within a complete article and may need parent objects to function properly.

```
{
    "fontName": "GillSans-Bold",
    "textColor": "333333",
    "fontSize": 12
}
```

Extended By ComponentTextStyle
Used in ComponentTextStyle & Basic
F. Anchor
The following defines the anchoring of one component to another component. An Anchor can be used to align components vertically.
Properties

| property | type | contains | description | required | version |
|---|---|---|---|---|---|
| targetAnchorPosition | string | | Defines the anchor position that should be used to position the component relative to the originAnchorPosition. Possible values: top<br>The top of the originating component should be aligned with or near the originAnchorPosition.<br>center<br>The center (middle) of the originating component should be aligned with or near the originAnchorPosition.<br>bottom<br>The bottom of the originating component should be aligned with or near the originAnchorPosition.<br>To align the bottom of a component with the bottom of another component, both originAnchorPosition and targetAnchorPosition should be set to bottom. | yes | 0.9 |
| originAnchorPosition | string | | Defines the anchor position at origin. The originating anchor will be positioned as closely as possible to the intended targetAnchorPosition. If this property is omitted, the value of targetAnchorPosition will be used. | no | 0.9 |
| targetComponentIdentifier | string | | An identifier that refers to another component at the same level. targetComponentIdentifier cannot refer to the current component's parent or child components. When this property is omitted, the anchor will be applied to the parent component, if one exists. | no | 0.9 |
| rangeStart | integer | | The start index of the range of text the component should be anchored to. When a component is anchored to a component with role body, the text | no | 0.9 |

-continued

| property | type | contains | description | required | version |
|---|---|---|---|---|---|
| rangeLength | integer | | might be flowed around the component.
If rangeStart is specified, rangeLength is required.
The length of the range of text the component should be anchored to.
If rangeLength is specified, rangeStart is required.
Maximum value: (textLength-rangeStart) | no | 0.9 |

Example

Note: Object examples cannot be used with the Preview Tool without additional structure. Examples are for use within a complete article and may need parent objects to function properly.

```
{
    "targetComponentIdentifier":
    "02767FCB-3901-4340-B403-96CDEAF76EE8",
    "targetAnchorPosition": "bottom",
    "originAnchorPosition": "bottom"
}
```

Used in Component

G. Metadata

The following defines various metadata for a Native document.

Properties

| property | type | contains | description | required | version |
|---|---|---|---|---|---|
| datePublished | string | | An optional UTC date indicating when the document was first published. | no | 0.9 |
| dateCreated | string | | An optional UTC date indicating when the document was first created. | no | 0.9 |
| dateModified | string | | An optional UTC date indicating when the last modification was made. | no | 0.9 |
| authors | array | string | Array list of author names. | no | 0.10 |
| generatorName | string | | The name of the user agent that was used to create this Native document. | no | 0.9 |
| generatorVersion | string | | The version "number" for the generator used to create this Native document. | no | 0.9 |
| generatorIdentifier | string | | A unique identifier for the generator used to create or provide this Native document. | no | 0.9 |
| canonicalURL | string | | The canonical URL of a web version of this document.
If this document has an HTML version that is hosted on a website, use this property to set the canonical URL to that location. This URL can be used to de-duplicate multiple versions of this document, as well as to point devices that do not support the Native rendering to the web address.
If canonicalURL is omitted, devices that do not support Native rendering will not be able to display the document. | no | 0.10 |
| thumbnailURL | string | | The URL of an image that can represent this document in a list of other documents.
Supported image types include JPEG (with .jpeg or .jpg extension) and PNG (.png extension).
For best results, provide a high-resolution image. The image will automatically be scaled down to the correct size.
If you provide a thumbnailURL, make sure that the URL is prefixed with bundle:// and points to an image file in the same directory as the document. | no | 0.10 |
| keywords | array | string | Keywords that describe the article. One can set up to 50 keywords. | no | 0.10 |
| excerpt | string | | A short summary of the contents of the article. | no | 0.10 |
| authorName | string | | deprecated The name of the author of the document.
Note: this property is deprecated in favor of the authors property. | no | 0.9 |
| authorIdentifier | string | | deprecated An optional string that serves as a unique identifier for the author. | no | 0.9 |

-continued

| property | type | contains | description | required | version |
|---|---|---|---|---|---|
| campaignData | object | | Custom key-value pairs for use in advertisement campaigns. | no | 0.10 |

Example

Note: Object examples cannot be used with the Preview Tool without additional structure. The Metadata object is meant for use within a complete article and needs to be inserted into a document to function properly.

```
{
    "datePublished": "2020-09-09T14:45:45+00:00",
    "dateCreated": "2020-09-08T12:41:00+00:00",
    "dateModified": "2020-09-08T12:41:00+00:00",
    "authors": [
        "Millicent Harcourt"
    ],
    "generatorName": "Generator",
    "generatorVersion": "1.0",
    "thumbnailURL": "bundle://header.png",
    "canonicalURL":
    "https://example.com/articles/2015/original-article.html"
}
```

Used in Basic
Supported Markdown formatting
This version supports a subset of Markdown syntax. To use Markdown, set the format property on the Text component to markdown.
In-Text Markdown
These markdown features can be used within text paragraphs.
Emphasis
To add emphasis, surround the text with asterisks (*) or underscores (_).
A sentence with _emphasis_ or different *emphasis notation*.
becomes:
A sentence with emphasis or different emphasis notation.
Strong Emphasis
To add strong emphasis, surround the text with double asterisks (**) or double underscores ()
A sentence containing something really important.
becomes:
A sentence containing something really important.
Links
To add a link to a website or another article, use brackets and parentheses:
This text contains [a link to another page] (http://example.com/other-page)
becomes:
This text contains a link to another page.
Note that reference-style links (defined names for links) are not supported.
Block-Level Markdown
Headings
To indicate that text is a Heading, use the character.
Heading 1
Heading 2
Heading 3
Heading 4
Heading 5
Heading 6

Lists
To create a bulleted list item, start a new line after a blank line, then type a space and either a dash (-), an asterisk (*), or a plus sign (+):
First item
Second item
Becomes:
First item
Second item
To create an ordered list, use numbers and periods instead (1.):
1. First numbered item
2. Second numbered item
Becomes:
1. First numbered item
2. Second numbered item
Defining Paragraphs
To separate text into paragraphs, use 2 new lines between the end of one paragraph and the beginning of the next paragraph. In JSON, new lines are encoded as \n, so paragraphs would be indicated as follows: last line of paragraph 1\n\nfirst line of paragraph 2.
Divider
To create a divider line or horizontal rule, type at least 3 hyphens (---) or 3 asterisks (***) on a new, empty line:
Dividers can separate portions of text.
---
Here's the epilogue to my story.
Becomes:
Dividers can separate portions of text. ⎯⎯⎯⎯⎯⎯⎯⎯⎯⎯

Here's the epilogue to my story.

What is claimed is:

1. A non-transitory machine readable medium storing a program for presenting a content presentation structure for a client device, the program comprising sets of instructions for:
   receiving a set of specifications for a set of components of the content presentation structure;
   for each component of the content presentation structure, identifying dependencies of the component's size and of the component's position based on a specified role of the component, wherein at least one of the set of components comprises a pullquote role, the pullquote role indicating that the component is quoted text pulled from a second component of the content presentation structure; and
   determining a blueprint of a document, using the content presentation structure, by laying out each component according to the identified dependencies and according to a set of design rules.

2. The non-transitory machine readable medium of claim 1, wherein the pullquote role aligns the quoted text to the second component.

3. The non-transitory machine readable medium of claim 1, wherein the specification of a component comprises a width of the component specified as a number of columns that the component spans.

4. The non-transitory machine readable medium of claim 2, wherein the set of instructions comprise instructions for audibly presenting the document associated with the content presentation structure, wherein the at least one of the set of components that comprises the pullquote role is omitted from audible presentation but not visual presentation.

5. The non-transitory machine readable medium of claim 3, wherein the set of instructions for laying out the component comprises a set of instructions for determining a height of the component.

6. The non-transitory machine readable medium of claim 5, wherein the height of the component is based on the width of the component.

7. The non-transitory machine readable medium of claim 5, wherein the height of the component is based on the content of the component.

8. The non-transitory machine readable medium of claim 2, wherein the quoted text is dependent on a font or a length of text in a body of the document.

9. A client device comprising:
a set of processing units; and
a machine readable medium storing a program for execution by at least one of the processing units, the program comprising machine-readable instructions for:
receiving a set of specifications for a set of components of a content presentation structure;
for each component of the content presentation structure, identifying dependencies of the component's size and of the component's position based on a specified role of the component, wherein at least one of the set of components comprises an image role, the image role indicating that the at least one of the set of components is an image in a document; and
determining a blueprint of the document, using the content presentation structure, by laying out each component according to a set of design rules.

10. The client device of claim 9, wherein the set of components comprises a first subset of the components dependent on a second subset of the components.

11. The client device of claim 9, configured to align the at least one of the set of components comprising the image role to a second component comprising a body role, the body role indicating that the second component is a body of the document.

12. The client device of claim 9, wherein a dependency of a component's position is based on the position and/or size of another component of the content presentation structure.

13. The client device of claim 9, wherein the set of instructions for laying out each component comprises a set of instructions for delaying layout of a component until the component's dependencies have been determined.

14. The client device of claim 9, wherein the set of design rules is based on the dimensions of the client device's display.

15. The client device of claim 9, wherein the set of instructions for laying a component according to the design rules comprises a set of instructions for overriding at least a subset of the specifications in the set of specifications.

16. The client device of claim 9, wherein the blueprint specifies a position of an image associated with the image role is based upon on a position of text in a body of the document.

17. A method for presenting a content presentation structure for a client device comprising:
receiving a set of specifications for a set of components of the content presentation structure;
for each component of the content presentation structure, identifying dependencies of the component's size and of the component's position based on a specified role of the component, wherein at least one of the set of components comprises a pullquote role, the pullquote role indicating that the component is quoted text pulled from a second component of the content presentation structure; and
determining a blueprint of a document, using the content presentation structure, by laying out each component according to the identified dependencies and according to a set of design rules.

18. The method of claim 17, wherein the pullquote role aligns quoted text to the second component.

19. The method of claim 17, wherein the specification of a component comprises a width of the component specified as a number of columns that the component spans.

20. The method of claim 18, comprising audibly presenting the document associated with the content presentation structure, wherein the at least one of the set of components that comprises the pullquote role is omitted from audible presentation but not visual presentation.

* * * * *